US 8,285,634 B2

(12) United States Patent
Chiulli et al.

(10) Patent No.: US 8,285,634 B2
(45) Date of Patent: *****Oct. 9, 2012

(54) SYSTEM AND METHOD FOR FACILITATING UNIFIED TRADING AND CONTROL FOR A SPONSORING ORGANIZATION'S MONEY MANAGEMENT PROCESS

(75) Inventors: Allan T. Chiulli, Highlands Ranch, CO (US); Tom H. Warren, Greenwood Village, CO (US)

(73) Assignee: UAT, Inc., Englewood, CO (US)

( * ) Notice: Subject to any disclaimer, the term of this patent is extended or adjusted under 35 U.S.C. 154(b) by 14 days.

This patent is subject to a terminal disclaimer.

(21) Appl. No.: 13/118,904

(22) Filed: May 31, 2011

(65) Prior Publication Data
US 2011/0238559 A1    Sep. 29, 2011

Related U.S. Application Data

(63) Continuation of application No. 13/020,121, filed on Feb. 3, 2011, which is a continuation of application No. 12/700,218, filed on Feb. 4, 2010, now Pat. No. 7,912,783, which is a continuation of application No. 11/783,690, filed on Apr. 11, 2007, now Pat. No. 7,685,057.

(60) Provisional application No. 60/899,393, filed on Feb. 5, 2007, provisional application No. 60/791,209, filed on Apr. 12, 2006.

(51) Int. Cl.
*G06Q 40/00*    (2006.01)
(52) U.S. Cl. ............................................. 705/37; 705/38
(58) Field of Classification Search .............. 705/35–39, 705/43
See application file for complete search history.

(56) References Cited

U.S. PATENT DOCUMENTS

| | | | |
|---|---|---|---|
| 132,899 | A | 7/1992 | Fox |
| 5,136,501 | A | 8/1992 | Silverman et al. |
| 5,873,071 | A | 2/1999 | Ferstenberg et al. |
| 5,893,079 | A | 4/1999 | Cwenar |
| 5,918,218 | A | 6/1999 | Harris et al. |
| 5,926,792 | A | 7/1999 | Koppes et al. |
| 6,018,722 | A | 1/2000 | Ray et al. |
| 6,161,098 | A | 12/2000 | Wallman |
| 6,338,047 | B1 | 1/2002 | Wallman |
| 6,360,210 | B1 | 3/2002 | Wallman |

(Continued)

FOREIGN PATENT DOCUMENTS

JP    2004133949    4/2004

(Continued)

OTHER PUBLICATIONS

Extended European Search Report, dated May 23, 2011, from European Application No. 08843194.5.

(Continued)

*Primary Examiner* — Thu Thao Havan
(74) *Attorney, Agent, or Firm* — Plumsea Law Group, LLC

(57) ABSTRACT

An embodiment of the present invention provides a system, method, process, software and standards that enable a unified trading and control process utilized by sponsoring organizations and asset managers (money managers) for sub advised or externally managed investment portfolios as to increase control over the trading process by a sponsoring organization, enhance regulatory compliance, substantially lower trading costs and improve investment performance on a recurring basis for the shareholders and beneficiaries investing in registered and non registered mutual funds and institutional investment portfolios.

38 Claims, 34 Drawing Sheets

U.S. PATENT DOCUMENTS

| | | | |
|---|---|---|---|
| 6,393,409 B2 | 5/2002 | Young et al. | |
| 6,516,303 B1 | 2/2003 | Wallman | |
| 6,601,044 B1 | 7/2003 | Wallman | |
| 6,606,606 B2 | 8/2003 | Starr | |
| 6,615,188 B1 | 9/2003 | Breen et al. | |
| 6,820,069 B1 | 11/2004 | Kogan et al. | |
| 6,947,901 B1 | 9/2005 | McCabe et al. | |
| 7,110,981 B1 * | 9/2006 | Sidikman et al. | 705/43 |
| 7,206,760 B1 | 4/2007 | Carey et al. | |
| 7,403,918 B2 | 7/2008 | Kochansky | |
| 7,599,869 B2 | 10/2009 | Sands et al. | |
| 7,603,358 B1 | 10/2009 | Anderson et al. | |
| 7,606,747 B2 | 10/2009 | Greenbaum et al. | |
| 7,636,686 B2 | 12/2009 | Pierdinock et al. | |
| 7,873,560 B2 | 1/2011 | Reich et al. | |
| 7,912,783 B2 * | 3/2011 | Chiulli et al. | 705/37 |
| 7,930,239 B2 | 4/2011 | Pierdinock et al. | |
| 7,962,393 B2 | 6/2011 | Greenbaum et al. | |
| 2002/0143689 A1 | 10/2002 | Naylor et al. | |
| 2003/0093352 A1 | 5/2003 | Muralidhar et al. | |
| 2003/0120574 A1 | 6/2003 | Wallman | |
| 2003/0120575 A1 | 6/2003 | Wallman | |
| 2003/0167221 A1 | 9/2003 | Kochansky | |
| 2003/0208432 A1 | 11/2003 | Wallman | |
| 2003/0212622 A1 | 11/2003 | Wallman | |
| 2003/0229561 A1 | 12/2003 | Wallman | |
| 2004/0024677 A1 | 2/2004 | Wallman | |
| 2004/0024678 A1 | 2/2004 | Wallman | |
| 2004/0024679 A1 | 2/2004 | Wallman | |
| 2004/0039675 A1 | 2/2004 | Wallman | |
| 2004/0064394 A1 | 4/2004 | Wallman | |
| 2004/0111349 A1 | 6/2004 | Charnley, Jr. | |
| 2005/0108120 A1 | 5/2005 | Malka et al. | |
| 2005/0154662 A1 | 7/2005 | Langenwalter | |
| 2005/0165671 A1 | 7/2005 | Meade et al. | |
| 2005/0273424 A1 | 12/2005 | Silverman et al. | |
| 2006/0080199 A1 | 4/2006 | Tarbox et al. | |
| 2007/0192170 A1 | 8/2007 | Cristol | |
| 2010/0030718 A1 | 2/2010 | Anderson et al. | |

FOREIGN PATENT DOCUMENTS

| | | | |
|---|---|---|---|
| KR | 10 2002001933 | 10/2003 | |

OTHER PUBLICATIONS

ITG—The Future of Trading http://www.itginc.com/about/itgstory.html Feb. 25, 2004, 4 pages.

Investment Technology Group, Inc., 1995 Annual Report http://www.itginc.com/annrep/95/index.html Feb. 26, 2004, 30 pages.

Investment Technology Group, Inc., 1996 Annnual Report http://www.itginc.com/annrep/96/ar96_process.html, 2 pages.

The International Search Report and the Written Opinion of The International Searching Authority, or The Declaration mailed Jan. 9, 2009 in PCT Application No. PCT/US2008/007526.

The International Search Report and The Written Opinion of The International Searching Authority, or The Declaration mailed Apr. 28, 2009 in PCT Application No. PCT/US2008/012029.

International Preliminary Report on Patentability mailed Jan. 7, 2010 in PCT Application No. PCT/US/2008/007526.

International Preliminary Report on Patentability mailed May 6, 2010 in PCT Application No. PCT/US2008/012029.

Office Action mailed May 28, 2010 in U.S. Appl. No. 12/140,047.

Amendment filed Jul. 30, 2010 in U.S. Appl. No. 12/140,047.

Interview Summary mailed Jul. 29, 2010 in U.S. Appl. No. 12/140,047.

Notice of Allowance mailed Aug. 17, 2010 in U.S. Appl. No. 12/140,047.

Notice of Allowance mailed Jun. 2, 2010 in U.S. Appl. No. 12/256,196.

Amendment under 37 C.F.R. § 1.312 filed Aug. 2, 2010 in U.S. Appl. No. 12/256,196.

Response to Rule 312 Communication mailed Aug. 19, 2010 in U.S. Appl. No. 12/256,196.

Notice of Allowance mailed Aug. 30, 2010 in U.S. Appl. No. 12/849,032.

Supplemental Application Data Sheet filed Nov. 8, 2010 in U.S. Appl. No. 12/849,032.

* cited by examiner

| INVESTMENT TYPE | TERMINOLOGY UTILIZED IN INVESTMENT INDUSTRY PRODUCTS | | | |
|---|---|---|---|---|
| | REGISTERED '40 ACT FUNDS | REGISTERED '40 ACT FUNDS | NON-REGISTERED '40 ACT FUNDS | INSTITUTIONAL INVESTMENT PORTFOLIOS |
| MARKETS | VARIABLE INSURANCE | MUTUAL FUNDS DEFINED CONTRIBUTION PLAN 529 PLANS | HEDGE FUNDS GROUP ANNUITIES COLLECTIVE INVESTMENTS DEFERRED COMPENSATION PLANS | INSTITUTIONAL ACCOUNTS SEP ACCTS OF INSUR COMPANIES PENSION PLAN, ENDOWMENTS, TRUSTS |
| SEC REGULATORY ACT | INVESTMENT COMPANY ACT OF 1940 | INVESTMENT COMPANY ACT OF 1940 | INVESTMENT COMPANY ACT OF 1940 | INVESTMENT ADVISORS ACT OF 1940 |
| CATEGORY | MUTUAL FUNDS | MUTUAL FUNDS | MUTUAL FUNDS | PRIVATE INVESTMENT PORTFOLIOS |
| PRODUCTS | VARIABLE ANNUITIES VARIABLE LIFE | MUTUAL FUNDS 401(K), 403(B) AND 457 PLANS 529 PLANS | HEDGE FUNDS GROUP ANNUITIES COLLECTIVE INVESTMENTS DEFERRED COMPENSATION PLANS | COMPANY INVESTMENT ACCOUNTS SEP ACCTS OF INSUR COMPANIES PENSION PLAN, ENDOWMENTS, TRUSTS |
| FIDUCIARY RESPONSIBILITY | ADVISOR AND BOARD MUST CONTROL INVESTMENT EXPENSES | ADVISOR AND BOARD MUST CONTROL INVESTMENT EXPENSES | ADVISOR AND BOARD MUST CONTROL INVESTMENT EXPENSES | ADMINISTRATOR AND BOARD MUST CONTROL INVESTMENT EXPENSES |
| ASSET MANAGER | SUB ADVISOR | SUB ADVISOR | SUB ADVISOR | MONEY MANAGER (EXTERNALLY MANAGED ASSETS) |
| INVESTMENT PORTFOLIOS | SUB ACCOUNTS VARIABLE FUND LLC REGISTERED INVESTMENT COMP | MUTUAL FUNDS | HEDGE FUNDS GROUP ANNUITIES COLLECTIVE INVESTMENTS DEFERRED COMPENSATION PLANS | PRIVATE ACCOUNTS |
| INDIVIDUAL INVESTORS | SHAREHOLDERS OR RETAIL INVESTORS | SHAREHOLDERS OR RETAIL INVESTORS | SHAREHOLDERS OR RETAIL INVESTORS | BENEFICIARIES |

*FIG. 1*

| # | SYMBOL | SECURITY | PRICE/SHARE | SHARES | VALUE | GAIN/LOSS | CURRENT WEIGHT % |
|---|--------|----------|-------------|--------|-------|-----------|------------------|
|   | CASH   |          |             |        | $25,000.00 |       | 3.3600% |
| 1 | AA     | ALCOA    | $ 29.6250   | 2,000  | $ 59,250.00 | $10,234.32 | 7.9632% |
| 2 | AXP    | AMERICAN EXPRESS CO | $ 55.5000 | 1,000 | $ 55,500.00 | $4,384.84 | 7.4592% |
| 3 | BA     | BOEING CO | $ 59.5620 | 1,000 | $ 59,562.00 | $12,473.34 | 8.0051% |
| 4 | C      | CITIGROUP INC | $ 51.0000 | 3,000 | $ 153,000.00 | $16,483.32 | 20.5631% |
| 5 | CAT    | CATERPILLAR INC | $ 33.3750 | 2,500 | $ 83,437.50 | $7,840.23 | 11.2140% |
| 6 | DD     | DUPONT EI DE NEMOURS | $ 44.6250 | 3,200 | $ 142,800.00 | $21,034.47 | 19.1923% |
| 7 | DIS    | WALT DISNEY CO | $ 41.3750 | 4,000 | $ 165,500.00 | $18,374.34 | 22.2431% |
|   |        |          |             |        | $744,049.50 | $90,824.86 | 100.0000% |

702

TRADE TICKET  DATE/TIME
SYMBOL  CATERPILLAR INC  [BUY]  NEW WEIGHT
SECURITY  CAT  [SELL]  NEW TOTAL SHARES
VALUATION  $ 83,437.50  ADDITIONAL SHARES
PRICE  $ 33.3750  NEW VALUATION
SHARES  500  CASH GENERATE / COMMIT
TOTAL PURCHASE  $ 16,687.50  ORDER TYPE  MARKET
  LIMIT  [$]
  GOOD TO CLOSE
  FILL OR KILL
  DIRECT TRADE

[ ] ADD TO BATCH ORDER
[ ] TRANSMIT ORDER  [ ] CANCEL

703

| # | SYMBOL | SECURITY | PRICE/SHARE | SHARES | VALUE | GAIN/LOSS | CURRENT WEIGHT % |
|---|--------|----------|-------------|--------|-------|-----------|------------------|
|   | CASH   |          |             |        | $8,312.50 |       | 1.1172% |
| 1 | AA     | ALCOA    | $ 29.6250   | 2,000  | $ 59,250.00 | $10,234.32 | 7.9632% |
| 2 | AXP    | AMERICAN EXPRESS CO | $ 55.5000 | 1,000 | $ 55,500.00 | $4,384.84 | 7.4592% |
| 3 | BA     | BOEING CO | $ 59.5620 | 1,000 | $ 59,562.00 | $12,473.34 | 8.0051% |
| 4 | C      | CITIGROUP INC | $ 51.0000 | 3,000 | $ 153,000.00 | $16,483.32 | 20.5631% |
| 5 | CAT    | CATERPILLAR INC | $ 33.3750 | 3,000 | $ 100,125.00 | $7,840.23 | 13.4568% |
| 6 | DD     | DUPONT EI DE NEMOURS | $ 44.6250 | 3,200 | $ 142,800.00 | $21,034.47 | 19.1923% |
| 7 | DIS    | WALT DISNEY CO | $ 41.3750 | 4,000 | $ 165,500.00 | $18,374.34 | 22.2431% |
|   |        |          |             |        | $744,049.50 | $90,824.86 | 100.0000% |

FUNDAMENTAL RESTRICTIONS:
1 <= 33.33% SECURITIES LENDING
2 <= 15% ILLIQUID SECURITIES
3 <= 75% ASSETS: <= 5% ANY ONE ISSUER
4 <= 75% ASSETS: <= 10% OUT VOT SEC 1 ISSU
5 <= 25% ASSETS IN ONE PARTICULAR INDUSTRY
6 <= 300% ASSET COV: BORROW FROM BANKS
7 ACT AS UNDERWRITERS
8 REAL ESTATE - PROHIBITS PURCHASE OR SALE
9 <55% PORTOFLIO VALUE = 1 ISSUER
10 <70% PORTOFLIO VALUE = 2 ISSUERS
11 <80% PORTOFLIO VALUE = 3 ISSUERS
12 <90% PORTOFLIO VALUE = 4 ISSUERS
13 EACH GOV AGEN/INSTRUM = SEP ISSUER
14 ALL SECU OF ONE ISSUER = ONE INVESTMENT

PROSPECTUS RESTRICTIONS:
1 10 OR MORE NON US COUNTRIES
2 <=15% NON US COMP/SIG US MKT
3 >= 80% US ISSUERS/PRIN MKT IS US
4 <= 10% ADRs
5 <= 15% EQUI ISSU EX US/CAN, NOT IN S&P 500
6 <= 10% NON CON DEBT RATED Ba/BB OR LOWER
7 >= 80% TECHNOLOGY COMPANIES
8 <= 33% FOREIGN SECURITIES
9 >= 80% FIXED INCOME (INCLU DERIVATIVES)
10 <= 25% HI GRAD CORP BOND & CRED DEF SWAP
11 >= 90% EQUITIES
12 <= 10% FOREIGN INVESTMENTS
13 <= 10% FIXED INCOME
14 <= 25% FOREIGN INVEST/FORE CURR & NOT US TRAD
15 <= 10% HIGH YIELD BONDS
16 NO LIMIT ON FOREIGN EQUITY AND DEBT SECURITIES
17 <= 35% HIGH YIELD BONDS
18 >= 80% EQUITY/DERIV IN HEALTH SCIENCES
19 HEA SCI: >= 50% OF ASSET IN HEA SCI
20 HEA SCI: >= 50% GROSS INC/NET SALES HEA SCI
21 >= 80% COMMON STK IN RUSSELL MID CAP IND
22 <= 15% FOREIGN EQUITY AND FIXED INCOME
23 <= 25% SECURITIES SOLD/HELD SHORT
24 >= 65% COMMON STOCKS/RELATED SECURITIES
25 <= 35% FOREIGN SECURITIES
26 >= NON US COMP W $3 BB MKT CAPS
27 <= 25% EMERGING MARKETS
28 NON US COMP: PRINCIPAL OFFICE EX US
29 NON US COMP: PRINCIPAL TRADING MKT EX US
30 NON US COMP: 50% REV OR MORE EX US
31 NON US COMP: 50% OR MORE ASSETS EX US

32 >= 80% EQUITIES IN S&P 500
33 >= 80% EQUITIES IN RUSSELL 2000
34 >= 80% EQUITIES W MKT CAP < $1.5 BB
35 <= 15% ASSETS IN SHORT SALES
36 >= 80% EQUITIES $100 MM - $2.5 BB MKT CAP
37 <= 20% SHORT TERM DEBT
38 <= 50% FOREIGN SECURITIES
39 >= 80% EQUITIES IN "EMERGING MARKETS"
40 >= 80% FIXED INCOME
41 <= 10% HIGH YIELD BONDS
42 <= 30% SECUR DEMON IN FOREIGN CURRENCIES
43 >= 95% MONEY MARKET INSTRUMENTS
44 AVERAGE $-WEIGHTED TERM TO MATUR <= 90 DAYS
45 >= 80% LOWER AND MEDIUM CREDIT BONDS
46 >= 80% INTER TO LONG TERM MATURITY BONDS
47 >= 80% LARGE CAP COMPANIES
48 <= 20% FOREIGN SECURITIES
49 <= 25% FOREIGN SECURITIES
50 <= 35% HIGH YIELD BONDS
51 >= 80% EQUITIES $1-$2 BB OR RUSSELL MIDCAP
52 >= 80% IN COMPANIES ENGAGED IN REAL ESTATE
53 <= 10% FOREIGN INVESTMENTS

SAI RESTRICTIONS: FUNDS MAY INVEST IN:
1 $ WGTED AVG ALL FIX INC: A OR HIGHER
2 $DEM BK OB: $10 BB/L75/branUS
3 $DEM CD: $5BB US/$10 BB FORE
4 $DEM CDS: US/FOREIGN BKS
5 $DEM FOREIGN DEBT
6 $DEM FOREIGN SEC
7 $DEM OB: FOR GOV, AG, INTL AG
8 $DEM SECURITIES ONLY
9 $DEM CORP DEBT: DOM/FOREIG Baa/BBB
10 ADRs
11 ARMs
12 ASSET BACKED SECURITIES
13 BANK OBLIG: 2 HIGHEST RATING CAT
14 BANK OBLIGATIONS
15 BANKER ACCEPTANCES
16 BORROW MONEY
17 BRADY BONDS
18 CASH/CASH EQUIV
19 CBOs
20 CDOs
21 CERTIFICATE OF DEPOSITS
22 CLOs

*FIG. 8A*

23 CLOSED END FUNDS
24 CMOs
25 COMM PAPER: RATE P1/A1-Aa/AA
26 COMMERCIAL PAPER
27 COMPANY: 50% MKT VALUE REAL EST
28 COMPANY: 50% REV/PROF REAL EST
29 CONVERTIBLE BONDS
30 CONVERTIBLE SEC: 10% MAXIMUM
31 CONVERTIBLE SECURITIES
32 CORP BONDS: $ DEM
33 CORP BONDS: FOREIGN CURR DEM
34 CUSTODIAL RECEIPTS
35 DEBSE FORE ISS/FORE CUR Baa/BBB
36 DEBSEC< Ba/BB OR LOWER
37 DEBSEC<Baa/BBB
38 DEBSEC<Baa/BBB>C
39 DEBSEC<Baa/BBB>Caa/CCC
40 DEBT SEC Baa OR BBB OR HIGHER
41 DEBT SEC: LOW Baa/BBB 10% MAX
42 DEBT SEC: LOW Baa/BBB 15% MAX
43 DEBT SEC: LOW Baa/BBB 35% MAX
44 DEBT SEC: LOW Baa/BBB 5% MAX
45 DEBT SEC: UNSECURED 5% MAX
46 DEBT SECURITIES
47 DEFERRED INTEREST BONDS
48 DIVIDEND PAYING COMMON STK
49 EDRs
50 EMERGING MARKET DEBT
51 EQUITY FOREIGN ISSUER - FORE EXCH LIST
52 EQUITY FOREIGN ISSUER - US EXCH LIST
53 EQUITY LINKED SECURITIES
54 ETFs
55 EUROBONDS
56 EVENT LINKED BONDS: 5% MAX
57 FIRM COMMITMENTS
58 FOREIGN COUNTRY DEBT>= Baa/BBB
59 FOREIGN DEBT IN FOREIGN CURRENCY
60 FOREIGN SECURITIES
61 FOREIGN SECURITIES: 10% MAX
62 FOREIGN SECURITIES: 25% MAX
63 GDRs
64 HIGH YIELD BONDS
65 HY NON-CONV: 5% ASSETS MAX
66 ILLIQUID SEC
67 INDEX LINKED SECURITIES
68 INDEXED SECURITIES
69 INSTRU SUPRANAT IN FOREIGN CUR
70 INVERSE FLOATERS
71 IPOs
72 JOINT VENTURES (EQUITY INTERESTS)
73 LLCs (EQUITY INTERESTS)
74 LOAN PARTICIPATIONS
75 MONEY MARKET INSTRUMENTS
76 MONEY MKT OF MONEY MGR
77 MORTGAGE BACKED
78 MORTGAGE DOLLAR ROLL TRANS
79 MORTGAGE RELATED SECURITIES
80 MULTINATIONAL COMPANIES
81 MUNIS
82 NONCONV FIX INCOM IN FOREIGN CUR
83 OPALs
84 OPEN END FUNDS
85 PARTNERSHIPS (EQUITY INTERESTS)
86 PASS THROUGH SECURITIES
87 PIKs
88 PRECIOUS METALS RELATD SEC
89 PREFERRED SECURITIES
90 PRIVATE PLACEMENTS
91 REITs
92 REITs: EQUITY
93 REMICs
94 REPO
95 RESET OPTIONS
96 RESTRICTED SECURITIES
97 REVERSE REPO
98 RIGHTS
99 RIGHTS UP TO 5% OF ASSETS
100 SEC OF AFFILI INVEST COMPANIES
101 SEC OF OTHER INVEST COMPANIES
102 SECUR OF ISSUR DOMICILED EX US
103 SEMI-GOVERNMENT SEC
104 SHORT TERM CORPORATE DEBT
105 SHORT TERM INSTRUMENTS
106 SMALL CAP STOCKS
107 SPDRs
108 STANDBY COMMITMENTS
109 STEP COUPON BOND
110 STRIP BONDS
111 STRUCTURED NOTES
112 STRUCTURED PRODUCTS

*FIG. 8B*

113 TENDER OPTION BONDS
114 TRUST CERTIFICATES
115 TRUSTS (EQUITY INTERESTS)
116 UNSEASONED COMP(<3 YRS HIST)
117 US GOVT SECURITIES
118 VARI/FLO RATE SEC: 2 HIGH RAT CAT
119 VARI/FLOATING RATE SECURITIES
120 WARRANTS
121 WARRANTS - 5% MAX NON UNIT/SEC
122 WARRANTS - UP TO 10% OF ASSETS
123 WHEN ISSUED
124 YANKEE BONDS
125 ZEROS
126 ZEROS UP TO 10% OF ASSETS MAX

SAI RESTRICTIONS: FUNDS MAY ENGAGE IN:
1 CAPS (OPTIONS)
2 CASH SET OPT ON EQUITY IND SWAPS
3 CASH SET OPT ON INT RATE SWAPS
4 COLLARS (OPTIONS)
5 CON SEC NO BK OBLG LIM
6 FLOORS (OPTIONS)
7 FOREIGN CURR SPOT TRANSACTIONS
8 FOREIGN CURRENCY K
9 FORWARD CURRENCY K
10 FORWARD FOREIGN CURRENCY K
11 FORWARD K
12 FUT K - CURRENCY
13 FUT K - FINANCIALS
14 FUT K - INTEREST RATES
15 FUT K - SECURITIES
16 FUT K - STOCK INDEX
17 FUT K - US TRADED
18 FUT K/OPT FUT K - DOM/FOR
19 FUT K/OPT FUT K - FOREIGN EXCH
20 FUT K/OPT FUT K - US EXCH
21 FUTURES
22 LEND SECURITIES FOR CASH MGMT
23 OPT: FOREIGN CURR
24 OPT: FUT K - CURRENCY
25 OPT: FUT K - INTEREST RATES
26 OPT: FUT K - SECURITIES
27 OPT: FUT K - US TRADED
28 OPT: INTEREST RATE INDEX
29 OPT: INTEREST RATES
30 OPT: STOCK INDEX FUT K
31 OPT: YIELD CURVE
32 OPTION MAX: AGG PREM 5% MAX
33 OPTION MAX: VALUE 20% ASSETS
34 OPTIONS

35 OPTIONS ON FUTURES
36 OPTIONS ON SWAPS
37 PUR P/C STK IND TRAD EXCH/OTC
38 PUR PUT & CALL OPT: SEC INDEX
39 PUR PUT & CALL OPT: SECURITIES
40 PUR/SELL SPREAD TRANSACTIONS
41 PUR/WRIT COV PUT/CALL CURRENCY
42 PUR/WRIT COV PUT/CALL FUT K
43 PUR/WRIT COV PUT/CALL SECURITIES
44 PUR/WRIT COV PUT/CALL STOCK INDEX
45 PUR/WRIT COV PUT/CALL YC OPT
46 PUR/WRIT PUT/CALL - FOREIGN EXCH
47 PUR/WRIT PUT/CALL - US EXCH
48 PUR/WRIT PUT/CALL FOREIG CUR FUT K
49 PUR/WRIT PUT/CALL FOREIGN CURREN
50 PUR/WRIT PUT/CALL FOREIGN SEC
51 PUR/WRIT PUT/CALL FOREIGN STK IND
52 PUR/WRIT PUT/CALL SECURITIES
53 PUR/WRIT PUT/CALL STOCK INDEX
54 PURCHASE SECURITIES ON MARGIN
55 SH SALE AG BOX <15% ASSETS
56 SHORT SALES
57 SHORT SALES AGAINST BOX
58 SPREAD TRANS: 5% ASSETS MAX
59 SWAPS
60 SWAPS: CREDIT DEFAULT
61 SWAPS: CURRENCY
62 SWAPS: CURRENCY EXCH RATE
63 SWAPS: EQUITY INDEX
64 SWAPS: INTEREST RATE
65 SWAPS: INTEREST RATE INDEX
66 SWAPS: TOTAL RETURN
67 WRITE COVERED CALL
68 WRITE SECURED PUT OPTIONS

SAI RESTRICTIONS: FUNDS MAY NOT INVEST IN:
1 BRADY BONDS
2 FUTURE CONTRACTS
3 ISSUE SENIOR SEC
4 LOAN PARTICIPATIONS
5 OPTIONS ON FUTURE CONTRACTS
6 OPTIONS ON SECURITIES
7 PRIVATE PLACEMENTS
8 RESET OPTIONS
9 RESTRICTED SECURITIES
10 REVERSE REPOS
11 SWAPS
12 VARI/FLOATING RATE SEC
13 YC OPTIONS

| Sub Advisor Responsibility | Prior Art | Present Invention | Impact on Sub Advisor |
|---|---|---|---|
| Portfolio Management | ☒ | | No Impact |
| Regulatory Compliance | ☒ | ☒ | Shared Responsibility with Sponsoring Organization; Regulatory Guidance and Best Practices to Emerge |
| Regulatory Reporting | ☒ | ☒ | No Impact |
| Marketing Support | ☒ | ☒ | No Impact |
| Trades – Order Entry | ☒ | ☒ | No Impact |
| Trades – Order Strategy | ☒ | PM Option | Lower Expense, Less Operating Risk with Flexibility to PM |
| Trades – Order Routing | ☒ | High Touch | Lower Expense, Less Operating Risk |
| Trades – Execution | ☒ | | Lower Expense, Less Operating Risk |
| Best Execution | ☒ | | Lower Expense, Less Operating Risk |
| Select Executing Brokers | ☒ | | Lower Expense, Less Operating Risk |
| Soft Dollars for Research | ☒ | | Fewer Research Dollars and Elimination of SEC Related Issues |
| Trades – Aggregation across Accounts | ☒ | | Lower Expense, Less Operating Risk |
| Trades – Average Weighted Price | ☒ | | Lower Expense, Less Operating Risk |
| Trades – Allocation to Accounts | ☒ | | Lower Expense, Less Operating Risk |
| Trades – Reconciliation | ☒ | | Lower Expense, Less Operating Risk |
| Trades – Administration | ☒ | | Lower Expense, Less Operating Risk |
| Receive Holdings and Transaction File | | ☒ | Modify Process, But No Substantial Impact |
| Sub Advisory Fees | ☒ | ☒ | No Impact |
| Direction by Advisor Fund Board | ☒ | ☒ | No Impact |

| OVERALL IMPACT: Sub Advisors and Present Invention | |
|---|---|
| Positive | Negative |
| ☒ Lower Operational, Administration and Personnel Costs | ☒ Fewer Soft Dollars |
| ☒ Reduced Trade Aggregation and Allocation Error Cost | ☒ Implement Trade Rotation Order |
| ☒ Superior Fund Performance | ☒ Less Order Flow to Executing Brokers |
| ☒ Elimination of SEC Related Soft Dollar Issues | |
| ☒ No Reductions in Sub Advisory Fees | |
| ☒ Smaller Trading Blocks for Proprietary Accounts | |
| ☒ Eliminate Soft Dollar Accounting Group | |
| ☒ Portfolio Manager (PM) Retains Flexibility on Trade Strategies | |

Figure 15

AEGON/Transamerica
AIG/SunAmerica
Allianz
Allstate
American National
Ameritas
AXA Financial/MONY
Chase Insurance
Conseco
CUNA
Farmers
Fidelity Investments
Fidelity Insurance
First Investors Life
Genworth
Great West
Guardian Life
Hartford Life
Horace Mann Life IDS
ING
Integrity Life
Jackson National
John Hancock Manulife
Kansas City Life
Kemper Insurance
Lincoln Financial
Lincoln National
Massachusetts Mutual
Merril Lynch Life
Metropolitan Life
Midland
Minnesota Life
Mutual of America
Mutual of Omaha
National Life
Nationwide
New York Life Northwestern Mutual
Ohio National
Pacific Life
Penn Mutual
Phoenix Life
Principal Global
Protective Life
Prudential Insurance
RBC Insurance
Security Benefit
Southern Farm Bure
Sun Life/Keyport
Thrivent Financial
TIAA-CREF
Union Central Life
USAA Life

Figure 16A

| | | |
|---|---|---|
| AARP Funds | Chesapeake Funds | Flex Funds |
| Activa Funds | CitiFunds | FMI Funds |
| Adelante Funds | Citizens Funds | Forum Funds |
| Adirondack Funds | Claymore Funds | Forward Funds |
| Advantus Funds | Clipper Fund | 40/86 Funds |
| Advisors Inner Circle Funds | CM Advisors Funds | FPA Funds |
| Advisors Series Trust | CNI Charter Funds | Franklin Templeton Funds |
| AFBA Five Star Funds | Cohen & Steers Funds | Frontier Funds |
| AIM Funds | Columbia Acorn Funds | Gabelli Funds |
| Alger Funds | Columbia Funds | Gartmore Funds |
| Allegiant Funds | Columbus Funds | Gateway Funds |
| AllianceBernstein Funds | Commerce Funds | GE Funds |
| Allianz Funds | Concorde Funds | Goldman Sachs Trust |
| American Beacon Funds | Constellation Funds | Granum Trust |
| American Century Funds | Consulting Group Capital Funds | Green Century Funds |
| American Funds | CornerCap Funds | Greenspring Fund |
| American Growth Fund | Country Funds | GuideStone Funds |
| Aquila Funds | Coventry Group | Hafler Pope USX China Fund |
| Ariel Funds | CRM Funds | Hansberger Institutional Funds |
| Aston Funds | Cutter Trust | Harbor Funds |
| Atlantic Whitehall Funds | Davis Funds | Hartford Funds |
| Atlas Funds | Dean Funds | Heartland Group |
| Ave Maria Funds | Delaware Funds | Henderson Global Funds |
| Badgley Funds | Deutsche Funds | Heritage Funds |
| Baird Funds | DFA Funds | Highland Funds |
| Barclays Global Funds | Diamond Hill Funds | HighMark Funds |
| Baron Funds | Dividend Growth Trust | Hilliard-Lyons Funds |
| Baxter Financial Funds | Dodge & Cox Funds | Hillman Funds |
| BB&T Mutual Funds | Domini Funds | Homestead Funds |
| BBH Funds | Drake Funds | Hotchkis and Wiley Funds |
| Bishop Street Funds | Dreyfus Founders Funds | HSBC Funds |
| Bjurman, Barry Funds | Driehaus Funds | Huntington Funds |
| Blackrock Funds | Eaton Vance Funds | ICAP Funds |
| BNY Hamilton Funds | Eclipse Funds | ICON Funds |
| Brandywine Funds | Elfun Funds | ING Funds |
| Brazos Mutual Funds | Elite Funds | Integrity Funds |
| Bridges Investment Fund | Enterprise Funds | Ironwood Funds |
| Bridgeway Funds | EquiTrust Funds | iShares Funds |
| Bullfinch Funds | E*TRADE Funds | Ivy Funds |
| Burnham Investors Trust | Evergreen Funds | IXIS Funds |
| Calamos Funds | Excelsior Funds | Janus Funds |
| Calvert Funds | Exeter Funds | Japan Fund |
| Capital One Funds | FAM Funds | JennisonDryden Funds |
| Capstone Funds | Federated Funds | John Hancock Funds |
| Catholic Funds | Fidelity Advisor Funds | Johnson Funds |
| Causeway Capital Trust | Fidelity Funds | JPMorgan Funds |
| Century Funds | First American Funds | Julius Baer Funds |
| CCM Funds | First Eagle Funds | Kelmoore Funds |
| Chaconia Funds | First Investors Funds | Keystone Funds |
| | First Pacific Funds | Kobren Insight Funds |

Figure 16B

Kapp Funds
Lazard Rosenberg Funds
Lazard Funds
Legg Mason Funds
LKCM Funds
Longleaf Funds
Loomis Sayles Funds
Lord Abbett Funds
Lou Holland Trust
Mainstay Funds
Mairs and Power Funds
Managers Funds
Market Vectors Trust
Marshall Funds
Marsico Funds
MassMutual Funds
Masters Select Funds
Matthew 25 Fund
Matthews Funds
McMorgan Funds
Meehan Funds
Mellon Funds
MEMBERS Funds
Mercantile Funds
Merrimac Funds
MetLife Investment Funds
Metzler/Payden Funds
MFS/Compass Funds
MGI Funds
Midas Funds
Monteagle Funds
Morgan Keegan Fund
Morgan Stanley Funds
Mosaic Funds
MTB Funds
Muhlenkamp Fund
Munder Funds
Mutual of America Funds
Navellier Funds
New Alternatives Funds
New Century Funds
New Providence Trust
New River Funds
Nicholas-Applegate Funds
NCC Trust
North Track Trust
Northern Funds
Northern Lights Funds
Nottingham Trust
Nuveen Funds
Oak Value Fund
Oakmark Funds
Oberweis Funds
Olstein Funds Oppenheimer Funds
Optimum Funds
Pacific Advisors Funds
Pacific Capital Funds
Paradigm Funds
Parnassus Funds
Pax World Fund
Payden Funds
Pearl Funds
Penn Street Funds
Perritt Funds
Phoenix-Engemann Funds
Piedmont Funds
PIMCO Funds
Pinnacle Value Fund
Pioneer Funds
PMFM Trust
PowerShares Trust
Prairie Fund
Primary Trend Funds
PRIMECAP Odyssey Funds
Principal Funds
Profit Funds
ProFunds
Progressive Funds
ProShares Trust
Putnam Funds
Quant Funds
Rainier Funds
Regions Morgan Keegan Funds
Reich & Tang Funds
RiverSource Funds
Robeco Funds
Rochdale Funds
Roge Partners Funds
Royce Funds
RS Funds
Russell Funds
Rydex Funds
SA Funds
Salomon Brothers Funds
Saturna Capital Funds
Schroder Funds
Schwartz Value Fund
Select SPDR Trust
Selected Funds
Seligman Funds
Sentinel Funds
Shepherd Street Funds
Sit Funds
Skyline Funds
SM&R Funds
SPARX Funds
SSgA Funds State Farm Funds
STI Classic Funds
Strategic Partners Funds
Stratton Funds
Stratus Funds
streetTRACKS Funds
Summit Funds
Tamarack Funds
TCW Funds
TD Asset Management Funds
Texas Capital Value Funds
Third Avenue Funds
Thomas White Funds
Thompson Plumb Funds
Thornberg Funds
Tilson Trust
Timothy Plan Funds
Touchstone Funds
Transamerica Funds
T. Rowe Price Funds
Turner Trust
Tweedy Browne Fund
UBS Funds
Ultra Series Funds
UMB Scout Funds
Unified Trust
Universal Institutional Funds
USAA Funds
US Global Accolade Funds
Utopia Funds
Van Eck Funds
Van Kampen Funds
Vanguard Funds
Vantagepoint Funds
Victory Portfolios
Viking Funds
Volumetric Fund
Waddell & Reed Funds
Wanger Funds
Wasatch Funds
Weitz Funds
Wells Fargo Funds
WesMark Funds
Western Asset Funds
Westwood Funds
William Blair Funds
Wilmington Funds
WM Funds
World Funds
Wright Funds

Figure 17

Advanced Financial Applications
Advent Software
Aegis Software
Anvil Software
Automated Trading Desk
Bank of America Direct Access Financial
Bank of New York Sonic
Bloomberg
Charles River Development
DST International
EZE Castle Software
Fidessa
Firefly
Future Trade
GL Trade
Goldman Sachs Rediplus
INDATA
Instinet
IRIS Financial
ITG JPMorgan Neovest
Kestral Technologies
Latent Zero
Linedata LongView
Linedata Services
Macgregor
Miletus Trading
Morgan Stanley Passport
Neonet
Orc Software
Reuters
Simcorp
SIS
SS&C Technologies
SunGard
Tethys Technologies
Tora Trading Software
Townsend Analytics
TradingScreen
UNX

Figure 18A

508 Securities
Abel/Noser Corporation 1,2,3,5
ABN Amro 7,8
Access Securities
Adams Harkness Hill
AG Edwards 8
Albert Fried & Co.
Allen & Company
American Technology Research
Automated Trading
Autranet 1,2,3,4,5
Avian Securities 8
Avondale Partners
Bank of America 1,2,8
Bank of Montreal
Bass Trading 8
BB&T Capital Markets
Bear Stearns 1,2,3,6,7,8
Benchmark Company LLC
Bidwell & Company
Bloomberg
Blue Trading
BNP Paribas Securities Corp.
BNY Brokerage, Inc. 1,2,8
Boenning & Scattergood Inc.
Boston Institutional Services
Breen Murray
Bridge Trading Co
B. Riley & Co.
Brokerage America
Brown Brothers Harriman
Brut, LLC
Buckingham Research Group 8
Buckman, Buckman & Reid
Burlington Capital Markets
Butler Wick
Cabrera Capital Markets
CA Cheuvereux
Calyon Securities 8
Cantor Fitzgerald 1
Capital Institutional Services 1,6
Caris & Co.
Carlin Equities
Carnegie Investment Bank AB 7

C.E. Unterberg, Towbin
Cheevers & Company, Inc.
CIBC World Markets
Citigroup Global Markets 1,7,8
CL King 8
Collins Stewart Tullett
Craig Hallum
Credit Suisse 1,2,5,6,7
Crowell Weedon
D.A. Davidson
DeMatteo Monness
Dermott Clancy
Deutsche Bank Securities 1,2,7,8
Direct Access Partners
Direct Trading International
Domestic Securities
E*Trade Securities Limited 7,8
Edgetrade Inc.
Ehrenkrantz King Nussbaumer (EKN)
Empire Financial Group
Fagenson & Co.
Farina and Associates
Feltl & Co.
Ferris, Baker Watts Incorporated
Fidelity Capital Markets 6
Fig Partners
FinTech Securities
Firefly Capital
First Albany Corporation 8
First American Capital
First Clearing Corporation
First Southwest
Flagstone Securities
Fox Pitt Kelper
Friedman, Billings, Ramsey & Company 8
Fulcrum Global Partners
Future Trade Securities
G&L Partners
Gabelli Equities
Garban Corporates
Gardner Rich
GFI Securities
GGET LLC Inc.
Glenwood Securities Goldman Sachs & Company 1,6,7,8
Goldman Sachs Exec/Clear REDI plus
Gordon Haskett Capital Corp.
Great Eastern Securities
Glenwood Securities
Great Lakes Capital
Green Street Advisors
Greentree Brokerage Services, Inc.
Griswold Company, Inc.
Gunn Allen Financial
Guzman & Company
Hibernia Southcoast
Hill, Thompson, Magid
Howard Weill
HSBC 3
Hudson Securities
Instinet Corporation 1,4,7,8
International Correspondent Trading Inc.
International Strategy & Investment Group 8
International Trading
Interstate Group
ITG, Inc. 2,4
Janney Montgomery Scott 8
Jefferies & Company 1,2,8
JMP Securities
JNK Securities
John Seip & Co.
Johnson Rice
Jones Trading 8
J.P. Morgan Chase & Company 1,2,6,7,8
JP Turner
Kabrik Securities Corporation
Kaufman Bros LP
Keefe Bruyette & Woods
Kellogg Partners Institutional Services
Kepler Securities 7
Kevin Dann & Partners
Knight Securities
LaBranche Financial Services
Ladenburg Thalman
Lambright Financial
Lazard Capital Markets
Leerink Swann & Company 8
Lehman Brothers 1,2,7,8

1 = Program Trading   2 = Algorithmic Trading   3 = DMA   4 = Smart Routing   5 = VWAP Engine   6 = Allocations
7 = International   8 = IOIs

Figure 18B

Loop Capital Markets
Lynch Jones Ryan
Magna Securities
Maxcor
Maxim Group, Inc.
Maximum Financial Investment Group
McDonald & Co. 1,8
Melvin Securities
Merrill Lynch 1,2,3,4,5,6,7
Metriman Curhan Ford & Co.
Midwest Research Securities Foundation
Midwood Securities
Miletus Trading
Miller Tabak
MKM Partners
Mogavero Lee & Co.
Montrosa Securities
Moors & Cabot
Morgan Keegan
Morgan Stanley Dean Witter 1,5,7,8
M.R. BEAL
Muriel Siebert
NDX Trading
Needham and Company 8
NeoNet 7
Neuberger Berman
Nomura International
Nomura Securities
Northern Trust
Nutmeg Securities
Oppenheimer & Co. 8
OTA LLC
Pacific American Securities
Pacific Crest
Pacific Growth Equities, LLC
Pali Capital 6
Park Financial Group
Penson Financial Services
Petrie Parkman
Pickering Energy Partners
Pipeline Trading Systems LLC
Piper Jaffrey PolCari Weicker
Prime Executions
Princeton Securities Group
Prudential Securities
Pulse Trading, LLC
Punk, Ziegal & Company
Radnor Research & Trading
Raymond James 8
RBC Capital Markets 3
Reynders Gray
Reynolds Securities
Robbins Henderson
Rochdale Securities
Rodman & Renshaw
Rosenblatt Securities
Roth Capital
RW Baird 8
Ryan Beck 8
Sanders Morris Harris
Sandler O'Neill & Partners LP 8
Sanford C. Bernstein & Co. 2,7,8
Schonfeld IBS
Schwab Capital Markets L.P. 1,6
Schwab Institutional Services
SCORE Securities
Scotia Capital (USA) Inc.
Scott & Stringfellow
Screaming Eagle Trading
Seaboard Securities
SG Americas
SG Cowen 8
SIA S.p.A.
Sidoti & Company 8
Signal Hill Capital Group
Simmons & Company, International
Soleil Securities 8
Source Trading (Access Securities)
Southwest Securities 1
Standard & Poors
Stanford Group Company 8
State Street Global Markets LLC 8
Stephen M. Ferretti, Inc.

Stephens, Inc. 8
Sterne, Agee Capital Markets
Sterne, Agee & Leach, Inc. 8
Stifel Nicholas
Stuart Frankel
SunGard Institutional Brokerage, Inc. 4,6
SunTrust Robinson Humphrey 8
Susquehanna Financial Group
Svenska Handelsbanken 2,7
Sweney Cartwright 6
TD Ameritrade 6
Terra Nova Trading
Themis Trading
Think Equity Partners 8
Thomas Weisel Partners 1,8
Trade Manage
TradeTrek
Tradition Asiel Securities
UBS Financial Services
UBS Warburg 1,3,5,6,7
UNX 2,3
Vendham Securities
Vertical Group
V Finance Investment, Inc.
Visual Trader
Wachovia Securities
Wall Street Access 8
Wave Securities
Wedbush Morgan Securities 8
Weeden & Company 8
White Cap Trading
William Blair
William O'Neill
Williams Capital
Williams Financial Group
Williams Trading
Wilson Davis
WIT Soundview
WJ Bonfanti
WM V Frankel
W.R. Hambrecht & Co.
Yamner & Company, Inc.

1 = Program Trading    2 = Algorithmic Trading    3 = DMA    4 = Smart Routing    5 = VWAP Engine    6 = Allocations
7 = International    8 = IOIs

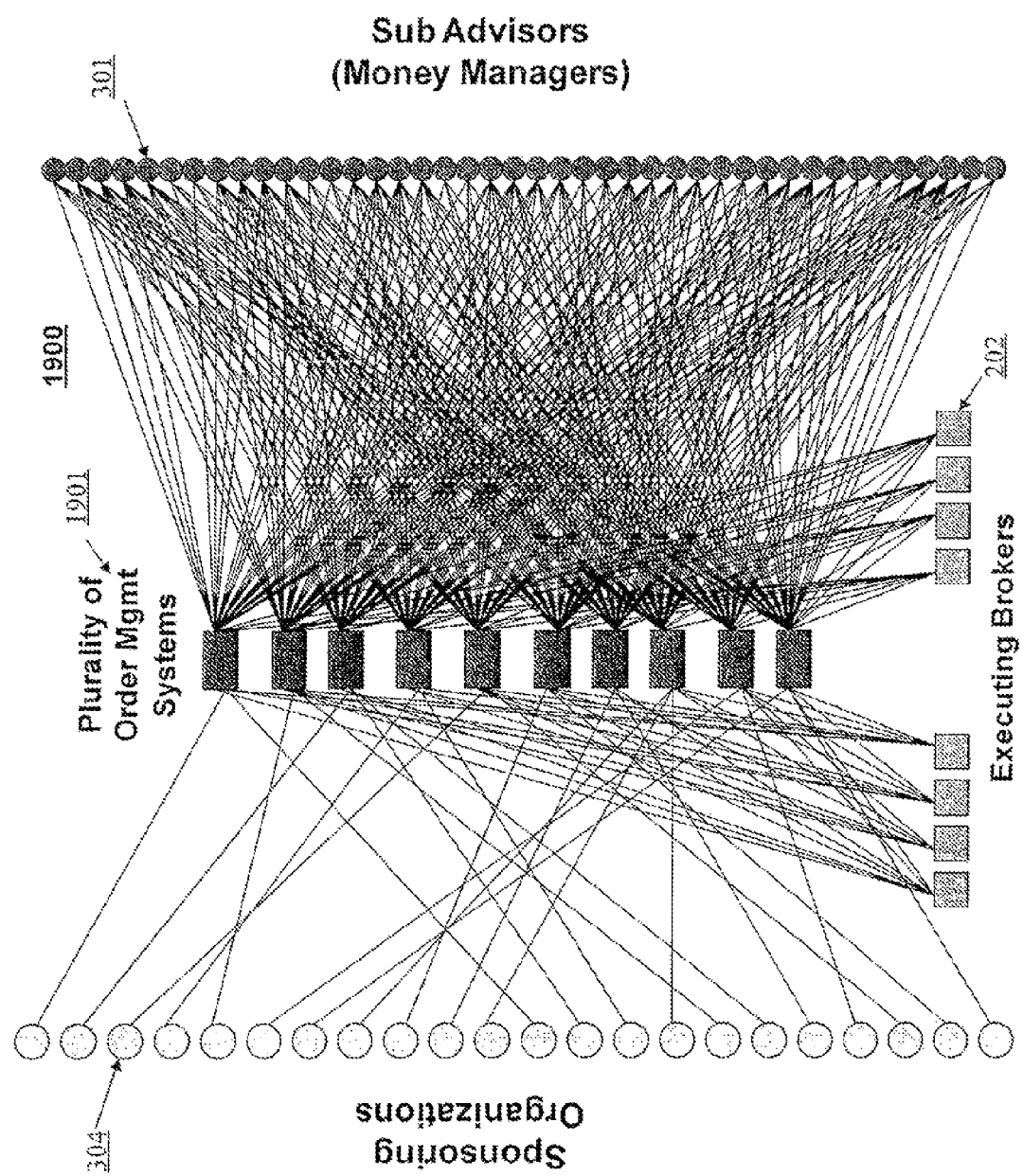

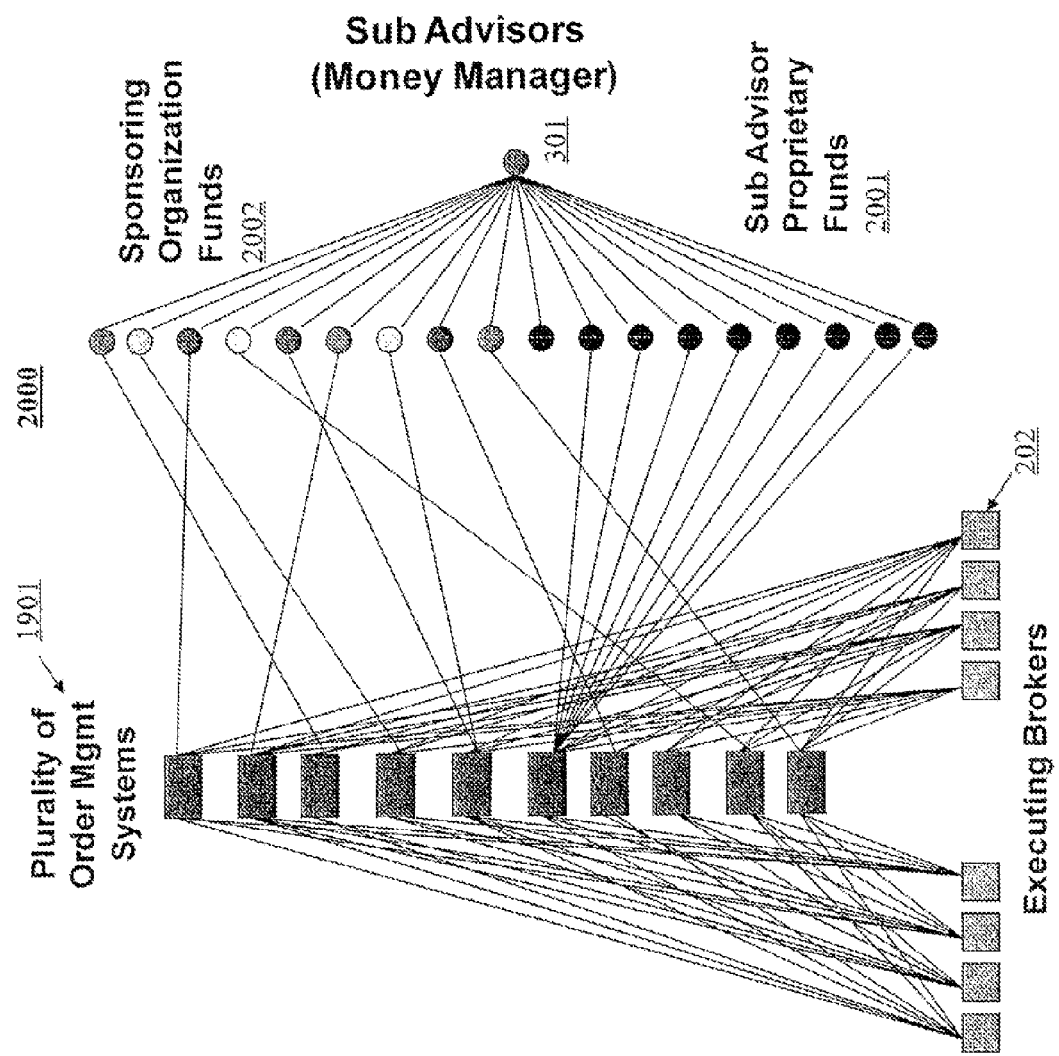

| UAT INC. | | | |
|---|---|---|---|
| TRUST SHAREHOLDER SAVINGS - VARIOUS EXECUTION COSTS | | | |
| TRUST | ASSETS | EXECUTION COSTS / ANNUAL TURN / EFFECTIVE TURN ANNUAL SHARES TRADED | SHAREHOLDER SAVINGS AT EXECUTION COSTS PER SHARE: 1.00 CENTS |
| AXA EQ ADVISORS TRUST | $38.7 BB | 3.26 CENTS / SHARE<br>52% TURN / 123% TURN<br>1.77 BB | $35.8 MM<br>9.24 BPS |
| GREAT WEST MAXIM | $3.5 BB | 2.83 CENTS / SHARE<br>46% TURN / 123% TURN<br>175 MM | $3.2 MM<br>10.05 BPS |
| ING INVESTORS TRUST | $15.2 BB | 2.31 CENTS / SHARE<br>81% TURN / 271% TURN<br>2.0 BB | $12.7 MM<br>8.38 BPS |
| ING PARTNERS TRUST | $9.7 BB | 1.87 CENTS / SHARE<br>56% TURN / 148% TURN<br>585 MM | $3.2 MM<br>3.29 BPS |
| ING VARIABLE TRUST | $0.8 BB | 2.93 CENTS / SHARE<br>100% TURN / 253% TURN<br>130 MM | $1.3 MM<br>16.26 BPS |
| JNL SERIES TRUST | $5.3 BB | 3.00 CENTS / SHARE<br>70% TURN / 164% TURN<br>300 MM | $6.6 MM<br>12.42 BPS |
| MET LIFE SERIES TRUST | $12.7 BB | 3.29 CENTS / SHARE<br>80% TURN / 175% TURN<br>730 MM | $15.9 MM<br>12.51 BPS |
| PACIFIC LIFE SERIES TRUST | $18.9 BB | 2.65 CENTS / SHARE<br>64% TURN / 148% TURN<br>1.2 BB | $15.0 MM<br>7.94 BPS |
| TA DIA TRUST | $13.9 BB | 2.31 CENTS / SHARE<br>84% TURN / 185% TURN<br>960 MM | $12.9 MM<br>9.30 BPS |
| TA IDEX TRUST | $6.7 BB | 3.29 CENTS / SHARE<br>56% TURN / 194% TURN<br>475 MM | $6.6 MM<br>10.00 BPS |
| TA PREMIER TRUST | $1.0 BB | 3.63 CENTS / SHARE<br>46% TURN / 133% TURN<br>28 MM | $0.8 MM<br>7.54 BPS |
| TA AT ST | $12.4 BB | 3.14 CENTS / SHARE<br>54% TURN / 115% TURN<br>460 MM | $8.9 MM<br>7.19 BPS |
| VANGUARD | $228 BB | 3.26 CENTS / SHARE<br>30% TURN / 42% TURN<br>6.7 BB | $96 MM<br>4.23 BPS |

*FIG. 23*

| UAT INC. | | | | | | |
|---|---|---|---|---|---|---|
| AXA EQ ADVISORS TRUST | | | | | | |
| FUND | Equity Assets | Fund Savings at $0.0100 | Bps (yrs) 1 | 3 | 5 | 10 |
| EQ/ALLIANCE COMMON STOCK | $9,544,061,017 | $5,499,920 | 0.0576% | 0.1730% | 0.2885% | 0.5778% |
| EQ/ALLIANCE GROWTH AND INCOME | $2,945,661,448 | $2,150,290 | 0.0730% | 0.2192% | 0.3655% | 0.7324% |
| EQ/ALLIANCE INTERNATIONAL | $2,908,706,533 | $1,797,459 | 0.0618% | 0.1855% | 0.3094% | 0.6197% |
| EQ/ALLIANCE LARGE CAP GROWTH | $1,084,968,184 | $884,096 | 0.0815% | 0.2447% | 0.4081% | 0.8179% |
| EQ/ALLIANCE SMALL CAP GROWTH | $1,186,076,948 | $1,955,185 | 0.1648% | 0.4953% | 0.8269% | 1.6607% |
| EQ/ARIEL APPRECIATION II | $8,800,422 | $4,565 | 0.0519% | 0.1557% | 0.2596% | 0.5199% |
| EQ/BERNSTEIN DIVERSIFIED VALUE | $3,384,894,280 | $1,908,036 | 0.0564% | 0.1692% | 0.2822% | 0.5651% |
| EQ/BOSTON ADVISORS EQUITY INCOME | $351,167,637 | $5,953,153 | 1.6952% | 5.1724% | 8.7685% | 18.3069% |
| EQ/CALVERT SOCIALLY RESPONSIBLE | $72,186,794 | $15,074 | 0.0209% | 0.0627% | 0.1045% | 0.2090% |
| EQ/CAPITAL GUARDIAN GROWTH | $288,290,179 | $139,181 | 0.0483% | 0.1449% | 0.2416% | 0.4838% |
| EQ/CAPITAL GUARDIAN INTERNATIONAL | $903,942,832 | $232,360 | 0.0257% | 0.0771% | 0.1286% | 0.2573% |
| EQ/CAPITAL GUARDIAN RESEARCH | $1,014,200,971 | $526,839 | 0.0519% | 0.1559% | 0.2600% | 0.5207% |
| EQ/CAPITAL GUARDIAN US EQUITY | $1,125,258,703 | $496,627 | 0.0441% | 0.1325% | 0.2209% | 0.4422% |
| EQ/EVERGREEN OMEGA | $183,521,896 | $394,271 | 0.2148% | 0.6459% | 1.0788% | 2.1692% |
| EQ/FI MID CAP | $1,329,503,604 | $3,406,775 | 0.2562% | 0.7705% | 1.2874% | 2.5914% |
| EQ/FI MID CAP VALUE | $1,670,919,567 | $1,841,669 | 0.1102% | 0.3310% | 0.5523% | 1.1077% |
| EQ/GAMCO M&A | $28,354,530 | $0 | 0.0000% | 0.0000% | 0.0000% | 0.0000% |
| EQ/GAMCO SMALL COMPANY VALUE | $515,487,003 | $373,124 | 0.0724% | 0.2173% | 0.3624% | 0.7262% |
| EQ/INTERNATIONAL GROWTH | $71,562,554 | $0 | 0.0000% | 0.0000% | 0.0000% | 0.0000% |
| EQ/JANUS LARGE CAP GROWTH | $348,036,345 | $180,374 | 0.0518% | 0.1556% | 0.2594% | 0.5195% |
| EQ/JPMORGAN VALUE OPPORTUNITIES | $590,377,574 | $620,643 | 0.1051% | 0.3157% | 0.5267% | 1.0563% |
| EQ/LORD ABBETT GROWTH AND INCOME | $36,036,775 | $159 | 0.0004% | 0.0013% | 0.0022% | 0.0044% |
| EQ/LORD ABBETT LARGE CAP CORE | $25,948,219 | $0 | 0.0000% | 0.0000% | 0.0000% | 0.0000% |
| EQ/LORD ABBETT MID CAP VALUE | $119,642,657 | $26,410 | 0.0221% | 0.0662% | 0.1104% | 0.2210% |
| EQ/MARSICO FOCUS | $2,762,365,908 | $1,882,582 | 0.0682% | 0.2046% | 0.3412% | 0.6836% |
| EQ/MERCURY BASIC VALUE EQUITY | $2,721,029,640 | $2,979,284 | 0.1095% | 0.3288% | 0.5487% | 1.1003% |
| EQ/MERCURY INTERNATIONAL VALUE | $1,377,985,653 | $373,193 | 0.0271% | 0.0813% | 0.1355% | 0.2712% |
| EQ/MFS EMERGING GROWTH COMPANIES | $891,935,789 | $1,524,287 | 0.1709% | 0.5136% | 0.8574% | 1.7222% |
| EQ/MFS INVESTORS TRUST | $334,166,185 | $221,151 | 0.0662% | 0.1987% | 0.3313% | 0.6638% |
| EQ/MONTAG & CALDWELL GROWTH | $306,921,252 | $214,038 | 0.0697% | 0.2094% | 0.3492% | 0.6996% |
| EQ/TCW ADVISORS TRUST | $297,491,133 | $71,006 | 0.0239% | 0.0716% | 0.1194% | 0.2389% |
| EQ/UBS GROWTH AND INCOME | $165,864,516 | $105,372 | 0.0635% | 0.1907% | 0.3180% | 0.6371% |
| EQ/VAN KAMPEN COMSTOCK | $104,336,286 | $0 | 0.0000% | 0.0000% | 0.0000% | 0.0000% |
| EQ/VAN KAMPEN MID CAP GROWTH | $48,252,946 | $0 | 0.0000% | 0.0000% | 0.0000% | 0.0000% |
| EQ/WELLS FARGO MONTGOMERY SMALL CAP | $13,290,731 | $42,056 | 0.3164% | 0.9523% | 1.5922% | 3.2097% |
| TOTAL | $38,761,246,711 | $35,818,178 | 0.0924% | 0.2775% | 0.4629% | 0.9279% |
| WEIGHTED AVERAGE POTENTIAL FUND SAVINGS | | 0.0924% | | | | |

UAT Inc.
Met Life Series Funds - Equity Funds and Positions

| Fund | Equity Assets | Fund Savings at $0.0100 | Bps (yrs) 1 | 3 | 5 | 10 |
|---|---|---|---|---|---|---|
| Blackrock Investment Trust | $1,787,332,622 | $1,499,624 | 0.0639% | 0.2519% | 0.4202% | 0.8422% |
| Blackrock Large Cap Value | $137,031,040 | $98,435 | 0.0718% | 0.2157% | 0.3597% | 0.7208% |
| Blackrock Legacy Lg Cap Growth | $535,765,124 | $859,527 | 0.1595% | 0.4793% | 0.8000% | 1.6065% |
| FI Value Leaders | $635,701,202 | $943,339 | 0.1464% | 0.4438% | 0.7442% | 1.4939% |
| Harris Oakmark Large Cap Value | $583,427,963 | $130,297 | 0.0223% | 0.0670% | 0.1117% | 0.2236% |
| Jennison Growth | $1,098,598,665 | $840,427 | 0.0765% | 0.2297% | 0.3831% | 0.7676% |
| T. Rowe Price Large Cap Growth | $434,589,971 | $209,491 | 0.0482% | 0.1447% | 0.2413% | 0.4831% |
| Blackrock Aggressive Growth | $1,000,849,928 | $1,592,435 | 0.1591% | 0.4781% | 0.7981% | 1.6025% |
| FI Mid Cap Opportunities | $1,078,017,392 | $2,197,660 | 0.2039% | 0.6128% | 1.0235% | 2.0574% |
| Harris Oakmark Focused Value | $1,815,679,185 | $693,921 | 0.0382% | 0.1150% | 0.1918% | 0.3839% |
| Neuberger Berman Mid Cap Value | $771,036,318 | $394,464 | 0.0512% | 0.1536% | 0.2561% | 0.5128% |
| Blackrock Strategic Value | $994,632,666 | $4,826,630 | 0.4853% | 1.4629% | 2.4500% | 4.9600% |
| Franklin Temple Small Cap Growth | $122,676,396 | $104,118 | 0.0849% | 0.2548% | 0.4250% | 0.8518% |
| Loomis Sayles Small Cap | $473,003,522 | $1,064,230 | 0.2250% | 0.6765% | 1.1300% | 2.2725% |
| Oppenheimer Global Equity | $304,431,952 | $0 | 0.0000% | 0.0000% | 0.0000% | 0.0000% |
| T. Rowe Price Small Cap Growth | $402,974,834 | $187,012 | 0.0464% | 0.1393% | 0.2323% | 0.4650% |
| FI International Stock | $597,672,090 | $339,681 | 0.0568% | 0.1706% | 0.2845% | 0.5696% |
| Total | $12,776,393,599 | $15,983,059 | 0.1251% | 0.3758% | 0.6271% | 1.2580% |

Figure 24C

UAT Inc.
Transamerica IDEX Mutual Funds

| Fund | Equity Assets | Fund Savings at $0.0100 | Bps (yrs) 1 | 3 | 5 | 10 |
|---|---|---|---|---|---|---|
| Amer Century International | $43,193,000 | $4,289,247 | 0.9913% | 3.0040% | 5.0566% | 10.3690% |
| Amer Century Large Comp Value | $2,84,983,000 | $84,257 | 0.0318% | 0.0954% | 0.1591% | 0.3184% |
| Clarion Global Real Estate | $222,460,000 | $0 | 0.0000% | 0.0000% | 0.0000% | 0.0000% |
| Evergreen Intl Small Cap | $387,163,000 | $0 | 0.0000% | 0.0000% | 0.0000% | 0.0000% |
| Great Companies - America | $91,966,000 | $159,342 | 0.1733% | 0.5207% | 0.8693% | 1.7462% |
| Great Companies - Technology | $72,950,000 | $156,599 | 0.2147% | 0.6454% | 1.0780% | 2.1675% |
| Janus Growth | $1,040,214,000 | $896,723 | 0.0862% | 0.2583% | 0.4318% | 0.8654% |
| Jennison Growth | $145,525,000 | $132,981 | 0.0914% | 0.2744% | 0.4577% | 0.9176% |
| Marsico Growth | $144,392,000 | $123,202 | 0.0853% | 0.2562% | 0.4274% | 0.8565% |
| Marsico International Growth | $364,147,000 | $820,079 | 0.2252% | 0.6771% | 1.1311% | 2.2750% |
| Protected Principal Stock | $46,412,000 | $31,855 | 0.0687% | 0.2067% | 0.3447% | 0.6906% |
| Salomon All Cap | $231,719,000 | $927,738 | 0.4004% | 1.2056% | 2.0180% | 4.0766% |
| Salomon Investors Value | $90,385,000 | $441,301 | 0.4882% | 1.4719% | 2.4652% | 4.9911% |
| Evergreen Health Sciences | $427,736,701 | $531,412 | 0.1242% | 0.3732% | 0.6227% | 1.2493% |
| T Rowe Price Small Cap | $30,852,000 | $89,972 | 0.2921% | 0.8789% | 1.4690% | 2.9597% |
| T Rowe Price Tax Efficient Growth | $17,272,000 | $1,784 | 0.0103% | 0.0310% | 0.0517% | 0.1034% |
| Templeton Great Comp Global | $285,352,000 | $531,385 | 0.1862% | 0.5597% | 0.9345% | 1.8779% |
| Mercury Large Cap Value | $400,962,000 | $0 | 0.0000% | 0.0000% | 0.0000% | 0.0000% |
| JP Morgan Mid Cap Value | $215,434,000 | $61,584 | 0.0285% | 0.0858% | 0.1430% | 0.2862% |
| UBS Large Cap Value | $183,371,000 | $111,776 | 0.0610% | 0.1830% | 0.3052% | 0.6113% |
| Van Kampen Small Comp Growth | $269,782,000 | $0 | 0.0000% | 0.0000% | 0.0000% | 0.0000% |
| Transamerica Balanced | $182,774,000 | $51,183 | 0.0280% | 0.0840% | 0.1401% | 0.2804% |
| Transamerica Equity | $648,063,000 | $114,723 | 0.0177% | 0.0531% | 0.0885% | 0.1772% |
| Transamerica Growth Opportun | $378,577,000 | $503,278 | 0.1329% | 0.3992% | 0.6665% | 1.3374% |
| Transamerica Small/Mid Cap Valu | $488,504,000 | $452,464 | 0.0926% | 0.2781% | 0.4640% | 0.9301% |
| Transamerica Value Balanced | $46,666,000 | $37,447 | 0.0811% | 0.2434% | 0.4059% | 0.8135% |
| Total | $6,722,823,701 | $6,691,453 | 0.0995% | 0.2989% | 0.4987% | 0.9998% |

Figure 24D

UAT Inc.
JNL SERIES TRUST

| Fund | Equity Assets | Fund Savings at $0.0100 | Bps (yrs) 1 | 3 | 5 | 10 |
|---|---|---|---|---|---|---|
| JNL/AIM Large Cap Growth | $356,477,000 | $497,174 | 0.1226% | 0.3684% | 0.6147% | 1.2332% |
| JNL/AIM Real Estate | $79,754,000 | $80,659 | 0.1094% | 0.3284% | 0.5480% | 1.0990% |
| JNL/AIM Small Cap Growth | $43,116,000 | $46,441 | 0.1007% | 0.3023% | 0.5044% | 1.0113% |
| JNL Alger Growth | $246,487,000 | $1,085,271 | 0.4403% | 1.3267% | 2.2269% | 4.4912% |
| JNL/Eagle Core Equity | $231,369,000 | $561,116 | 0.2425% | 0.7293% | 1.2185% | 2.4518% |
| JNL/Eagle Small Cap Equity | $157,970,000 | $311,847 | 0.1974% | 0.5944% | 0.9939% | 1.9917% |
| JNL/FMR Capital Growth (MC-Equity) | $209,228,000 | $605,370 | 0.2893% | 0.8705% | 1.4551% | 2.9313% |
| JNL/Franklin Temp Small Cap Value | $56,973,000 | $4,371 | 0.0074% | 0.0222% | 0.0371% | 0.0741% |
| JNL/Goldman Sachs Mid Cap Value | $83,665,000 | $46,251 | 0.0553% | 0.1659% | 0.2767% | 0.5542% |
| JNL/JP Morgan International Equity | $197,450,000 | $0 | 0.0000% | 0.0000% | 0.0000% | 0.0000% |
| JNL/JP Morgan International Value | $221,655,000 | $152,961 | 0.0690% | 0.2072% | 0.3455% | 0.6922% |
| JNL/Lazard Mid Cap Value | $220,007,000 | $304,551 | 0.1384% | 0.4159% | 0.6941% | 1.3929% |
| JNL/Lazard Small Cap Value | $193,571,000 | $489,418 | 0.2527% | 0.7600% | 1.2699% | 2.5560% |
| JNL/Oppenheimer Global Growth | $279,473,000 | $91,293 | 0.0327% | 0.0980% | 0.1634% | 0.3271% |
| JNL/Oppenheimer Growth | $28,062,000 | $21,046 | 0.0750% | 0.2252% | 0.3756% | 0.7526% |
| JNL Putnam Equity | $161,057,000 | $280,159 | 0.1739% | 0.5228% | 0.8728% | 1.7532% |
| JNL/Putnam Mid Cap Growth | $36,462,000 | $38,207 | 0.1042% | 0.3129% | 0.5220% | 1.0467% |
| JNL/Putnam Value Equity | $183,518,500 | $192,202 | 0.1047% | 0.3145% | 0.5248% | 1.0523% |
| JNL/Select Large Cap Growth | $214,991,000 | $184,100 | 0.0856% | 0.2571% | 0.4289% | 0.8596% |
| JNL/Select Value | $273,313,000 | $76,726 | 0.0281% | 0.0842% | 0.1404% | 0.2811% |
| JNL/T Rowe Price Estab Growth | $711,037,000 | $452,878 | 0.0637% | 0.1912% | 0.3199% | 0.6389% |
| JNL/T Rowe Price Mid Cap Growth | $605,567,000 | $235,782 | 0.0389% | 0.1169% | 0.1948% | 0.3900% |
| JNL/T Rowe Price Value | $532,338,000 | $213,818 | 0.0402% | 0.1205% | 0.2010% | 0.4024% |
| Total | $5,324,661,500 | $5,913,442 | 0.1111% | 0.3335% | 0.5565% | 1.1143% |

SYSTEM AND METHOD FOR FACILITATING UNIFIED TRADING AND CONTROL FOR A SPONSORING ORGANIZATION'S MONEY MANAGEMENT PROCESS

This application is a continuation of U.S. application Ser. No. 13/020,121, filed Feb. 3, 2011, which is a continuation of U.S. application Ser. No. 12/700,218, filed Feb. 4, 2010, now U.S. Pat. No. 7,912,783, which is a continuation of U.S. application Ser. No. 11/783,690, filed Apr. 11, 2007, now U.S. Pat. No. 7,685,057, which claims the benefit of U.S. Provisional Application No. 60/791,209, filed Apr. 12, 2006, and U.S. Provisional Application No. 60/899,393, filed Feb. 5, 2007, all of which are herein incorporated by reference in their entirety.

BACKGROUND

Field of the Invention

The present invention relates to the management and trading of investment portfolios and, in particular, to a system, method, process, software and standards for facilitating a sponsoring organization's unified trading and control of a money management process.

More particularly, an embodiment of the present invention provides a system (e.g., a hosted application), method (organization of activity), process (division of responsibilities), software (computer based systems), and standards (systems, connectivity and protocols) supporting a real-time process inclusive of computer interfaces, order entry, compliance analysis, market impact analysis, order routing discretion, execution cost and quality analysis, trade processing, communications engines, communications networks, and communications protocols that facilitate centralized portfolio management, directed brokerage control, and direct and automated compliance monitoring, and creates substantial and recurring savings for shareholders in mutual funds and beneficiaries in institutional investment accounts such as pension plans. This system (referred to as the unified trading and control system), method, process, software, and standards are applicable to registered mutual funds, non-registered mutual funds, and institutional investment portfolios and could be, for example, utilized by: (1) insurance companies with single or multi-manager sub advised variable insurance, mutual fund, and defined contribution portfolios; (2) mutual fund companies utilizing sub advisors for managing their mutual fund offerings, education funding, and defined contribution portfolios; (3) defined benefit plan pension funds, trusts, and endowments that utilize externally managed or unaffiliated money management services; (4) large company investment portfolios and separate accounts of insurance companies that utilize outsourced or unaffiliated money management services for their institutional investment accounts; and (5) non-registered mutual funds such as hedge funds, group annuities, and collective investment funds that utilize outsourced or unaffiliated money management services.

DEFINITIONS

For purposes of describing the present invention, FIG. 1 lists components of the present invention and compares the corresponding terminology used in the investment products within the registered mutual fund, unregistered mutual fund, and institutional investment portfolio markets. FIG. 1 shows that similar structures and responsibilities in various product categories have different names.

As used herein, the terms "advisor" and "board of trustees" in the context of registered and non registered mutual funds can be considered the equivalent of the "administrator" and "board of trustees" in the context of pension plan, endowment, or trust investment portfolios; the term "sub advisor" in the context of registered and non registered mutual funds can be considered the equivalent of a "money manager" or "externally managed" in the context of pension plan, endowment, or trust investment portfolios; and the term "sub account" in the context of a variable insurance product can be considered equivalent to a "mutual fund" in a defined contribution plan (such as a 401(k) product) and a pension plan's "account" with a money manager. In addition, the retail investors (for example, the individual persons whose personal accounts aggregate and are comingled into the assets comprising a fund's investment portfolio) are referred to as "shareholders" in registered and unregistered mutual funds and as "beneficiaries" in institutional accounts, pension plans, etc. It is important to note that the advisor or administrator and associated board of trustees (boards) have a fiduciary responsibility to the shareholders and beneficiaries to properly control (minimize) fund and plan operating expenses, as these expenses reduce the returns (performance) of the investment portfolios to these same fund shareholders and plan beneficiaries. The use herein of any of these terms, as shown in FIG. 1, implies a similar underlying method and process applicable across registered mutual funds, unregistered mutual funds, and institutional investment portfolios.

BACKGROUND OF THE INVENTION

"Sub advised" assets utilize asset management services from asset managers (also referred to as "sub advisors" or "money managers") that are external or unaffiliated with the organization that is responsible for sponsoring the investment product, such as an insurance company, pension plan, or other financial institution. Many large and small financial institutions outsource, in part or whole, the responsibility of managing money for their investment portfolios to outside organizations in order to capitalize on the expertise of the asset management organizations and to enable the financial institutions to focus on their core competencies. The approximate assets in the investment industry by various markets, along with their sub advised assets, are summarized in Table 1 below.

TABLE 1

Investment Industry Assets

| Industry | Date | Total Assets | Sub Advised/ Externally Managed | Source |
|---|---|---|---|---|
| Variable Insurance | December 2005 | $1.3 TR | $360 BB | NAVA, FRC |
| Mutual Funds | December 2005 | $10.1 TR | $865 BB | ICI, FRC |
| Pension Plans | December 2006 | $4.7 TR | $3.6 TR | P&I |

As an illustration, insurance companies offering variable annuity products usually provide between thirty and sixty investment options ("sub accounts" or "funds") to retail investors for purposes of implementing an investor's asset allocation strategy. These investment options are similar to mutual funds in legal structure and operations and are required by the SEC to register as mutual funds. An insurance company (functioning as the "advisor") usually contracts with a number of mutual fund companies or institutional asset management firms to provide asset management services as a "sub advisor" (or asset manager or money manager) for these mutual fund-type investment options (called "sub accounts" in variable insurance products). A single mutual fund company or institutional asset management firm may sub advise (manage) between one and five of the thirty to sixty investment options available to retail investors in a single variable insurance product (such as a variable annuity).

The sub advisor is paid according to an annual fee schedule based on assets in the fund or investment portfolio. The sub advisor is paid to manage the assets (determine which securities to hold in the fund or portfolio and make related buy and sell trading decisions), but is not required to provide client service and administrative functions such as opening and closing client accounts, processing contributions and withdrawals on behalf of clients, processing movement of funds between sub accounts (as an investor buys and sells funds within the annuity product), handling calls and special service requests from clients, maintaining client addresses, providing tax reporting to clients, and printing and mailing client statements. Thus, in a sub advisory relationship, the client service and administrative functions (including extensive back office system processing required to support these functions) are provided through the sponsoring organization (advisor) for the investment product, such as an insurance company, pension plan, or other financial institution (and not the sub advisor). A sub advisor's fee for managing the fund or account may vary with the type of assets, the selected investment strategy, and the size of the investment portfolio, but an annual fee of 0.50% (fifty basis points or one-half of one percent) on assets is fairly common.

The trading of stocks and bonds by sub advisors in a sub advised fund or investment account is a complex process. The sub advisor (mutual fund company and/or money management firm) not only controls the selection of the stocks and bonds to buy and sell, but also controls where and how each trade is executed (within regulatory requirements). Thus, the sub advisor utilizes "step out trades," whereby the sub advisor (mutual fund company) executes the trades by directing them to their preferred trade execution brokers, who then "steps away" from any clearing and settlement responsibility for these trades. Clearing and settlement of these trades, in turn, become the responsibility of the custody firm (such as State Street, Mellon/BONY/Pershing, or Schwab) selected by the insurance company, pension plan, etc. to custody (hold) securities and cash for benefit of the fund or plan. Likewise, pension funds, certain mutual fund companies, hedge funds and other such entities and/or products as shown in FIG. 1 may also utilize a money management structure and trading process similar to a variable insurance product's sub advised structure.

When trading securities, as a general process, asset managers (money managers) often incur additional trading costs that are over and above the cost of the trade alone. For example, referring to FIG. 2, asset managers 201 (such as mutual fund companies or institutional asset management firms) usually maintain a network of approximately twenty-five executing brokers 202 (including broker-dealers (such as Merrill Lynch, Morgan Stanley, or UBS Paine Webber), market makers (such as Knight Capital or Schwab Capital Markets), exchanges (such as the New York Stock Exchange or NASDAQ), electronic communication networks (ECNs) (such as INET or TRAC), direct market access (DMA) vendors (such as Lava Trading, Sonic or UNX), and block trading systems (such as LiquidNet or Premier)).

Executing brokers 202 are often selected for the additional services (beyond executing the trade) that they can provide to the asset manager 201 (mutual fund company or institutional asset manager). The cost of these additional goods and services from executing brokers 202 (such as company and market research, market data feeds, trade analytics, and software) is added over and above the trade's cost of execution and results in a higher trade cost than what would otherwise be incurred by the fund or investment portfolio. Thus, a trade may have an execution cost of $0.01 (one cent) per share and have an additional $0.025 cents (two and one-half cents) per share added to result in a total execution cost of $0.035 (three and one-half cents) per share. Since many asset managers trade billions of shares per year, these additional few cents per share in trade costs cumulatively create a substantial pool of revenue for the asset manager. The costs for these additional services utilized by the asset managers 201 (referred to as "soft dollars") are paid for by the shareholders or beneficiaries through lower returns (lower performance) of their funds or accounts. This utilization of "soft dollars," as illustrated in FIG. 2, is not only a long-standing industry practice, but these additional trading costs are not included, for example, in the operating expenses of a mutual fund (such as a quoted 1.10% annual operating expense) that are disclosed in the fund prospectus. As such, a fund's trades are often directed to executing brokers 202 as to maximize the benefits received by the mutual fund company or institutional asset manager 201.

An exemplary process 200 for trading by asset management firms, which generates "soft dollars," is shown in FIG. 2 and described below in the following steps corresponding to the arrows and their adjacent reference numerals shown in FIG. 2:

211) Asset management firm (or money manager or sub advisor) 201 contracts with executing broker 202 for research.

212) The executing broker 202 sends the research to the asset management 201.

213) The executing broker 202 presents the invoice to the asset management firm 201 for confirmation.

214) The asset management firm 201 records the invoice into a soft dollar administration system 203.

215) The asset management firm 201, through the soft dollar administration system 203, derives the trade obligations for paying the invoice.

216) The asset management firm 201 directs trades to the executing broker 202 to generate sufficient commission volume to offset the costs associated with the confirmed invoice.

217) The executing broker 202 reports the trade executions and associated trading costs back to the asset management firm 201.

218) The asset management firm 201 updates the soft dollar administration system 203.

219) The executing broker 202 confirms payment of the invoice to the asset management firm's soft dollar administration system 203.

The practice of adding to the cost of trading of securities to create "soft dollars" is also a common practice in sub advisory relationships, where money managers (asset managers) are hired (and paid an annual fee) to manage pools of assets that belong to external or unaffiliated products or organizations. Furthermore, the sub advisory contracts with the sponsoring organization usually contain a clause that eliminates any requirement that "soft dollar" costs incurred by a specific fund (and its shareholders or beneficiaries) benefit the fund or account paying the additional "soft dollar" costs for their trades. As such, a sub advised fund or account can pay additional costs for services that do not even benefit the shareholders or beneficiaries paying the additional "soft dollar" expense.

In fact, most shareholders in mutual funds are not aware that a fund's trading costs are in addition to the fund's annual operating expense (as disclosed in the prospectus) and, as such, serve to lower the performance (return) of their funds. These same fund shareholders are also usually not aware that the mutual fund companies and institutional asset managers are using the additional "soft dollar" costs for trades in their mutual funds as a vaguely disclosed and unaccountable pool of cash to offset the money manager's operating expenses in order to increase their corporate profits.

Overall, the current process utilized by sub advisors to direct trades in order to generate "soft dollar" revenue is overly complex, expensive to shareholders and beneficiaries, and requires that the sponsoring organization (such as the insurance company) surrender control over order execution cost, the selection of executing brokers, and pre-trade compliance with regulatory requirements, even though the insurance company (as the sponsoring organization) retains primary regulatory (SEC) responsibility for the funds (as the advisor for regulatory purposes) whose assets are being traded. In essence, the insurance company responsible for regulatory compliance is notified of the trades only after their execution, usually well after the close of the trading day. Pension plans and other entities utilizing sub advised portfolio management, in a manner similar to the insurance companies, employ a similar structure and experience similar challenges.

FIG. 3 illustrates a current process 300 for trading by sub advisors 301 (e.g., money managers) in a sponsoring organization's 304 (e.g., insurance company) investment portfolios (sub accounts). Typically, the complex process shown in FIG. 3 occurs for each trade (usually ten to twenty trades per day per fund) in each of the thirty to sixty investment portfolios (sub accounts) offered by a sponsoring organization (such as a variable annuity product).

The process 300 in FIG. 3 works in the following steps corresponding to the arrows and their adjacent reference numerals shown in FIG. 3:

310) The sub advisors 301 direct orders (trades) to their preferred network of executing brokers 302 (shown as "Bs") as a single buy or sell order or may break up an order into smaller orders for execution among several brokers. The motivation to break orders up among several brokers can be driven by a sub advisor's desire to remain anonymous in the market (as no single broker can discern the sub advisor's overall investment strategy), the specific strengths of each executing broker, and/or the desire to use the fund assets to generate soft dollars.

311) The executing broker(s) 302 execute (fill) the orders and the sub advisor 301 is notified electronically that the trade has been executed along with the price per share. The data for each trade, such as number of shares, price per share, total value, execution costs, and contra broker, is transmitted through a number of electronic data repositories.

312) The executing broker(s) 302 also report the trade fill data to a number of industry organizations and this data is transmitted to the custodial firm 303 for the sponsoring organization's 304 assets.

313) After the close of trading, the custodial firm 303 for the sponsoring organization's 304 assets sends a file of the day's activity and holdings for each fund and investment portfolio to the sponsoring organization 304.

314) In their overnight processing cycle 305, the sponsoring organization 304 reconciles all activity and holdings for updating account values and in preparation for the next day's trading activity.

These trades are usually executed at an average cost 3.00 cents to 3.50 cents per share. The back office system, through the overnight batch processing cycle, will reconcile the trades, calculate updated portfolio account values or fund NAVs (Net Asset Values), and subsequently update the holdings and values for each client investing in their products. An insurance company (as advisor for regulatory purposes) may implement some form of compliance review during the reconciliation process. Most importantly, the sponsoring organization 304 has little, if any, control over the sub advisor's 301 choice of executing broker 202 and the associated additional costs incurred by their funds or accounts through the use of soft dollars. Likewise, the sponsoring organization 304 has no opportunity to review the trades for compliance with prospectus and regulatory requirements until hours after the close of the market or the next day (when trade issues and errors are more expensive to address and correct). Overall, the current process was established decades ago when the sub advised industry was in its infancy and, despite its impressive current assets, has never been restructured to recognize that the true beneficiaries of this entire process should be the fund shareholders and plan beneficiaries whose hard earned dollars constitute the assets in these investment portfolios.

BRIEF SUMMARY OF THE INVENTION

An embodiment of the present invention provides a system (e.g., referred to as the unified trading and control system), method, process, software, and standards that simplify the sub advisor (money manager) trading process, increase control over the trading process by a sponsoring organization, and substantially lower trading costs on a recurring basis for the shareholders and beneficiaries investing in the funds and investment portfolios. In particular, the present invention provides a superior trading and control method for the sub advised industry. The system, method, process, software, and standards of the present invention address a number of existing shortcomings in the current trading and operational processes in the sub advised industry, resulting in substantially lower trading expenses on a recurring basis, improved performance, a more simplified operational model, and superior compliance oversight. The benefit of these lower trading expenses, by regulatory requirement, must pass directly to the fund shareholders (retail investors) in these funds and plan beneficiaries in the form of lower trading expenses. The lower trading expenses result in improved investment performance for the funds and plans, thereby attracting additional investments for the sponsoring organization. Further embodiments of the invention provide similar systems, methods, processes, software, and standards for the defined contribution market, 529 plans, hedge funds, collective investments, deferred compensation plans, institutional accounts, separate accounts of insurance companies, defined benefit pension plans, endowments and trusts.

BRIEF DESCRIPTION OF THE DRAWINGS

FIG. 1 is a table that defines the terminology utilized in a number of investment industry products across numerous markets in registered mutual funds, non-registered mutual funds, and institutional investment portfolios.

FIGS. 8A, 8B, and 8C illustrate exemplary logical rules in terms of regulatory, prospectus, and board restrictions, and requirements for a real-time compliance engine, as implemented by an operating fund trust.

FIG. 14 is a table that compares and contrasts the responsibilities of the sub advisor according to the prior art and according to an embodiment of the system of the present invention along with a comparison of the overall impact of the present invention, according to an embodiment of the present invention.

FIG. 15 is a list of exemplary sponsoring organizations offering variable insurance products.

FIGS. 16A and 16B are a list of exemplary money management firms (mutual fund companies) that currently provide or potentially could provide sub advisory services to sponsoring organizations through registered mutual funds, unregistered mutual funds, and institutional investment accounts.

FIG. 17 is a list of exemplary firms providing order management systems (OMS).

FIGS. 18A and 18B are a list of many exemplary executing broker firms providing trade execution services.

FIG. 19 is a schematic diagram illustrating an embodiment of the present invention in which a plurality of sponsoring organizations and a plurality of sub advisors (money managers) utilize a plurality of order management systems (OMSs) to execute orders with a plurality of executing brokers.

FIG. 20 is a schematic diagram illustrating an embodiment of the present invention in which a sub advisor utilizes a plurality of manager order management systems to execute orders for a plurality of funds or investment portfolios with a plurality of executing brokers.

FIG. 23 is a table providing a compilation of research demonstrating exemplary savings available to fund trusts (groups of funds) showing the name of the fund trust, the total assets of the fund trust, the current execution costs for trading (in cents per share), the annual turnover rate for the trust, the effective (total) turnover rate for the trust, and the number of shares traded in 2005 by the trust. FIG. 23 also shows the exemplary annual savings in millions of dollars and basis points (b.p.) of annual savings realized by the fund trust at execution costs of 1.00 cent per share. The data for this table was compiled from documents filed by each fund trust with the SEC, including the prospectus, annual report, and statement of additional information.

FIGS. 24A, 24B, 24C, and 24D are tables providing a compilation of research calculating exemplary annual savings for four popular fund trusts (group of funds) and the individual funds (with their sub advisor) comprising the trust, showing the annual cost savings (at an execution cost of 1.00 cent per share) both in dollars and percentages. FIGS. 24 A-D also show an exemplary beneficial effect of the annual compounding of these recurring savings for a 1, 3, 5, and 10 year period.

DETAILED DESCRIPTION OF THE INVENTION

Figure 2:
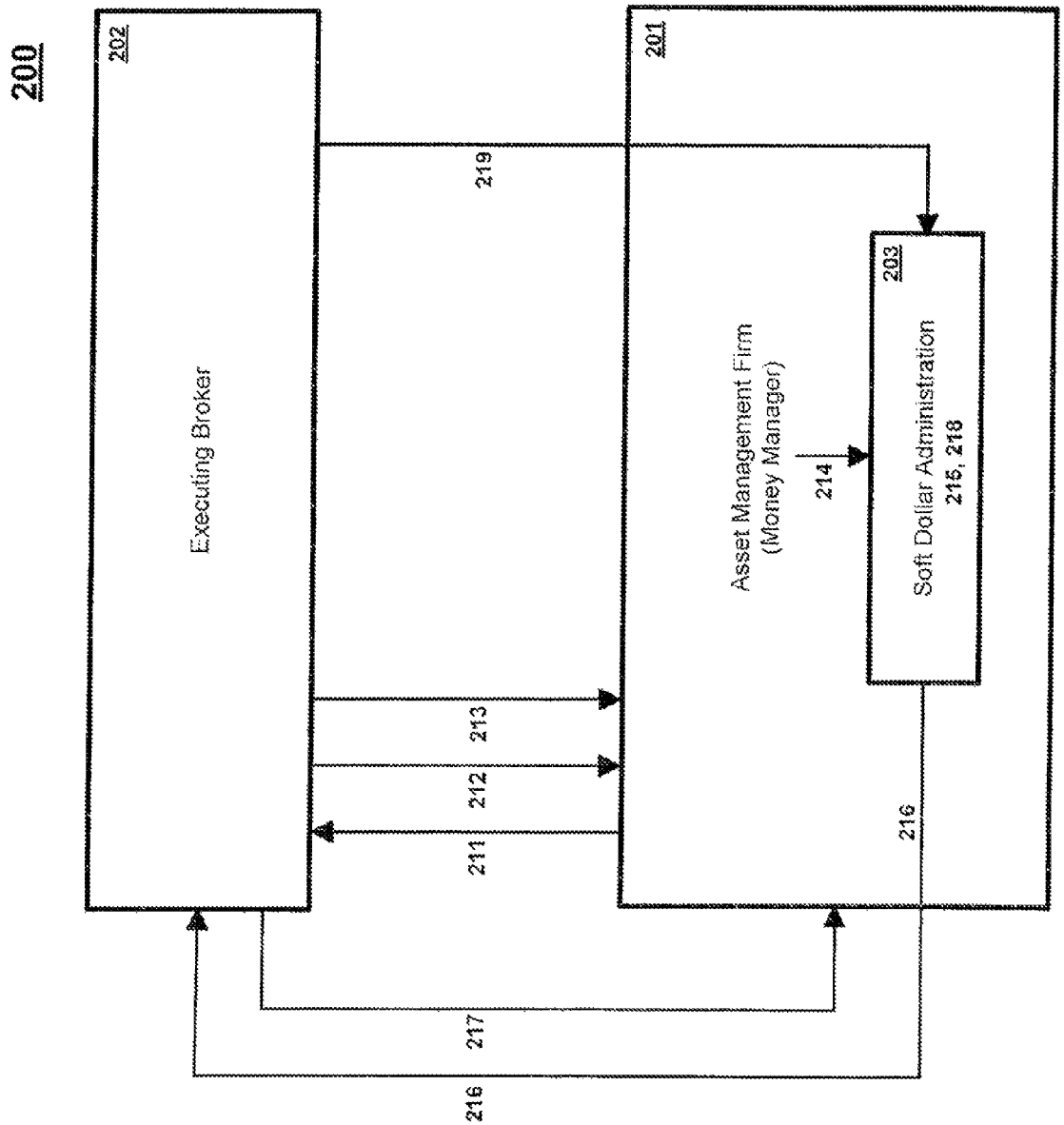
FIG. 2 is a schematic diagram illustrating a prior art process for trading by asset management firms (or money managers or sub advisors) that generates "soft dollars."
Figure 3:
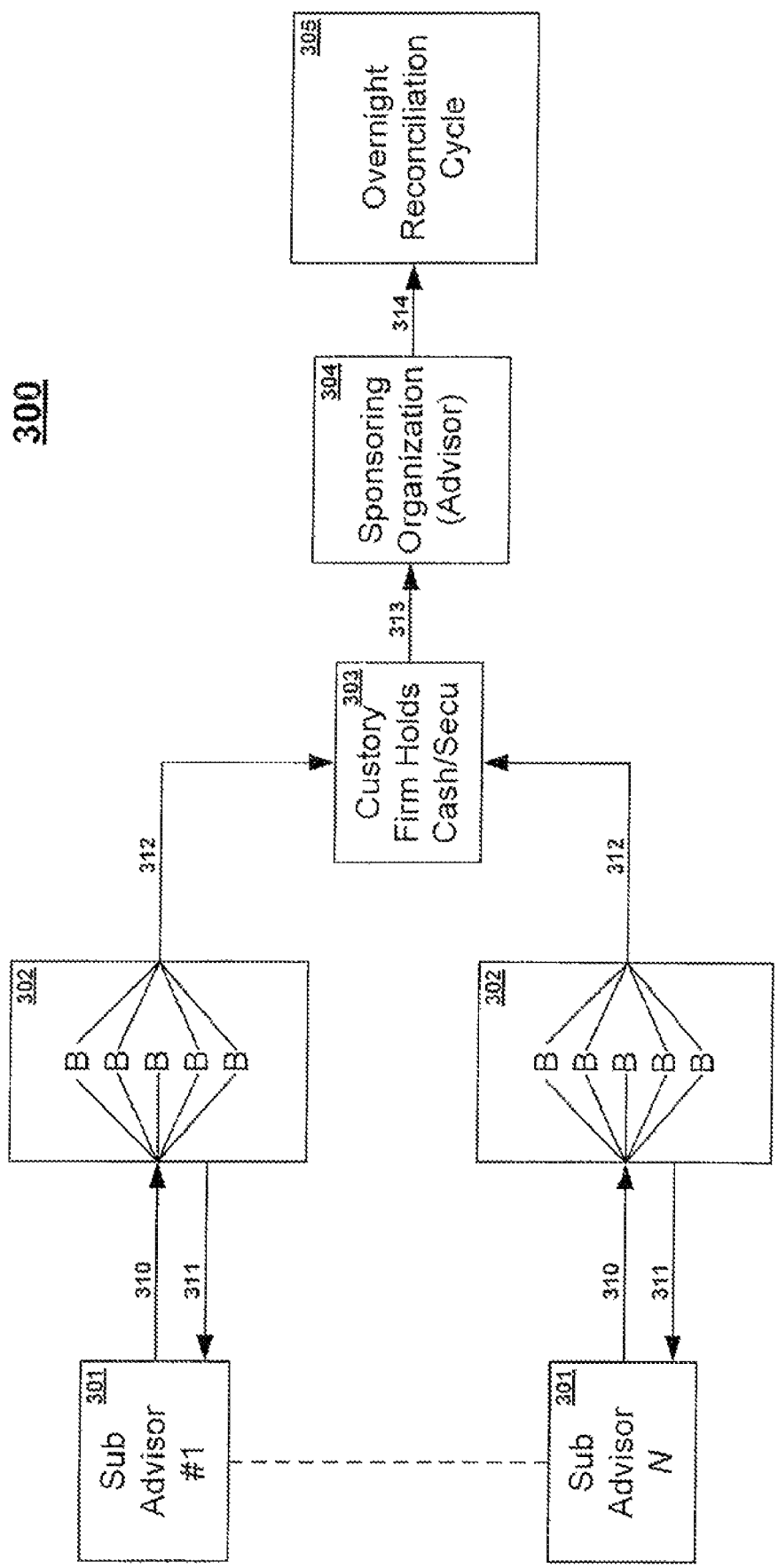
FIG. 3 is a schematic diagram illustrating a conventional process for trading by asset managers in sub advised investment portfolios.
Figure 4:
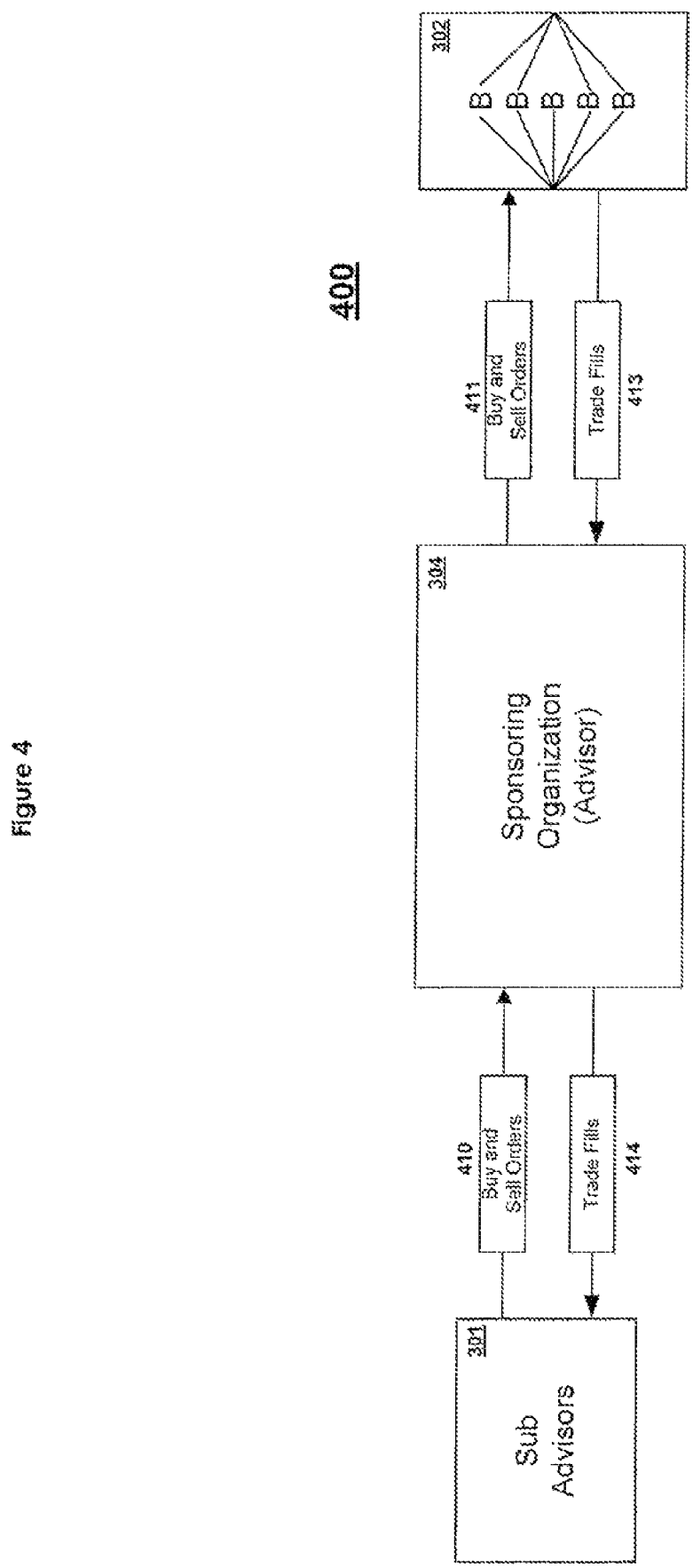
FIG. 4 is a schematic diagram illustrating an exemplary process for facilitating a sponsoring organization's money management process as the sponsoring organization receives trade orders from the sub advisor and selects the executing brokers, according to an embodiment of the present invention.

An embodiment of the present invention provides a unified trading and control system. FIG. 4 illustrates an exemplary sub advisor (money manager) trading process 400 according to an embodiment of the present invention. The following numbered steps correspond to the arrows and their associated reference numerals shown in FIG. 4.

410) The sub advisor 301 (or money manager) for each investment portfolio provides the changes (buy and sell orders) in the sub advised fund or investment portfolio to the sponsoring organization 304 (acting as the advisor or administrator) as to the sub advisor's decisions regarding, for example: (1) employing the daily net cash contribution or withdrawal (a decision usually made prior to the opening of trading); (2) changing the percentage, share, or dollar allocations of each security in the investment portfolio (decisions that can occur at the beginning of and throughout the day); (3) changing how the current model (the percentage allocation by security totaling to 100%) compares to the target model; and (4) other money management and trading decisions.

Once these decisions (and the resulting orders) are determined by the sub advisor or money manager 301, the sub advisor calculates the resulting number of shares to buy or sell for each security and communicates the desired orders to the sponsoring organization 304. (As needed, selected orders could be executed or "worked" by the sub advisor 301 according to criteria agreed to by the sponsoring organization and sub advisor.)

411) The sponsoring organization 304 maintains (separate and apart from the sub advisors 301) its own group of relationships with executing brokers 302. The sponsoring organization routes the orders to executing broker(s) 302 of their own choice for execution, thereby enabling the sponsoring organization 304 to seek out and utilize the lowest cost source of execution, and thereby completely eliminate the "soft dollar" charges (and the resulting additional expense to the fund shareholders and plan beneficiaries) incurred when the sub advisor is directing the trades. Through an embodiment of the present invention, the sponsoring organization 304 is able to select executing brokers 302 providing the lowest possible execution cost (which presently could be one cent or less per share) consistent with regulatory requirements for Best Execution (best share price), thereby generating additional savings for the fund shareholders and plan beneficiaries and improving fund performance.

413) The executing brokers 302 report the trade fills back to the sponsoring organization 304.

414) The sponsoring organization reports the trade fills back to the sub advisor 301.

The sponsoring organization 304 also has, in an embodiment of the present invention, the option of implementing a pre-trade compliance review and an immediate post execution review to ensure the trade is compliant with prospectus, SEC, and board requirements. If the trade is not compliant with these regulatory requirements, the sponsoring organization 304 (as advisor for regulatory purposes) is able to prevent the order from being executed or immediately address any violations following execution (rather than waiting until the next day as in the prior art).

FIG. 4 illustrates the areas of operational responsibility according to an embodiment of the present invention, as summarized in Table 2 below.

TABLE 2

Areas of Operational Responsibility

| | |
|---|---|
| Sub Advisors 301 | Create Buy and Sell Orders |
| | Execute or "Work" Orders per Agreed Criteria |
| Sponsoring Organizations 304 | Maintain Network of Executing Brokers |
| | Select Executing Brokers for Orders |
| | Seek Lowest Cost Execution |
| | Maintain Order Routing Table |
| | Eliminate "Soft Dollars" from Trade Costs |
| | Pass Savings Through to Shareholders or Beneficiaries |
| | Single and Comprehensive Compliance System and Methodology for all Sub Advisors to Utilize for Trading |
| | Pre and Post Trade Compliance Review Option |
| Executing Brokers 302 | Execute Trades at Lowest Possible Cost |
| | Compete: Cost, Coverage, Liquidity, Technology and Service |

Figure 5:
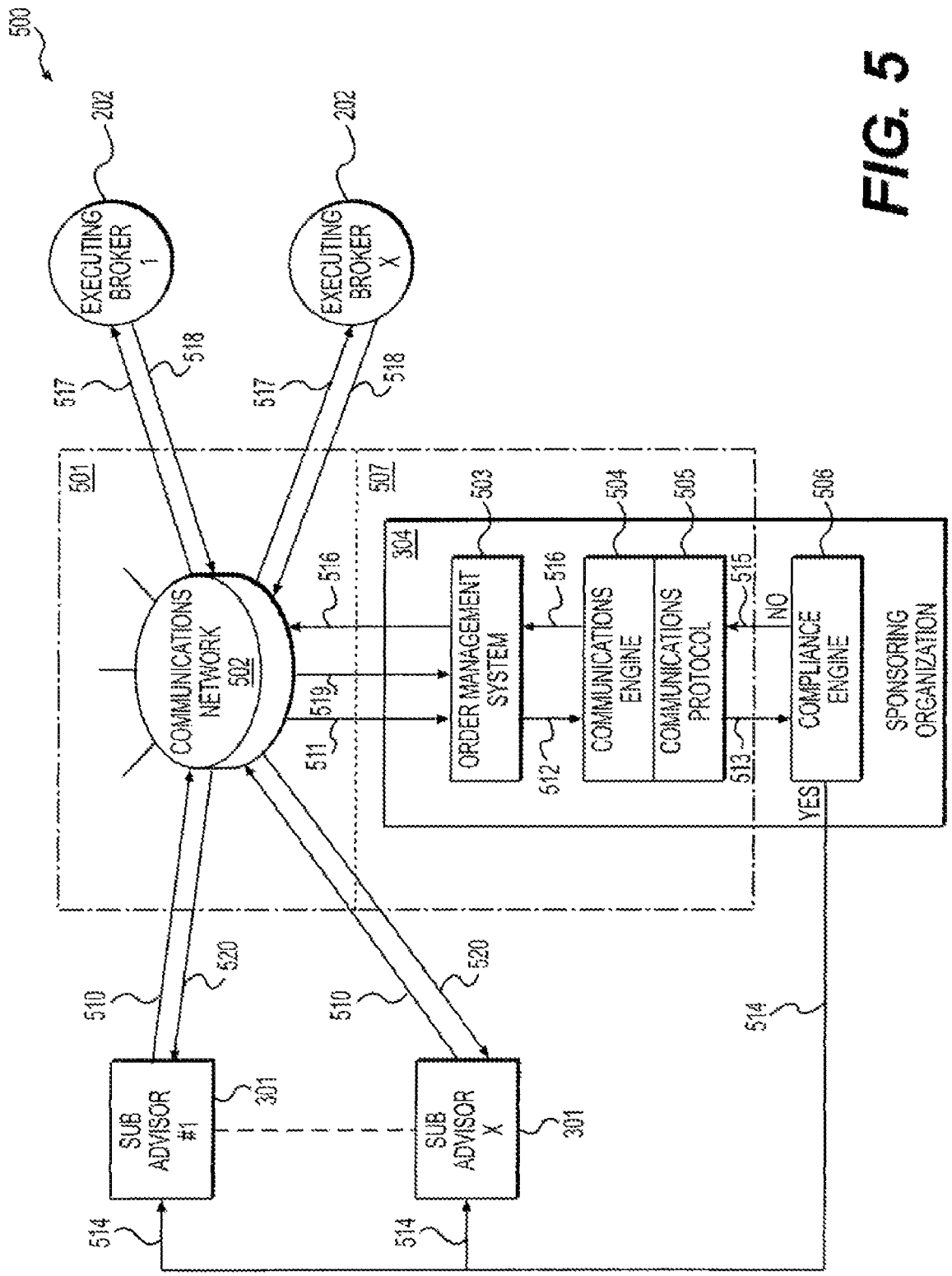
FIG. 5 is a schematic diagram illustrating an exemplary system and method for facilitating a sponsoring organization's money management process utilizing a standard trading system, messaging engine, communications protocol, and communications network, according to an embodiment of the present invention.

An embodiment of the present invention is shown in FIG. 5 as exemplary process 500, whereby the sponsoring organization utilizes a standard system along with a plurality of other sponsoring organizations to implement a standard method and process that enables the sub advisors and executing brokers, through the creation of a single operational structure with one sponsoring organization, to easily and rapidly duplicate that same operating structure with a plurality of sponsoring organizations across multiple industries. This standardization eliminates the extraordinary potential for unmanageable complexity created for sub advisors and executing brokers as a multiplicity of sponsoring organization select and implement their own individual method and process utilizing a wide variety of vendors, systems, procedures, communications engines, communications protocols, and communications networks.

FIG. 5 illustrates the exemplary process 500 according to an embodiment of the present invention. The process 500 works in the following steps corresponding to the arrows and their associated reference numerals shown in FIG. 5.

510) A plurality of sub advisors 301 direct orders to the sponsoring organization 304 through the communications network 502.

511) The sponsoring organization's order management system 503 receives a plurality of orders from the sub advisor.

512) The sponsoring organization's order management system 503 utilizes a communications engine 504 that incorporates a communications protocol 505 that translates each order into a usable format.

513) Each order is directed to the compliance engine 506 that reviews the order with respect to prospectus, board, and SEC regulations and requirements.

514) If a violation occurs (Violation=Yes), the order is routed to the sub advisor 301 for further evaluation and review.

515) If a violation does not occur (Violation=No), the order is routed to the order management system (OMS) 503, which, utilizing the communications engine 504 and communications protocol 505, translates the order into a format acceptable to the executing brokers 202.

516) The sponsoring organization's order management system 503 routes the order to the executing brokers 202 through the communications network 502.

517) The executing broker 202 receives the order and executes the trade.

518) The executing broker 202 sends the trade fill report to the sponsoring organization 304 and sub advisor 301 through the communications network 502.

519) The sponsoring organization 304 receives the trade fill report.

520) The sub advisor 301 receives the trade fill report.

The standard system 501 for facilitating the sponsoring organization's 304 unified trading and control of their money management process consists of the following components in an integrated format: order management system 503, communications engine 504, communications protocol 505, and communications network 502. An alternative embodiment of the present invention with an alternative standard system 507 consists of the following components in an integrated format: order management system 503, communications engine 504, and communications protocol 505.

Figure 6:
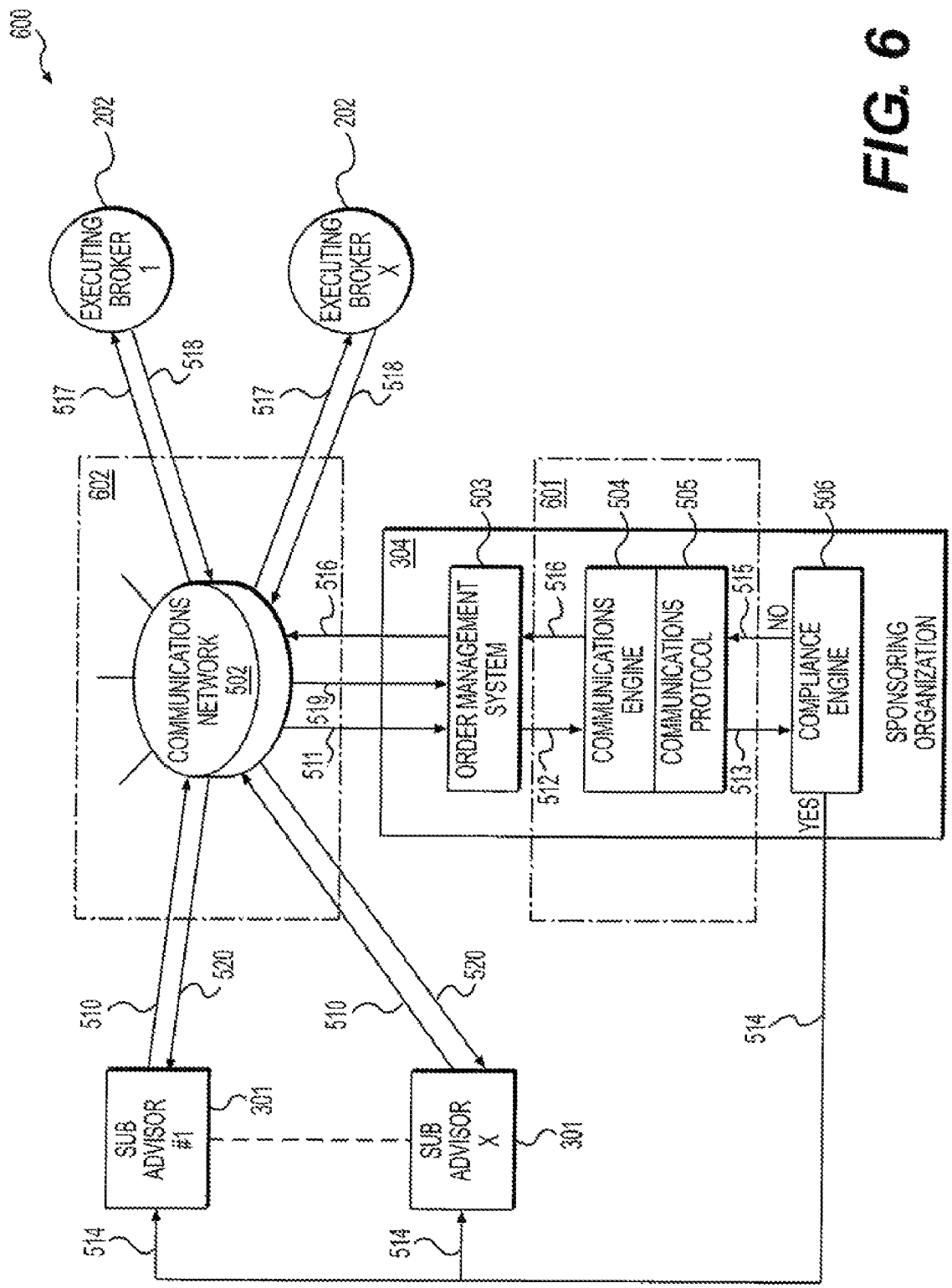
FIG. 6 is a schematic diagram illustrating an alternative exemplary system and method for facilitating a sponsoring organization's money management process utilizing a standard messaging engine, communications protocol, and communications network, according to an alternative embodiment of the present invention.

An alternative embodiment of the present invention is shown in FIG. 6 as exemplary process 600, whereby the sponsoring organization 304 utilizes a variance on the common standard system with other sponsoring organizations to provide a standard method and process that enables the sub advisors 301 and executing brokers 202, through the creation of a single operational structure with one sponsoring organization, to easily and rapidly duplicate that same operating structure with a plurality of sponsoring organizations across multiple industries. The likelihood of increasing compatibility of systems over time, and increased industry acceptance of the system of the present invention, could potentially ease the standardization requirement and allow these additional options to become feasible. The standard system 601 and 602 comprises the following standard components in an integrated format: communications engine 504, communications protocol 505, and communications network 502. An alternative embodiment of the standard system 601 consists of a communications engine 504 and communications protocol 505. Finally, it is conceivable that, over time, communications integration across the industry evolves to the point where the standard consists solely of a communications protocol 505.

The present invention, in the embodiments illustrated in FIGS. 4, 5, and 6, provides a simpler process, lower trade execution costs, and enhanced trade compliance, whereby the sponsoring organization (the advisor with direct regulatory responsibility for the investment portfolios), not the sub advisor or money manager, controls where and how the trades are executed (the order flow) on behalf of their fund shareholders and plan beneficiaries.

I. Exemplary System and Process of the Present Invention

The present invention provides a system, method, process, software, and standards for achieving a desired social utility of creating significant and recurring cost savings (and the resulting improved investment performance) for fund shareholders and plan beneficiaries.

A. System

An exemplary system is based on a number of components and includes an order entry system, compliance engine, order management system, a high touch-low touch engine, a price-liquidity-cost-quality engine, trade reconciliation system, communications engines, communications protocols, and communications networks, as further described below.

1) Order Entry System

Figure 7:
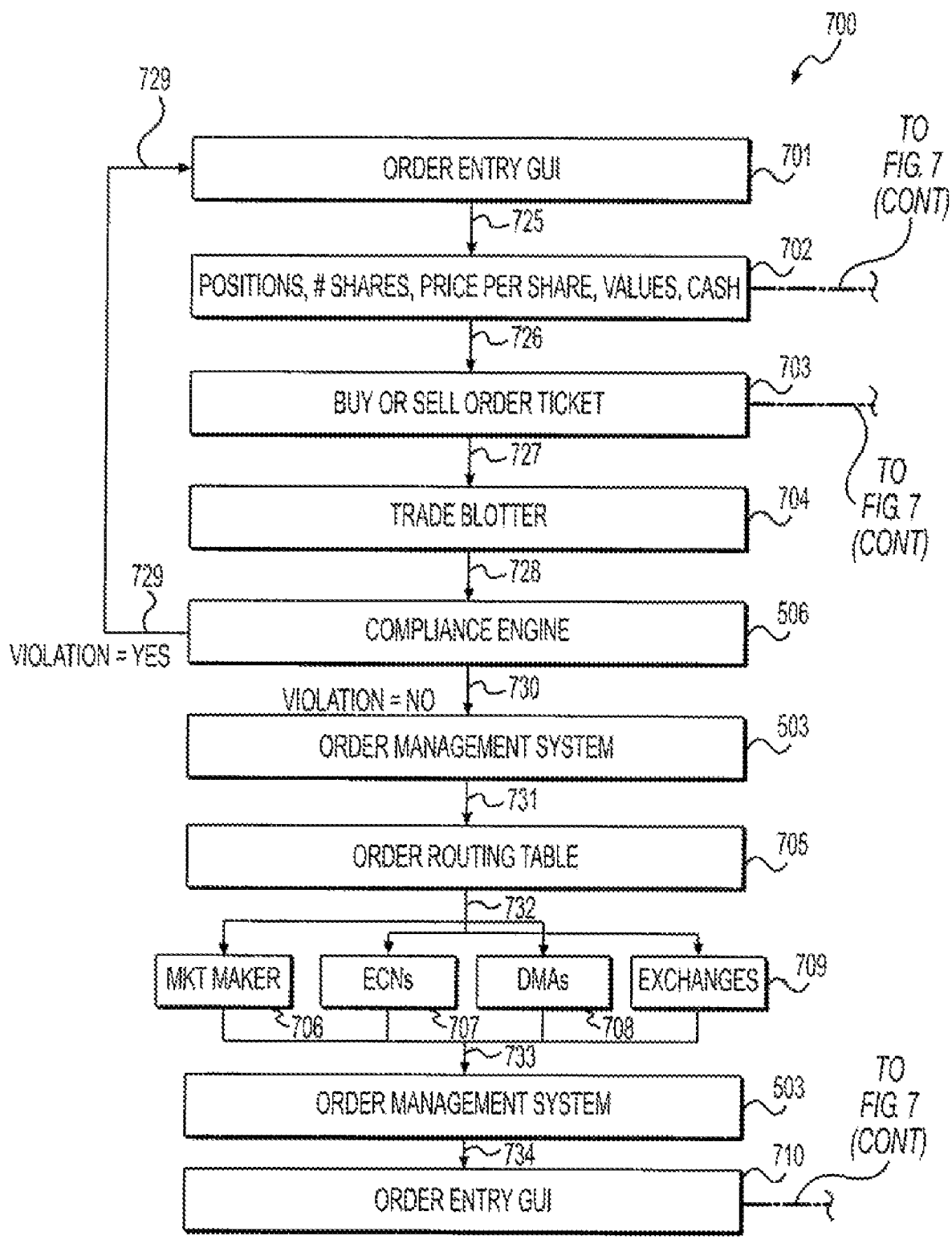
FIG. 7 is a schematic diagram illustrating an exemplary order entry system and process, according to an embodiment of the present invention.

FIG. 7 is a schematic diagram illustrating an order entry system and process 700, according to an embodiment of the present invention. The process 700 works in the following steps corresponding to the arrows and their adjacent reference numerals in FIG. 7.

725) The order entry system is a computer-based graphical user interface (GUI) and associated software program(s) that can be customized to fit the preference of the individual portfolio manager and his or her personal style of managing money. (The individual who is the portfolio manager for the investment portfolio is typically an employee of the mutual fund company or institutional asset manager acting as sub advisor.) The order entry GUI 701 displays, among other data, the investment portfolio's total value, cash, and securities along with the number of shares, share price, and dollar value of each position 702. FIG. 7 shows an exemplary order entry GUI 702 providing this exemplary data. The order entry system provides important functionality in two respects:

a) Daily Net Cash: The order entry system provides data on the daily net contribution or withdrawal of cash from the investment portfolio, and enables the portfolio manager to implement decisions such as maintain this cash, sell specific securities to cover any net withdrawal, buy certain securities, buy/sell the current model, buy/sell the target model, or buy/sell as to move the current model closer to the target model.

b) Order Execution Options: The order entry system provides options for the order type for each trade, for example: market, limit, good to closing, and fill or kill. Also, the system can allow a portfolio manager to freeze a security's current shares, that is, exclude the security from any and all future trading.

726) The portfolio manager utilizes the order entry system to implement the buy and sell orders for securities through the creation of a trade ticket 703. The responsibility for entering the buy and sell orders into the order entry system remains with the sub advisor (the portfolio manager or their associated trading desk/operations group) in an embodiment of the present invention. FIG. 7 shows an exemplary trade ticket 703 accessible through the order entry GUI.

727) As the order is entered by the sub advisor (who hits, e.g. ENTER on the order entry screen), the order entry system calculates the necessary number of shares and dollars for each security to buy or sell. Given that the order is determined at the investment portfolio level, the order entry system does not have nor require access to information at the account level for individual fund shareholders or plan beneficiaries. The record of the order is entered into the trade blotter 704. Thus, for example, when an asset manager increases the allocation by 1% in IBM in a $100 mM investment portfolio, the result is an aggregate buy of $1 mM of IBM. Given a price of $80 per share for IBM, the buy order is 12,500 shares. This process is repeated for each buy and sell order implemented by the portfolio manager.

728) The order is routed to the compliance engine 506.

729) If a violation occurs (Violation=Yes), the order is routed to the order entry GUI 701 for review and evaluation by the portfolio manager, trade desk and/or compliance officer.

730) If a violation does not occur (Violation=No), the order is routed to the order management system (OMS) 503, 731) The order management system 503 utilizes the order routing table 705 to direct the order for execution.

732) The order routing table 705 directs the order to, among other venues, a market maker 706, an electronic commerce network (ECN) 707, a direct market access (DMA) vendor 708, or an exchange 709.

733) Once the order is executed, the trade fill report is sent back to the order management system 503.

734) The order entry GUI is updated with the revised positions, number of shares, price per share, values, and cash data. FIG. 7 shows an exemplary screen image of the updated order entry GUI 710.

2) Compliance Engine

The compliance engine is a graphical user interface (GUI) and associated software program(s) linked to a computerized rules-based logic engine that enables each buy or sell order (or combinations of buy and sell orders) to be analyzed in real time, according to a set of customizable logical rules, such as rules specifying that foreign securities cannot exceed 15% of a portfolio's total value or that the portfolio cannot hold the securities of the sub advisor nor the sponsoring organization. The compliance analysis occurs both prior to and immediately following the execution of each trade (or group of trades) as well as at the close of each trading day for compliance with prospectus, regulatory, and board requirements. Any pending order or group of pending orders that may result in any type of prohibited transaction are held in suspense (and not executed) and tagged with a warning flag, and a violation notice is sent to the compliance group, portfolio manager, and trade/operations group. The order or group of orders in question, subsequent to the review of the violation, may be amended, killed, or approved for execution. Trades (or groups of trades) that are executed are also analyzed to ensure that the resulting metrics of the trades do not violate any requirements for the portfolio. (Post-execution price changes could subsequently trigger a violation not present at the time of execution.) Approved orders are routed to the order management system (OMS) to begin the execution process.

FIGS. 8A, 8B, and 8C illustrate exemplary logical rules in terms of regulatory, prospectus, and board restrictions and requirements for a real-time compliance engine, as specified in the disclosure documents of an operating fund trust.

Figure 9:
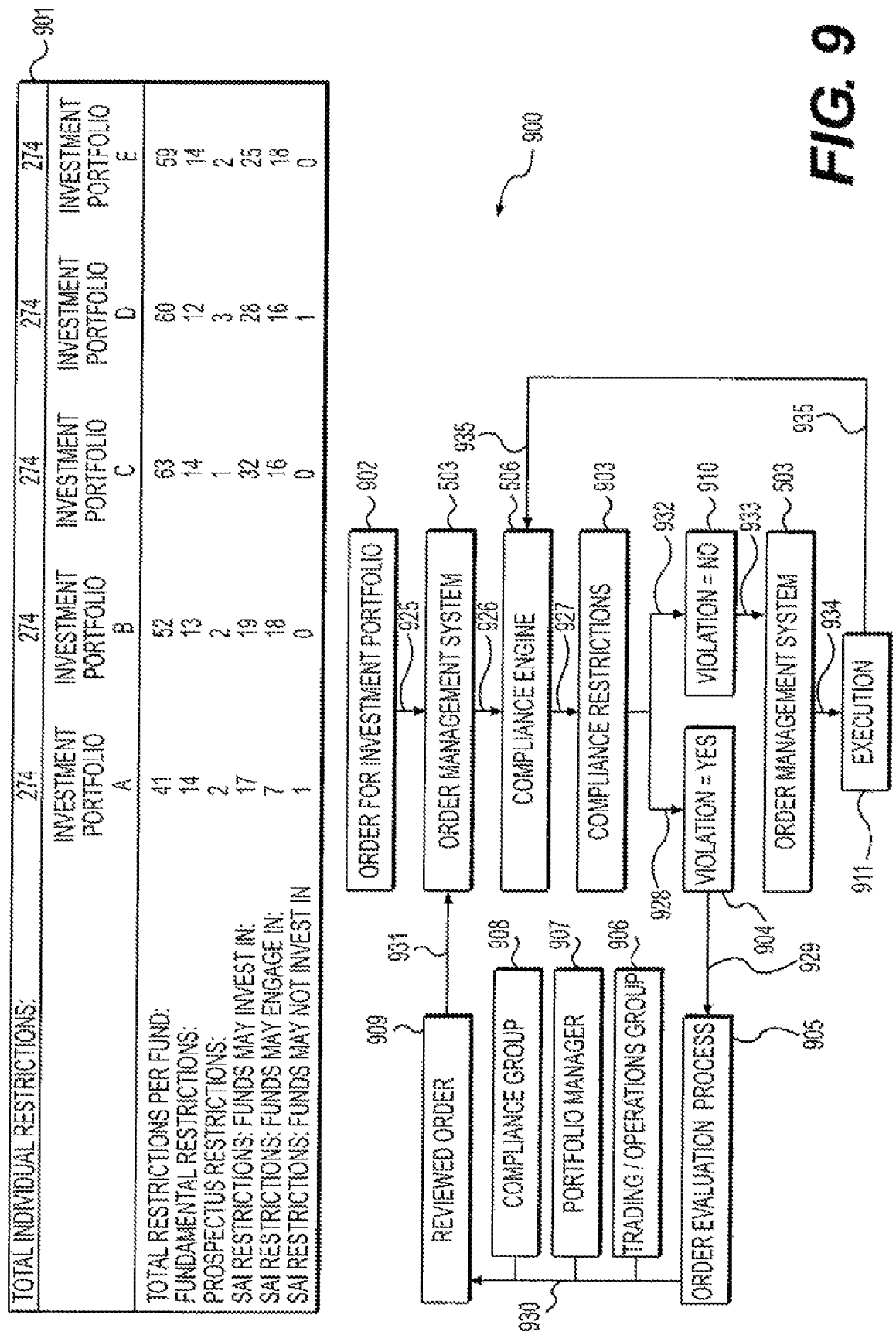
FIG. 9 is a schematic diagram illustrating the number and types of restrictions for a plurality of investment portfolios along with an exemplary computer process for implementing a compliance engine for an investment portfolio, according to an embodiment of the present invention.

FIG. 9 is a schematic diagram illustrating an exemplary compliance review process 900, according to an embodiment of the present invention, for implementing a compliance engine for a plurality of investment portfolios. In the instance for this operating fund trust, there are a total of 274 individual restrictions that could apply to all, many, or a single investment portfolio or fund. FIG. 9 shows the actual restrictions by category for five of the fund trust's investment portfolios, with the number of the individual restrictions shown in a breakdown of five categories, ranging from 41 to 63 compliance and regulatory restrictions per investment portfolio.

The exemplary compliance review process 900 works as described in the following steps corresponding to the arrows and their adjacent reference numerals as shown in FIG. 9.

925) An order for an investment portfolio 902 is entered into the order management system 503, which records the transaction in the trade blotter.

926) The order management system 503 routes the order to the compliance engine 506 for pre-trade review.

927) The compliance engine 506 matches the order to the restrictions for that particular investment portfolio 903 and conducts an analysis to determine if the order will result in a violation of any applicable restriction. Exemplary restrictions and their frequencies are illustrated in table 901 of FIG. 9.

928) If Violation=Yes 904, the order is not executed and requires a review.

929) The rejected order is then routed into the order evaluation process 905.

930) The reviewed order evaluation process 905 gathers input from at least one of the compliance group 908, portfolio manager 907, and the trading/operations group 906. The order may be killed at this point, revised, or allowed to be executed in its existing form 909.

931) If the order is to be executed, the reviewed order 909 is routed to the order management system 503 for updating the trade blotter and resubmission to the compliance engine 506.

932) If, in step 927, Violation=No 910, the order is routed to the order management system 503.

933) The order management system 503 routes the order for execution 911.

934) The order is executed and the trade fill report is generated.

935) The trade fill report is routed back to the compliance engine 506 for post trade and ongoing compliance review and analysis.

Overall, in an embodiment of the present invention, the sponsoring organization (the advisor with direct regulatory responsibility for the investment portfolios) has the option, which was not available in the prior art, to review all pending orders and prevent violations of prospectus, regulatory, and board requirements prior to the orders being executed. The sponsoring organization, in an embodiment of the present invention, also has the option, which was not available in the prior art, to review all executed trades on a real-time basis to prevent post-execution violations of prospectus, regulatory, or board requirements. Finally, for the first time, the sponsoring organization, as advisor or plan administrator, has the means to place each fund or account and each sub advisor on the sponsoring organization's implementation of a common, centrally operated compliance engine, process and set of restrictions (as opposed to each different sub advisor or money manager performing compliance reviews on as many different systems.) The sponsoring organization, as advisor to the fund or administrator to the pension plan, has a regulatory (SEC) responsibility to ensure compliance of its funds and plan with all regulatory requirements and to certify, in writing, that these investment portfolios do not violate the securities laws. Thus, in contrast to conventional systems, the present invention enables the advisor or administrator to fulfill such responsibilities prior to execution of an order, enables an immediate review of all executed trades, and allows a single standardized compliance review process to be implemented across all sub advisors and the funds or accounts. The present invention therefore empowers the advisor or administrator to properly fulfill their regulatory (SEC) responsibilities.

3) Order Management System

Figure 10:
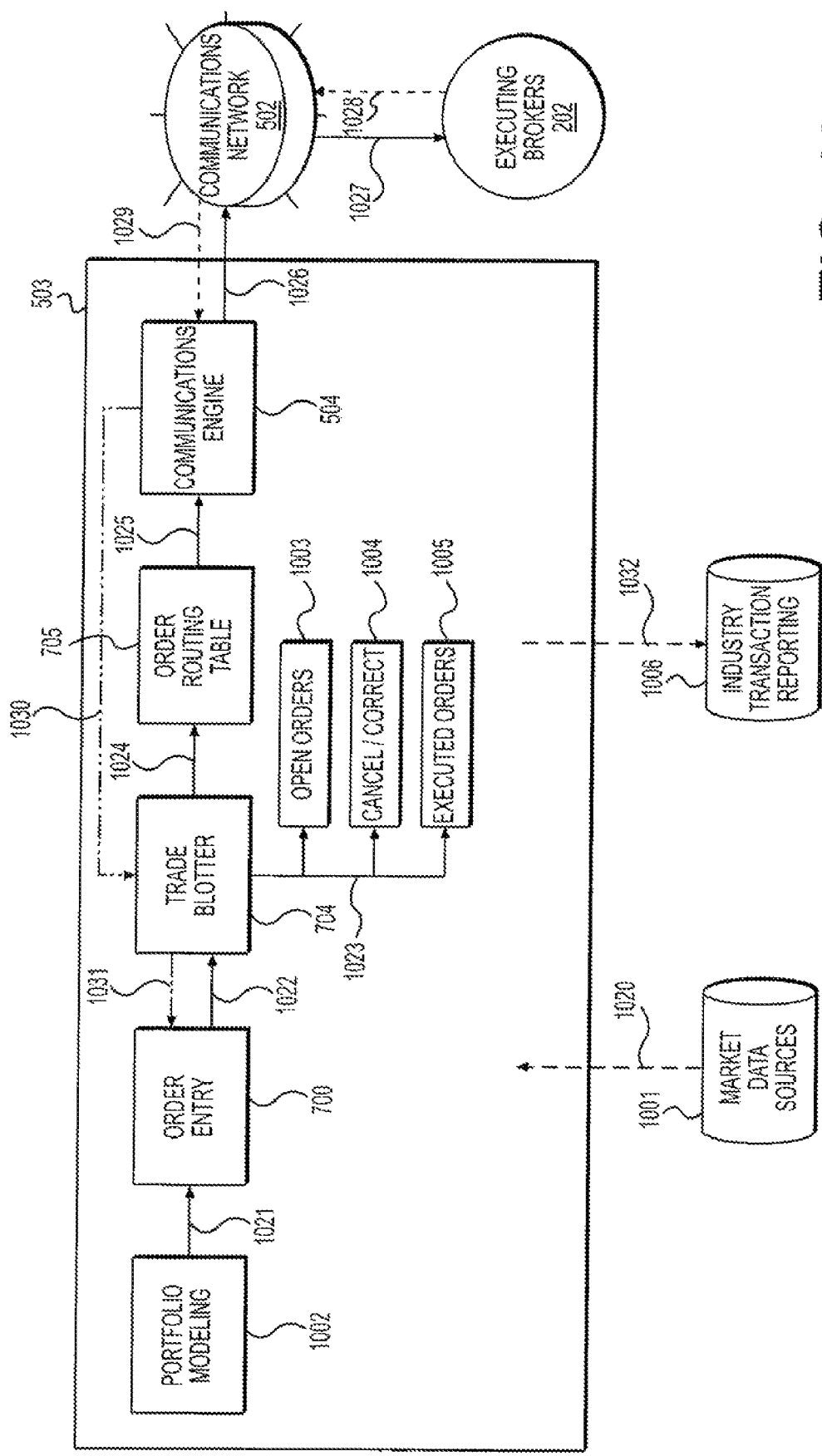
FIG. 10 is a schematic diagram illustrating an exemplary order management system (OMS), according to an embodiment of the present invention.

FIG. 10 is a schematic diagram illustrating the order management system (OMS) 503, according to an embodiment of the present invention. The order management system is a computerized processing system with a graphical user interface (GUI) and associated software program(s) enabling the organization conducting the trading activity to maintain a real-time trade blotter for all their pending orders and executed trades. An order management system can comprise one or more of the following modules: portfolio modeling engine 1002, order entry 700, trade blotter 704, order routing table 705, and communications engine 504. The portfolio modeling engine 1002 enables a money manager to evaluate "what if" scenarios with the portfolio prior to implementing any trade orders. The trade blotter 704 enables real-time monitoring of all trading activity such as open orders 1003, cancel/correct orders 1004, and executed orders 1005. The OMS 503 enables the utilization of various trading strategies, keeping track of positions, P&L, order acceptance and release, sending IOI's (Indications of Interest), and amending orders. The order routing table 705 is a central database for maintaining the instructions for directing orders to selected executing brokers. The communications engine 502 is used to create data formats acceptable to other order management systems.

The order management system 503 also provides logical workflow solutions to assist in maintaining proper communication between the various front, middle, and back office functions and systems for allocations of large orders as well as keeping track of partial fills of trade orders. Finally, the order management system 503 utilizes market data sources 1001 and provides robust and flexible compliance, regulatory and audit reporting capabilities 1006, including NYSE Rule 123, OATs, ACT, Short Sale, and Limit Order Handling Rule reports, as well as capturing, time-stamping, and archiving all activity for timely reconciliation and trouble-shooting.

The order management system 503 functions as described in the following steps, which correspond to the arrows and their associated reference numerals shown in FIG. 10.

1020) The order management system 503 links with a plurality of real-time and batch market data feeds 1001.

1021) The portfolio manager utilizes the portfolio modeling engine 1002 to perform "what if" analyses for the investment portfolio and enters orders into the order entry module 700.

1022) The orders are recorded in the trade blotter 704.

1023) The trade blotter 704 enables views of the trade data such as open orders 1003, cancel and correct orders 1004, and executed trades 1005. (The compliance review process, as illustrated in FIG. 9, can occur at this point in the process, but is not shown.)

1024) The orders are sent to order routing table 705 for selecting executing brokers and receiving directions to those executing brokers 202.

1025) The order routing table 705 transmits the order to the communications engine 502, which translates the order into a format accepted by executing brokers 202.

1026) The order is routed to the communications network 502.

1027) The communications network 502 routes the order to the selected executing broker(s) 202.

1028) The executing broker(s) execute the order and send the trade fill report(s) through the communications network 502.

1029) The communications network 502 directs the trade fill report back to the order management system 503 and the communications engine 504 translates the order into a format used by the order management system 503.

1030) The trade fill report updates the trade blotter 704 with the details of the trade fill report(s).

1031) The trade report data is used to update the portfolio holdings for the order entry module 700.

1032) The order management system 503 submits transaction reporting 1006 to the appropriate industry transaction processing and reporting entities.

Importantly, in an aspect of the present invention, the primary responsibility for operating the order management system 503 for processing orders shifts from the sub advisor, who operated the order management system in the prior art, to the sponsoring organization.

4) High Touch-Low Touch Engine

The high touch-low touch engine is a graphical user interface (GUI) and associated software program(s) linked to a computerized rules-based logic engine that enables each buy or sell order (or combinations of buy and sell orders) to be analyzed in real time, according to a set of customizable logical rules, to: (1) determine the expected market impact of an order and categorize an order as high touch or low touch; and (2) accordingly route the low touch orders for execution by the sponsoring organization and the high touch orders for execution by the sub advisor. In a preferred embodiment, these logical rules can be adjusted in real time.

Orders are categorized as high touch or low touch orders depending on their expected market impact. For example, the immediate execution in the market of an order to buy 500,000 shares for an equity that currently trades 100,000 shares daily at $40.00 per share will almost certainly create an increase in the share price of that equity. As such, the large order could drive up the price of the equity by several dollars per share. Once the execution of that order is completed, the trading volume will likely return to its original 100,000 shares per day trading volume and the share price could return to the pre trade level of $40.00 per share. A possible result is that the purchasers of the 500,000 shares will experience an immediate loss on their investment. The phenomenon of driving up the share price through a very large buy order or lowering the share price through a very large sell order is referred to as "market impact." It is usually desirable to "work" orders with significant expected market impact. By "working" orders, traders are able to utilize a variety of tools, such as institutional trading desks, trade algorithms, crossing networks, dark pools of liquidity, sending IOIs (indications of interest), and other such techniques (including manually watching the market for the appropriate times to execute small portions of the total order) to eliminate or reduce the expected market impact of a large order. The orders that require special handling ("working") are referred to as "high touch trades."

On the other hand, there may be situations in which an order represents a very small portion of a measure such as daily trade volume. For example, an order to buy 5,000 shares for an equity trading several million shares daily will have little or no expected market impact on the price of that equity. Once entered, such an order is transmitted, executed, and reported as the electronic systems and computers (also referred to as "black boxes") communicate with each other with little or no human interaction. The orders with low or no expected market impact are referred to as "low touch trades."

Finally, once an execution strategy is selected for a high touch order, the order may be broken up into several smaller orders that are executed over a period of time. These smaller orders may now qualify as low touch orders, as each individual order, when executed over a period a time, may now result in little or no market impact.

Figure 11:
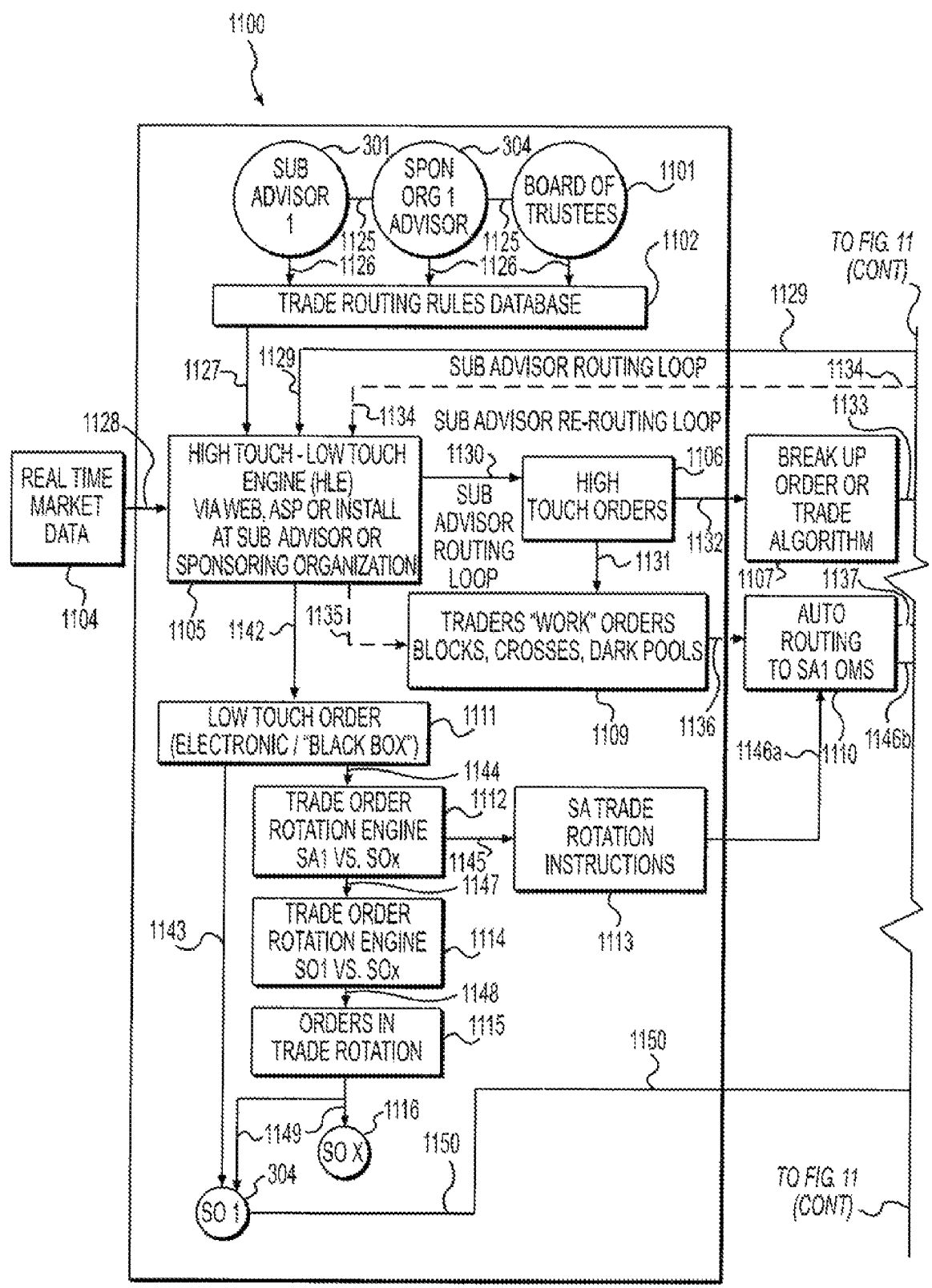
FIG. 11 is a schematic diagram illustrating an exemplary high touch-low touch engine (HLE) system and process, according to an embodiment of the present invention.
Figure 11:
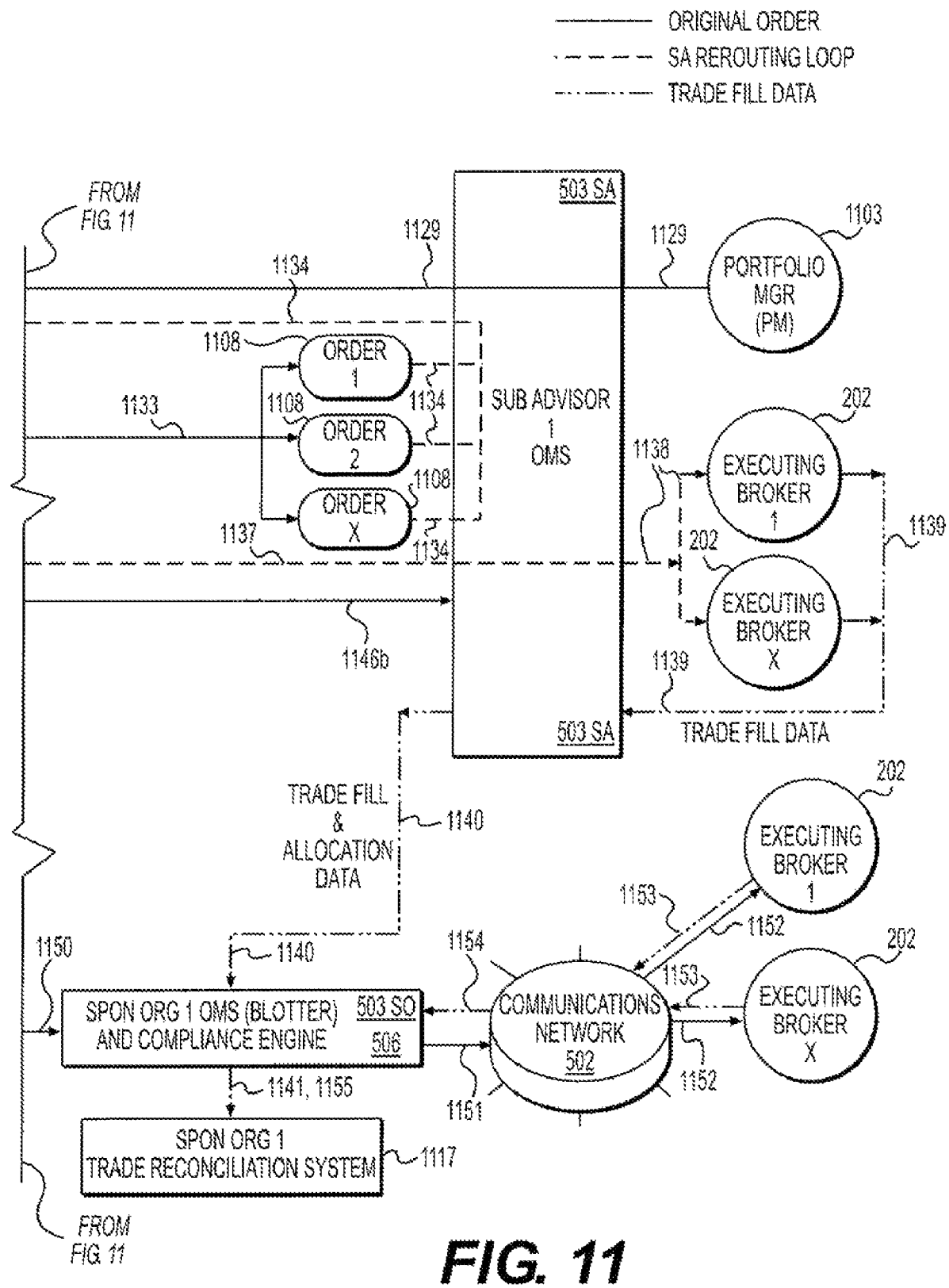

FIG. 11 is a schematic diagram illustrating an exemplary high touch-low touch engine (HLE) system and process 1100, according to an embodiment of the present invention. The process 1100 works as described in the following steps, which correspond to the arrows and their adjacent reference numerals shown in FIG. 11.

1125) The sub advisor 301, sponsoring organization 304, and board of trustees 1101 determine the rules for categorizing an order as high touch or low touch.

1126) The rules for categorizing an order as high touch or low touch are input into the trade routing rules database 1102. These rules can be changed in real-time.

1127) The high touch-low touch engine (HLE) 1105 utilizes the rules from the trade routing rules database 1102 to categorize orders as high or low touch orders.

1128) The high-low engine (HLE) 1105 incorporates a real-time feed of market data 1104 for use in analyzing and determining the expected market impact of an order.

1129) The portfolio manager 1103, using the sub advisor's order management system 503 SA, enters an order that is routed, via the sub advisor routing loop, to the high-low engine 1105 for real-time analysis and categorization as a high touch or low touch order. Although the high touch-low touch engine 1105 is illustrated as located within the unified trading and control system, one of ordinary skill in the art would appreciate that the high touch-low touch engine 1105 could be located elsewhere, such as at the sub advisor 301 or sponsoring organization 306.

1130) The high touch-low touch engine 1105 determines the expected market impact of orders received from the sub advisor order management system (OMS) 503 SA and categorizes orders with significant expected market impact as "high touch" orders 1106.

The high touch order 1106 is further categorized as orders to be "worked" by a block trading desk, crossing system, matching system, dark pool of liquidity, or some other form of institution to institution trading system or exchange 1109. These worked orders are routed for review by the sponsoring organization's compliance engine 506 and, once approved, are ready for execution.

1132) As an alternative to step 1131, the high touch order 1106 is divided into a series of smaller orders 1108 by a trading algorithm or a set of manual decisions 1107.

1133) The trading algorithm or set of manual decisions divides the order into a series of smaller orders 1108 for execution over a period of time.

1134) Each of the smaller orders 1108 resulting from the original high touch order are re-routed to the high touch-low touch engine 1105 via the sub advisor re-routing loop.

1135) The high touch-low touch engine 1105 evaluates the re-routed smaller orders 1108 and categorizes the orders with significant market impact as high touch orders 1109.

1136) High touch orders 1109, from both the original and re-routed orders, are directed via auto routing 1110 to the sub advisor's order management system 503 SA.

1137) The sub advisor's order management system 503 SA receives the high touch order 1109 and selects the executing broker(s) 202.

1138) The sub advisor order management system 503 SA routes the high touch orders to the executing broker(s) 202 for execution.

1139) Once the orders are executed by the executing brokers 202, the trade fill data for the high touch trades 1106 is routed to the sub advisor order management system 503 SA.

1140) The sub advisor order management system 503 SA determines, when applicable, the allocation of shares for the sponsoring organization and routes the trade allocation data along with the trade fill data (for trades not requiring a special allocation) for the high touch trades to the sponsoring organization's order management system 503 SO.

1141) The sponsoring organization's order management system 503 SO routes the trade allocation data for the sponsoring organization's allocation of shares of the high touch trade and the trade fill data for the high touch trades (not requiring a special allocation) to the sponsoring organization's trade reconciliation system 1117. Steps 1130 through 1141 constitute the high touch order processing loop.

1142) Returning to steps 1129 and 1134, when the high touch-low touch engine 1105 receives orders from the sub advisor order management system (OMS) 503 (as either the original and re-routed orders) that it determines will have little or no significant expected market impact, the high touch-low touch engine 105 categorizes those orders as "low touch" orders 1111 that can be processed as "electronic" or "black box" orders, which computer systems can execute with virtually no human intervention. The "low touch" order can be either original orders or re-routed orders from the sub advisor order management system 503 SA.

1143) The high touch-low touch engine 1105 directs trades that do not require a trade rotation order to the sponsoring organization 304. For example, a single order for a single fund would not require a trade rotation order.

1144) The high touch-low touch engine 1105 routes trades requiring a trade order rotation to the trade order rotation engine 1112 in order to determine a trade order rotation between the sub advisor 301 and the sponsoring organization(s) 304 and 1116. For example, when an asset manager places a plurality of orders in a given security for execution across a plurality of investment portfolios, trade order rotation is required. Such trade order rotation is preferably random. The trade order rotation could be, for example, a defined procedure comprising random selection, sequential selection, or algorithmic random selection.

1145) The trade order rotation engine 1112 prepares trade rotation instructions 1113 for the sub advisor 301.

1146) The trade rotation instructions 1113 are communicated to the sub advisor's order management system 503 SA via auto routing 1110 (along steps 1146a and 1146b).

1147) The trade rotation engine 1114 determines the trade rotation order between a plurality of sponsoring organizations, such as the sponsoring organization 304 and any number of additional sponsoring organizations as represented by sponsoring organization $(SO_x)$ 1116. The trade rotation order could also be determined as a single trade rotation order between the sub advisor 301 and sponsoring organizations 304 and 1116.

1148) The trade rotation engine 1114 prepares trade rotation instructions 1115 for the sponsoring organizations 304 and 1116.

1149) The trade rotation instructions 1115 are communicated to the sponsoring organizations 304 and 1116.

1150) The trade orders are routed to the sponsoring organization's order management system (OMS) 503 SO.

1151) The sponsoring organization's order management system (OMS) 503 SO routes the orders for review by the sponsoring organization's compliance engine 506 and, once approved, selects the executing brokers 202 and routes the orders through the communications network 502 for execution.

1152) The communications network 502 directs the orders to the designated executing brokers 202 for execution.

1153) The executing brokers 202 execute the trade and report the trade fills back to the communications network 502.

1154) The communications network 502 reports the trade fill reports back to the sub advisor's order management system (OMS) 503 SO.

1155) The sponsoring organization's order management system (OMS) 503 SO routes the orders to the sponsoring organization's trade reconciliation system 1117. Although, for clarity, FIG. 11 shows the trade compliance, execution, and reconciliation process (steps 1150-1155) only for sponsoring organization (SO 1) 304, the same or similar process would occur for the additional sponsoring organizations $(SO_x)$ 1116. Steps 1142 through 1155 constitute the low touch order processing loop.

The high touch-low touch engine (HLE) 1100 is unique in that it performs an expected market impact analysis and assigning of discretion over order execution and selection of executing brokers to different organizations utilizing real-time market data and customizable rules. The high touch-low touch engine's (HLE) automated, real-time capability does not exist in the prior art and represents a technology innovation in the system of the present invention.

In an embodiment of the present invention, the high touch-low touch engine 1100 enables the sponsoring organization to select the executing brokers and direct the pending orders for execution at brokers providing the lowest cost execution (consistent with regulatory requirements such as Best Execution). The result is that, in an embodiment of the present invention, the sponsoring organizations are able to direct order flow as to eliminate soft dollar costs and achieve substantial and recurring cost savings (and improved investment performance) for their fund shareholders and plan beneficiaries. The high touch-low touch engine 1100 would, under circumstances approved by the sponsoring organization, enable the sub advisor to assume discretion to direct trades to their selected executing brokers.

5) Price-Liquidity-Cost-Quality Engine

The price-liquidity-cost-quality engine is a graphical user interface (GUI) and associated software program(s) linked to a computerized, real-time and customizable rules-based logic engine that enables each buy or sell order (or combinations of buy and sell orders) to be analyzed, according to a set of customizable logical rules, to determine, through an optimization process, the most cost effective order composition in terms of one or more of share price, number of shares, execution cost or mark-up, expected price improvement, and execution speed. The output of the price-liquidity-cost-quality engine is a list of the executing brokers, share price, number of shares, execution cost or mark-up, expected price improvement, and execution speed for the sponsoring organizations and sub advisor to utilize in selecting executing brokers for their orders.

The price per share, number of shares and execution costs or mark-ups are based on actual data gathered through real-time market data feeds and inputs from executing brokers. The price per share and number of shares reflect current market data. The execution cost or mark-up per share reflects the real-time cost entered into the price-liquidity-cost-quality engine by the executing brokers and can vary on a security by security basis and over time (as executing brokers adjust their executions costs or mark-ups to reflect their desire to accumulate, reduce, or liquidate their position in a security).

The trade quality analysis engine provides a real-time and customizable analysis of the historical and expected price improvement for each security, by executing broker, in an order. Currently, orders are executed at the National Best Bid and Offer (Ask) or NBBO. As such, an equity may be available to buy at $42.25 per share (ask or offer) and to sell at $42.00 per share (bid). The difference between the bid and offer (ask) is the spread ($0.25). As such, the ideal price point between the bid and offer is the Mid Point between Bid and Offer (MPBO). For this security, the midpoint between bid and offer is $42.125 per share. The trade quality engine performs a real-time analysis of the share prices and times of execution for recently executed trades to determine how close the share price for a trade was to the MPBO. The range of such a calculation could range from a trade occurring at a $42.125 (at the MPBO, which is a 0% effective to quoted spread.) (While it is possible, orders are rarely executed below the MPBO.) A buy order occurring at $42.25 or a sell order occurring at $42.00 is considered 100% of the NBBO and does not provide any price improvement, which equates to a 100% effective-to-quoted spread. Unfortunately, orders can also be executed above the spread (above $42.25 on a buy or below $42.00 on a sell). These transactions are considered "outside the spread" and, as a result, these trades have an effective-to-quoted spread that exceeds 100%. The effective-to-quoted analysis is performed for each order and the time period utilized for this analysis is customizable and performed for periods of time ranging from sub-seconds to minutes, hours, days, and longer, according to the desires of the user. This data is then utilized by an optimization engine to calculate the most cost effective group of executing brokers for the order. This data is then transmitted to the order management system of the sub advisor or sponsoring organization.

The quality data can also include factors such as speed of execution, which reflects the time that is required for an executing broker, upon receipt of the order, to complete the execution of the order.

Currently, the securities industry focuses on share price and liquidity ("best execution") when determining the optimal order composition. The price-cost-liquidity-quality engine's capacity to factor in additional real-time and customizable factors, such as execution cost and expected price improvement, represents a considerable step forward in providing shareholders and plan beneficiaries with the lowest total execution cost in a routine and automated fashion.

Figure 12:
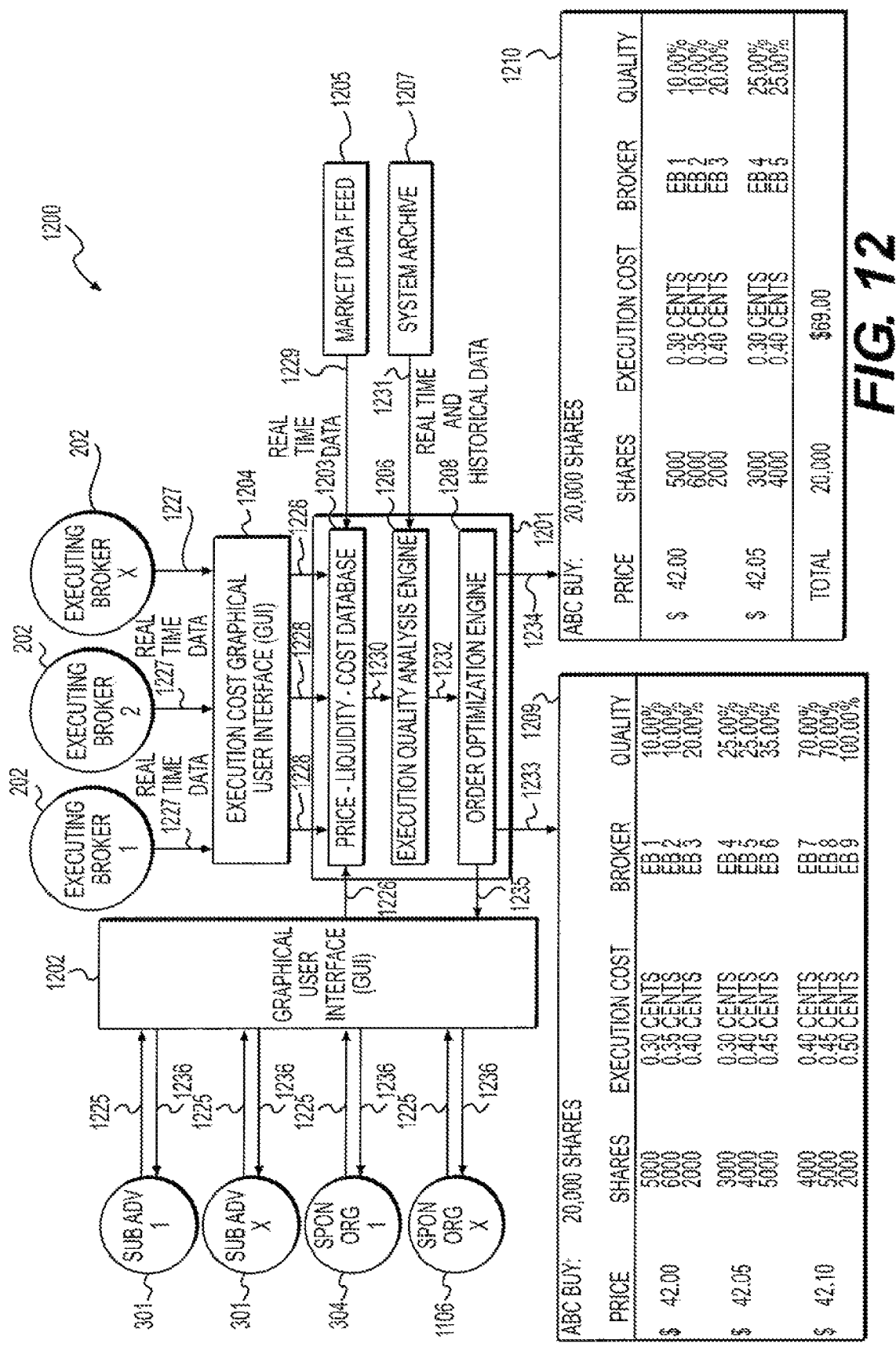
FIG. 12 is a schematic diagram illustrating an exemplary price-cost-liquidity-quality engine, according to an embodiment of the present invention.

FIG. 12 is a schematic diagram illustrating the price-cost-liquidity-quality engine's 1201 system and process 1200, according to an embodiment of the present invention. The process 1200 works as described in the following steps, which correspond to the arrows and their adjacent reference numerals shown in FIG. 12.

1225) Sub advisors 301 and sponsoring organizations 304 and 1116 transmit their individual orders to the price-liquidity-cost-quality system through the graphical user interface (GUI) 1202 or through a data feed from their order management system 503 (not shown).

1226) The order is entered into the price-cost-liquidity database 1203.

1227) Executing brokers 202 utilize a graphical user interface (GUI) 1204 to enter the execution costs 1204 for orders into the price-cost-liquidity-quality engine 1201. The execution cost data 1204 can be changed on a real-time basis for each security.

1228) The execution cost data 1201 is incorporated into the price-liquidity-cost database 1203.

1229) Real time market data 1205 is delivered to the price-cost-liquidity-quality engine 1201 and incorporated into the price-liquidity-cost database 1203.

1230) The price-liquidity-cost data is incorporated into the execution quality analysis engine 1206.

1231) The system archive 1207 for the execution quality analysis engine 1206 provides real-time and historical data on the quality of execution, that is, the effective-to-quoted spread to the execution quality analysis engine 1206.

1232) The execution quality analysis engine 1206 combines the price-liquidity-cost data and the real-time and historical data and delivers the data to the order optimization engine 1208.

1233) The data 1209 incorporates the share price, number of shares available from each executing broker, execution cost or mark-up, broker identification, and quality of execution (calculated effective-to-quoted spread).

1234) The order optimization engine 1208 combines the lowest execution cost based on the price-liquidity-cost data and factors in the expected price improvement data to determine, through the optimization process, the most cost effective combination of executing brokers for the order. For this order, the most cost effective group of brokers combine for an execution cost of $69.00 with an expected price improvement resulting from an effective-to-quoted spread of 10% for 11,000 shares, 20% for 2,000 shares, and 25% for 7,000 shares.

1235) The order optimization engine 1208 routes the optimized executing broker combination to the graphical user interface 1202.

1236) The sub advisors 301 and sponsoring organizations 304 and 1116 (or any asset manager 201) utilizes the graphical user interface 1202 (or data feed) to review the optimized executing broker combination for that order for use in the order entry process 700 (not shown).

The price-cost-liquidity-quality engine 1201 is unique in that it performs a real-time computer analysis and subsequent assigning of execution costs and expected execution quality relative to current share price and liquidity offered by a network of executing brokers. This automated, real-time, and customizable capability does not exist in the prior art and represents a technology innovation in the system of the present invention.

6) Trade Reconciliation System

Figure 13:
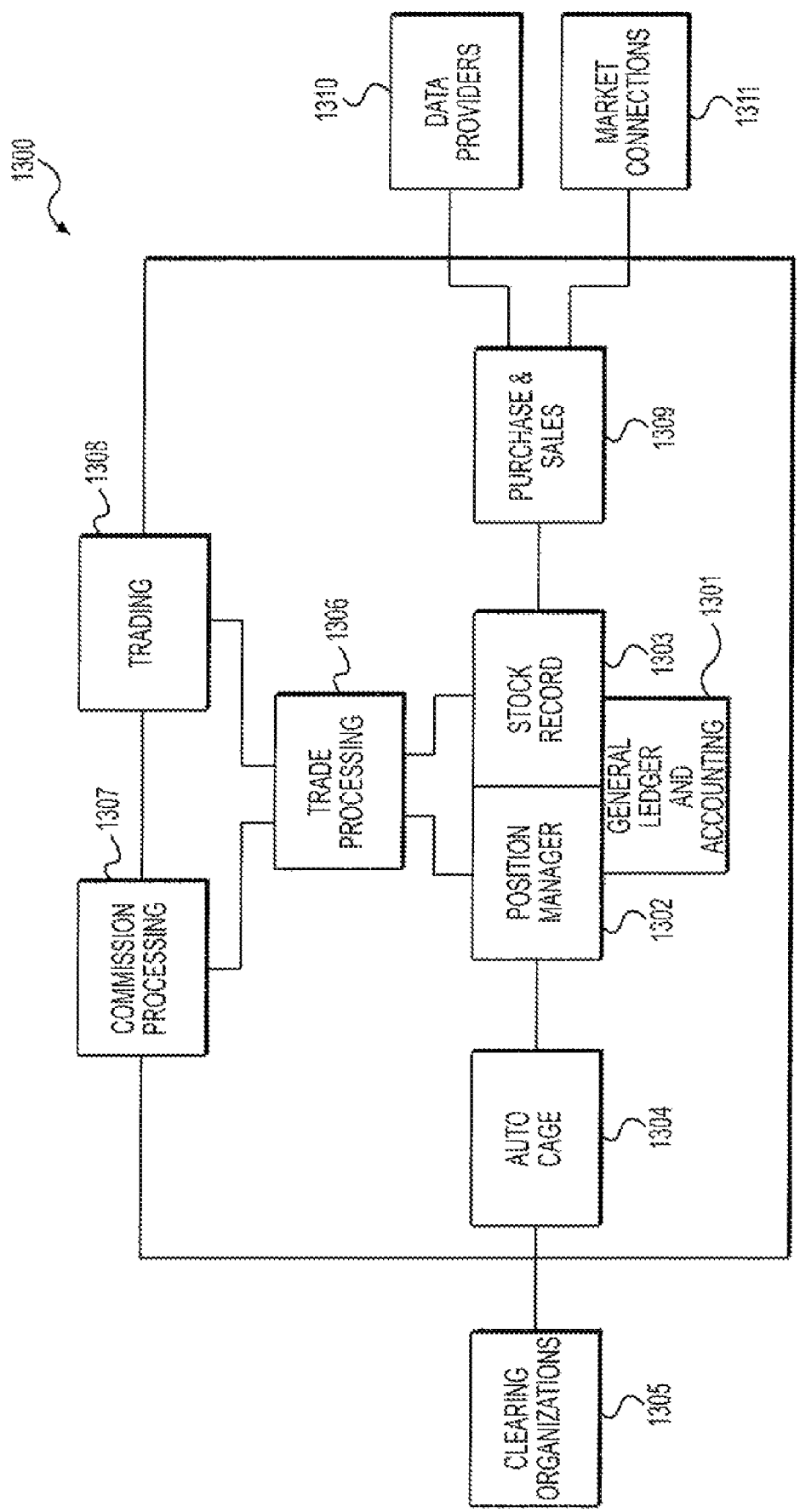
FIG. 13 is a schematic diagram illustrating exemplary component modules of a trade reconciliation system, according to an embodiment of the present invention.

FIG. 13 is a schematic diagram illustrating a trade reconciliation system 1300, according to an embodiment of the present invention. The trade reconciliation system is a computerized trade processing system that functions in the back office system for the investment portfolios. The trade reconciliation system can comprise general ledger and accounting 1301, position manager 1302, and stock record 1303 modules. The position manager 1302 can comprise an auto cage 1304 that connects to clearing organizations 1305. The position manager module 1302 and stock record module 1303 support the trade processing module 1306 that provides commission accounting 1307 and trade processing 1308. The stock record also supports the purchase and sales module 1309, which incorporates data through external data providers 1310 and market connections 1311. The trade reconciliation system 1300 provides real-time, multi-currency trade settlement rules, trade comparisons, trade confirmation and affirmations, purchases and sales, trade exception processing, commission calculations, accruals, cash flows, and trial balances. In essence, the trade reconciliation system 1300 operates in an automated fashion through the incorporation of real-time and batch data feeds from a variety of different sources. In its simplest form, the trade reconciliation process ensures that: (1) all trades are properly accounted; (2) all trading, pricing, and processing errors have been identified and addressed; and (3) all accounts are in balance. At the conclusion of this process, the entire system is ready for the next day's trading activity.

In the prior art, the trade reconciliation process is the responsibility of both the sub advisor and the sponsoring organization while the balancing of accounts is the responsibility of the sponsoring organization. In an embodiment of the present invention, the responsibility for both the trade reconciliation process and the balancing of accounts shifts to the sponsoring organization.

7) Additional Systems

The system of the present invention can also include additional systems to support order execution processing. These systems include a communications engine to translate and direct all messages between the appropriate parties; a communications protocol for specifying message format as to eliminate confusion as to message content, instructions, and destination; and a communications network to connect all sub advisors, sponsoring organizations, and executing brokers with real-time, reliable, and scalable connectivity.

B. Process

In an embodiment of the present invention, the functional responsibilities, personnel requirements, system requirements, regulatory responsibilities, and data flows are dramatically different from the prior art. From a perspective of responsibility for the sub systems, Table 3 below illustrates how the operating responsibilities for the various systems change from the prior art to an embodiment of the present invention.

TABLE 3

Operating Responsibilities of the Present Invention

| System Responsibility | Prior Art | Present Invention |
|---|---|---|
| Order Entry | Sub Advisor | Sub Advisor |
| Compliance Engine | Sub Advisor | Sponsoring Organization Has Compliance Option |
| Order Management System | Sub Advisor | Sponsoring Organization |
| High Touch - Low Touch Engine | Not Applicable | Sponsoring Organization Real-Time Automated Process |
| Price - Liquidity - Cost - Quality Engine | Not Applicable | Sponsoring Organization Real-Time Automated Process |
| Trade Reconciliation | Sub Advisor | Sponsoring Organization |
| Communications Engine | Sub Advisor | Sponsoring Organization |
| Communications Protocol | Sub Advisor | Sponsoring Organization |
| Communications Network | Sub Advisor | Sponsoring Organization |

With respect to the responsibilities of the sub advisor, there are substantial differences between the prior art and the embodiment of the present invention. These differences are summarized in FIG. 14. The unified trading and control system is flexible in its implementation in that trading responsibility for certain funds or portfolios, such as an emerging markets or micro cap stocks, may remain with the sub advisors (assuming the sub advisor has proficiency with these less liquid issues that the sponsoring organization may not possess.) Also, the money manager (or portfolio manager) may desire more control over the trading of specific assets or issues, the utilization of certain trade strategies or the direction of orders to a specific executing broker. The authorization of such exceptions remains with the sponsoring organization as the sponsoring organization can authorize those exceptions that benefit the fund shareholders or plan beneficiaries. Overall, in an embodiment of the present invention, there are multiple benefits for the sub advisor with respect to lower operating expenses, less operating and trade error risk and, of course, superior fund performance.

Finally, an important user group that must be comfortable with the system implementation of the present invention is the portfolio managers making the daily buy and sell decisions in the fund or investment portfolio. The system of the present invention addresses the portfolio managers' concern that their asset management process not be interfered with as new systems, processes, and procedures are implemented. The result is that the system of the present invention, as shown below in Table 4, addresses the concerns of the portfolio managers in a positive and comprehensive fashion.

TABLE 4

Portfolio Manager Concerns Addressed by the Present Invention

| Portfolio Manager Concern | Unified Trading and Control System |
|---|---|
| Performance | Substantial, Recurring Improvement in Performance |
| Control of High Touch Trades | Remains with Sub Advisor (through high touch - low touch engine) |
| Anonymity | Enhanced as positions are held in multiple sub advised portfolios |
| Latency | Improved as automated process replace manual processes |
| Chaos from Multiple Systems | Standards create a single image across all sub advised accounts |
| Trade Rotation | Implemented by trade order rotation engine |
| Order Entry | Remains sub advisor responsibility |
| Management Fees | Not impacted by change in process |
| Best Execution | SEC Rule NMS mandates Best Execution on all trades |

C. Rationale for Implementation of a Standard in the System of the Present Invention An embodiment of the present invention provides a standard system comprising one or more of the following components: order management system (OMS), communications engine, communications protocol, and communications network. The standard for the system of the present invention provides simplicity, reliability, scalability, and cost effectiveness in contrast to the complexity, expense, and potentially chaotic processing caused a plurality of sponsoring organizations making individual systems decisions without regard to the burden that the plurality of systems and configuration places on their sub advisors and executing brokers. As such, the standard represents a single group of specific components for use by all parties, in which a sub advisor or executing broker implementing the system of the present invention with a single sponsoring organization is able to duplicate, as a "cookie cutter" type process, the initial implementation, inclusive of process, procedures, protocols, and connectivity, with each subsequent sponsoring organization that requires their implementation of the system of the present invention. The result is that the standard, as a single group of specific components for use by all parties, vastly simplifies the implementation process for all parties and creates a far more reliable, cost effective, and scalable system.

Currently, a single mutual fund company (such as AIM, Janus, or Oppenheimer.) may act as a sub advisor to ten to twenty different sponsoring organizations (usually managing between one and five funds per sponsoring organization). As such, a mutual fund company may manage twenty to sixty separate sub advised funds alongside their thirty to fifty proprietary mutual funds (and as many or more institutional and private accounts). A money manager at a mutual fund company making a single trade (such as: buy IBM) in a single strategy (such as large cap growth) could easily impact ten to twenty separate individual portfolios utilizing the large cap growth strategy. In order to simplify this vast complexity, the mutual fund company selects and utilizes a single integrated system to execute trades across all proprietary, sub advised, and private portfolios. This single system calculates the number of shares of IBM to purchase for each of a plurality of large cap growth portfolios and aggregates a plurality of share purchases into a single buy order. The single aggregated buy order and associated trading strategies are entered into the single system's order management interface. At that point, if the buy order is large, this trading and order management system may split the trade and direct portions of the buy order to a plurality of executing brokers to complete the buy transaction. These orders are communicated to their executing brokers through a single communications engine and communications network. The shares that are bought are later allocated among the various proprietary funds, sub advised funds, and institutional and private accounts according to pre-determined instructions. While this process may have disadvantages, it is clear that the money manager achieves a high level of automation and significant reduction in operating risk (and associated trading losses), as trading across a plurality of accounts is implemented through a single integrated system.

In comparison, the potential complexity of the various implementations of the system of the present invention reflects the following factors.

The National Association of Variable Annuities (NAVA), the variable insurance industry trade group, indicates that it has over fifty members acting as sponsoring organizations for their mutual fund, variable annuity, and defined contribution (401k, 403b and 457) financial products (see FIG. 15). The number of additional sponsoring organizations, such as private and public pension funds, easily adds several hundred more sponsoring organizations to the list shown in FIG. 15.

The Investment Company Institute (ICI), the mutual fund industry trade group, has over three hundred member mutual fund companies suitable to provide money management services to sub advised funds (see FIGS. 16A and 16B) and there are hundreds of additional institutional managers capable of functioning as a sub advisor to an investment portfolio.

There are also over forty providers of order management systems (see FIG. 17) and there are several hundred firms offering their services as executing brokers (see FIGS. 18A and 18B for a partial list).

In addition, there are over 75 companies offering over 115 different communications engines for trade order messaging, translation, and destination routing. These communications engines usually utilize a common industry communications protocol (usually the Financial Information Exchange format or "FIX"). However, each communications engine has its own unique "dialect" as to the specific implementation of the protocol. As such, despite the common industry protocol, there remain substantial challenges in the interoperability and ease of communications between the pluralities of communications engines. Finally, there are over 25 communications networks available for sponsoring organizations to utilize as their means of connectivity to sub advisors and executing brokers, thereby requiring each sub advisor and executing broker to link as a node to each system selected by at least one sponsoring organization.

Given the plurality of sponsoring organizations (as shown in FIG. 15 and inclusive of additional sponsoring organizations such as mutual funds utilizing sub advisors, defined contribution plan sponsors, pension and defined benefit sponsors, and other user groups of considerable size), sub advisors (as shown in FIGS. 16A and B), order management systems (as shown in FIG. 17), executing brokers (as shown in FIGS. 18A and 18B) along with the 115 communications engine with each utilizing a specific "dialect" reflecting its original time and purpose of creation, several communications protocols for messaging and 25 communications networks, the number of potential unique configurations of these organizations and systems is so overwhelming as to create such complexity and chaos as to prevent an implementation of the system of the present invention based on the well-justified concerns that any level of industry acceptance could result in unacceptable complexity, operating costs, personnel costs, order entry errors, trade processing errors, and associated reduced performance of investment portfolios. Given that the sub advisor is required to compensate an investment portfolio for all losses resulting from their errors of any kind, the likely result of an absence of a standard is the refusal by sub advisors to cooperate with an implementation of the system of the present invention.

FIG. 19 provides an exemplary structure 1900 illustrating the complexity created by a plurality of sponsoring organizations 304 deciding to implement the embodiment of the present invention without a standard system 1901. In this illustration, twenty-two different sponsoring organizations 304 select ten different order management systems 1901. The sponsoring organizations 301 utilize a total of forty-two different sub advisors 301 in their financial product or pension portfolios along with eight different executing brokers 202 (while in actual practice the actual number of sponsoring organizations 304, sub advisors 301, and executing brokers 202 would be considerably higher than the illustration in FIG. 19). Each sub advisor 301 is asked to move from a single system to a plurality of systems 1901 (as there are over forty systems available to a sponsoring organization as shown in FIG. 17) selected by each sponsoring organization. As a result, a single trade by a single sub advisor 301 may require order entry into ten or more different systems selected by sponsoring organizations. Such a process could be complex, chaotic, costly, and rife with errors. The associated expense for resolving the errors (as the fund shareholders and plan beneficiaries are not responsible for such errors and must be reimbursed for any losses) could make sub advisors 301 unwilling to implement such a process.

FIG. 20 illustrates the complexity of such an embodiment 2000 without a standard 1901 through a focus on the complexity facing a single sub advisor 301 managing nine proprietary funds 2001 utilizing a single system 1901 and nine sponsoring organization funds or investment portfolios for sponsoring organizations 2002 utilizing a plurality of systems 1901. The illustration demonstrates, even at the small scale of a single sub advisor, the inherent complexity and potential chaos of such an implementation without the use of a standard system.

Figure 21:
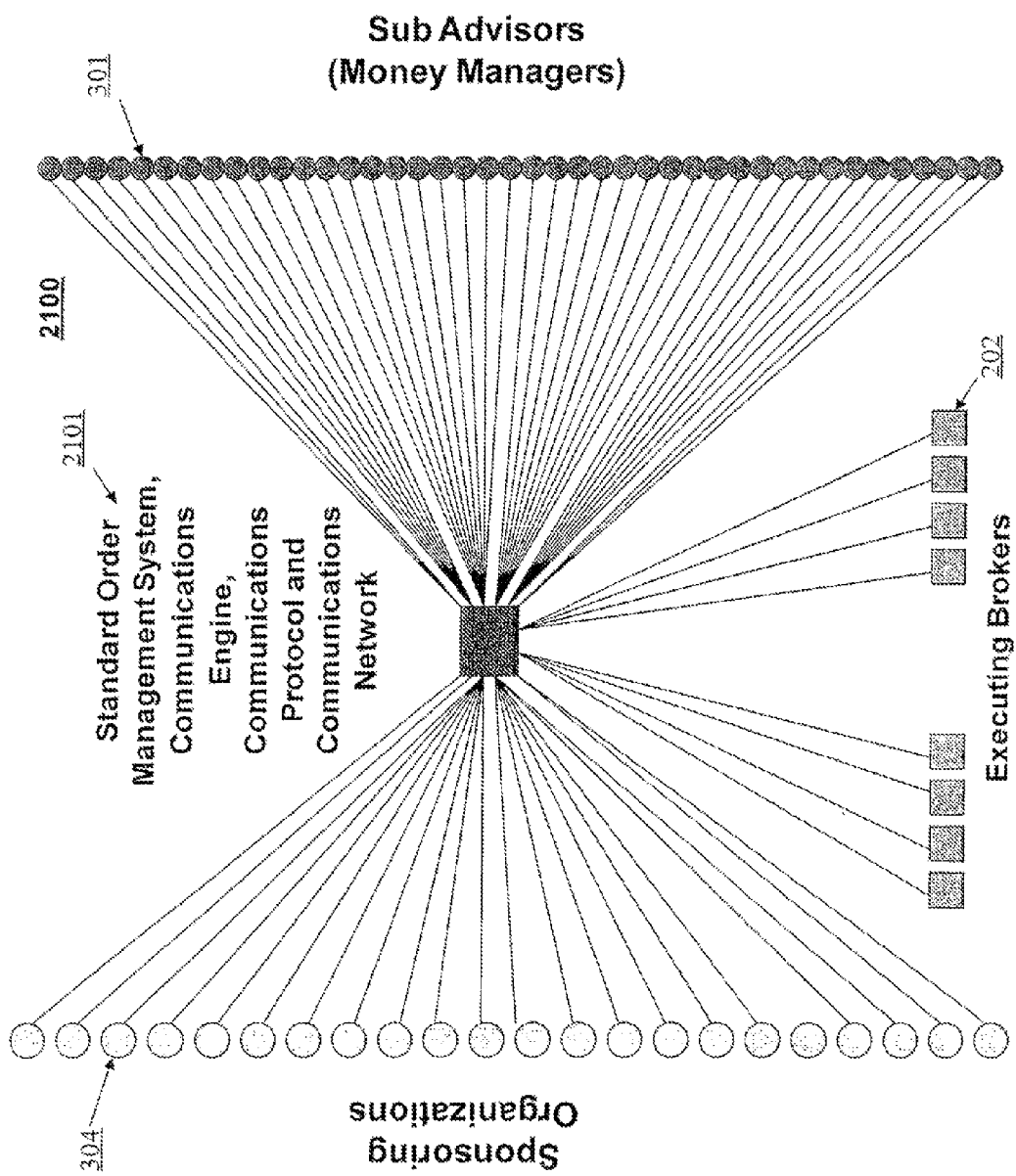
FIG. 21 is a schematic diagram illustrating an embodiment of the present invention in which a plurality of sponsoring organizations and a plurality of sub advisors (money managers) use a standard order management system, communications engine, communications protocol, and communications network to execute orders with a plurality of executing brokers.

Therefore, to reduce this complexity, an embodiment of the present invention provides a single standard. FIG. 21 illustrates the simplicity, ease of use, and efficiency resulting from an embodiment 2100 utilizing a designated standard single manager order management system 2101 for use by all sponsoring organizations 304 and sub advisors 301 (money managers). The standard system and single network node connection by a single party to all parties reflects a vast improvement in the operating reliability, costs, and ease of implementation and operation. As shown, a single system 2101 (e.g., in this illustration, a standard order management system, communications engine, communications protocol, and/or communications network; however, an embodiment could require fewer of the listed standard components) can be used as an easily and rapidly duplicated image used by sponsoring organizations 304, sub advisors 301, and executing brokers 202. A standard-implemented through, for example, a designated order management system, communications engine, or communications protocol-creates the leverage for allowing rapid industry adoption of the system of the present invention.

II. Exemplary System Components, Services, and Data of a Sponsoring Organization In an embodiment of the present invention, the following systems, services, and data are preferably in place for a sponsoring organization's investment portfolios:

Custody firm to hold the securities and cash for benefit of the funds and plans.

Daily net cash contribution or withdrawal per investment portfolio—e.g., can be provided by the sponsoring organization to the system administrator.

Security master data service.

Real-time quote service.

Best execution monitoring service.

Transaction cost accounting system.

Connectivity among the sponsoring organization, sub advisors and executing brokers.

III. Exemplary Implementation of the Present Invention

Figure 22:
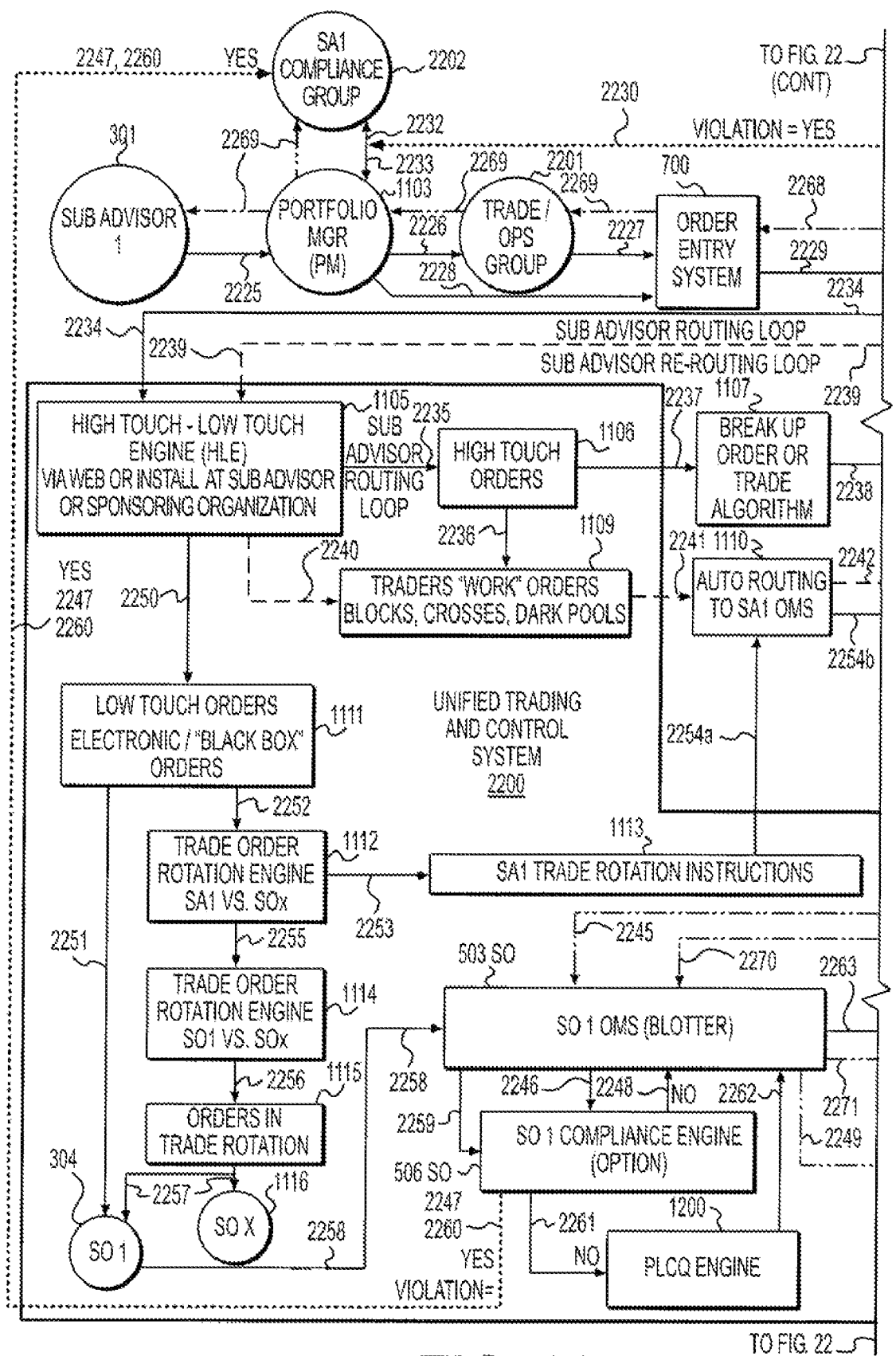
FIG. 22 is a schematic diagram illustrating a use case analysis of an exemplary implementation of a system, method, process, software, and standards for facilitating the unified trading and control of a sponsoring organization's money management process, according to an embodiment of the present invention.
Figure 22:
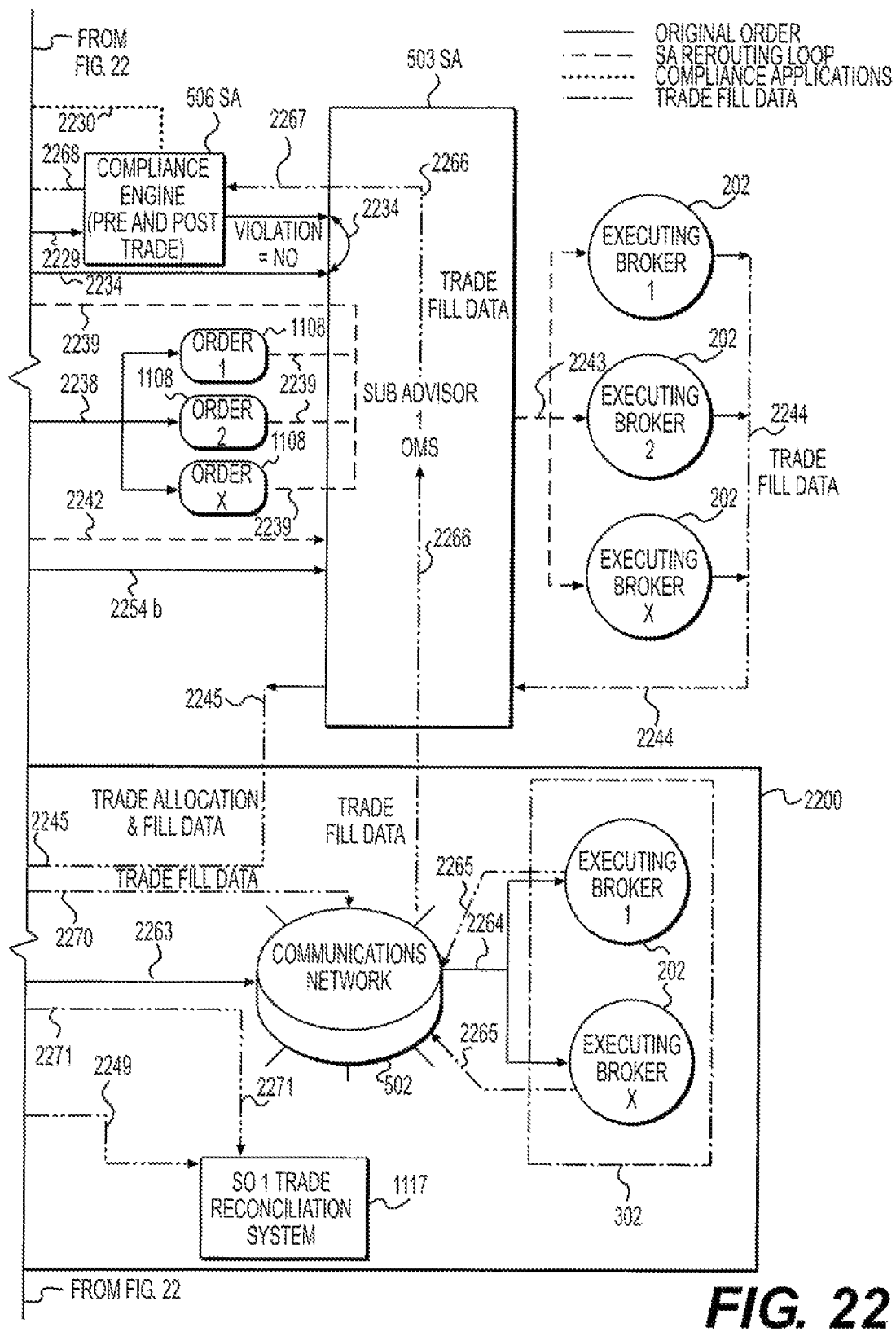

With reference to FIG. 22, an exemplary system of the present invention is as follows. The actors include a system administrator administering the unified trading and control system 2200, a sub advisor 301 acting as money manager for the investment portfolios, a portfolio manager (money manager) 1103 responsible for making investment decisions for a fund or investment portfolio, a sub advisor trade/operations group 2201, a sub advisor compliance group 2202, a sponsoring organization compliance group (not shown), a sponsoring organization 304 controlling party for the assets and responsible for client books and records, a custodial firm holding all securities and cash (not shown), and executing brokers 202 as the parties to whom the buy or sell order is directed to be executed (filled).

The system includes a unified trading and control system 2200 including a portfolio modeling system 1103, an order entry system 700, a sub advisor compliance engine 506 SA, a sub advisor order management system (OMS) 503 SA, the high touch-low touch engine 1105, the trade order rotation engine 1112 and 1113, the sponsoring organization standard order management system (OMS) 503 SO, a sponsoring organization compliance system 506 SO, the price-liquidity-cost-quality engine 1200, the sponsoring organization's communications network 502, the network of executing brokers supporting the sponsoring organization 302, the individual executing brokers 202, and the trade reconciliation system 1117.

FIG. 22 also illustrates an exemplary process of the present invention having the following steps, which correspond to the arrows and their adjacent reference numerals shown in FIG. 22.

2225) Sub advisor 301 provides a portfolio manager 1103 for the fund or investment portfolio.

2226) Portfolio manager 1103 sends the trade order to the trade/operations group 2201 for order entry.

2227) Trade/operations group 2201 enters the order into the order entry system 700.

2228) As an alternative to step 2226 and 2227, the portfolio manager 1103 enters the trade order directly into the order entry system 700.

2229) The order entry system 700 routes the order to the compliance engine 506 SA for evaluating the order relative to regulatory and prospectus requirements and restrictions.

2230) If a violation occurs (Violation=Yes), the order is stopped from execution and routed for review by the sub advisor. The violation is also reported to the sponsoring organization compliance group (not shown) and to any or all of the sub advisor groups shown in steps 2231, 2232, and 2233.

2231) If a violation occurs (Violation=Yes), the order can be routed to the trade/ops group 2201.

2232) If a violation occurs (Violation=Yes), the order can be routed to the compliance group 2202.

2233) If a violation occurs (Violation=Yes), the order can be routed to the portfolio manager 1103.

2234) If a violation does not occur (Violation=No), the order is routed to the order management system (OMS) 503 SA, which, through the sub advisor routing loop, directs the order for sub advised funds or accounts to the high touch-low touch engine 1105. Although FIG. 22 depicts the high touch-low touch engine 1105 as located within the unified trading and control system, one of ordinary skill in the art would appreciate that the high touch-low touch engine 1105 could be located elsewhere, such as at the sub advisor 301 or sponsoring organization 306.

2235) The high touch-low touch engine 1105 determines the expected market impact of orders received from the sub advisor order management system (OMS) 503 and categorizes orders with significant expected market impact as "high touch" orders 1106.

2236) The high touch order 1106 is further categorized as orders to be "worked" by a block trading desk, crossing system, matching system, dark pool of liquidity, or some other form of institution to institution trading system or exchange 1109. These high touch trades are routed to the sponsoring organization's compliance engine 506 SO for pre-execution review and approval and, once approved, are ready for execution. (The sponsoring organization compliance review step is not shown).

2237) As an alternative to step 2236, the high touch order 1106 is divided into a series of smaller orders 1108 by a trading algorithm or a set of manual decisions 1107.

2238) The trading algorithm or set of manual decisions divides the order into a series of smaller orders 1108 for execution over a period of time.

2239) Each of the smaller orders 1108 resulting from the original high touch order is re-routed, via the sub advisor re-routing loop, to the high touch-low touch engine 1105. Step 2239 starts the sub advisor rerouting loop.

2240) The high touch-low touch engine evaluates the re-routed smaller orders 1108, categorizes the orders with significant market impact as high touch orders 1109, and routes these orders to be "worked" 1109.

2241) High touch orders 1109 are directed via auto routing 1110 to the sub advisor's order management system 503 SA. Although FIG. 22 depicts the high touch-low touch engine 1105 as located within the unified trading and control system, one of ordinary skill in the art would appreciate that the high touch-low touch engine 1105 could be located elsewhere, such as at the sub advisor 301 or sponsoring organization 306.

2242) The sub advisor's order management system 503 SA receives the high touch order 1106 and selects the executing broker(s) 202.

2243) The sub advisor order management system 503 SA routes the high touch orders 1106 to the executing broker(s) 202 for execution.

2244) Once the orders are executed by the executing brokers 202, the trade fill data for the high touch trades 1106 is routed to the sub advisor order management system 503 SA.

2245) The sub advisor order management system 503 SA determines, when applicable, the allocation of shares for the sponsoring organization and routes the trade allocation data along with the trade fill data (for trades not requiring a special allocation) for the high touch trades to the sponsoring organization's order management system 503 SO.

2246) The sponsoring organization's order management system 503 SO routes the trade allocation data for the sponsoring organization's allocation of shares of the high touch trade and the trade fill data (for trades not requiring a special allocation) to the sponsoring organization's compliance engine 506 SO.

2247) If a violation occurs (Violation=Yes), the trade allocation data for the sponsoring organization's allocation of shares of the high touch trade is routed for review by both the sponsoring organization 306 and the sub advisor 301.

2248) If a violation does not occur (Violation=No), the trade allocation data for the sponsoring organization's shares of the high touch trade is routed to the sponsoring organization's order management system (OMS) 503 SO.

2249) The sponsoring organization's order management system (OMS) 503 SO routes the trade allocation data for the sponsoring organization's shares of the high touch trade to the sponsoring organization's trade reconciliation system 1117. Steps 2235 through 2249 constitute the high touch order processing loop.

2250) Returning to steps 2234 and 2239, when the high touch-low touch engine 1105 receives orders from the sub advisor order management system (OMS) 503 SA (as either the original and re-routed orders) that it determines will have little or no significant expected market impact, the high touch-low touch engine 1105 categorizes those orders as "low touch" orders 1111 that can be processed as "electronic" or "black box" orders, which computer systems can execute with virtually no human intervention. The "low touch" order 1111 can be either original orders or re-routed orders from the sub advisor order management system 503.

2251) The high touch-low touch engine 1105 directs low touch orders 1111 that constitute an exemplary order for an exemplary fund (and thus does not require a trade rotation order) to the sponsoring organization 304. For example, a single order for a single fund would not require a trade rotation order.

2252) The high touch-low touch engine 1105 routes trades requiring a trade order rotation to the trade order rotation engine 1112 in order to determine a trade rotation order between the sub advisor 301 and the sponsoring organization (s) 304 and 1116. For example, an order involving several sub advisor funds and several sponsoring organization funds would require a trade rotation order. As another example, when an asset manager places a plurality of orders in a given security for execution across a plurality of investment portfolios, trade order rotation is required.

2253) The trade order rotation engine 1112 prepares trade rotation instructions 1113 for the sub advisor 301.

2254) The trade rotation instructions 1113 are communicated to the sub advisor's order management system 503 SA via auto routing 1110 (along steps 2254*a* and 2254*b*).

2255) The trade rotation engine 1114 determines the trade rotation order between a plurality of sponsoring organizations, such as the sponsoring organization 304 and any number of additional sponsoring organizations as represented by sponsoring organization (SO$_x$) 1116. The trade rotation order could also be determined as a single trade rotation order between the sub advisor 301 and sponsoring organizations 304 and 1116.

2256) The trade rotation engine 1114 prepares trade rotation instructions 1115 for the sponsoring organizations 304 and 1116.

2257) The trade rotation instructions 1115 are communicated to the sponsoring organizations 304 and 1116.

2258) The orders are routed to the sponsoring organization's order management system (OMS) 503 SO. This step is illustrated for an exemplary sponsoring organization 306 with a similar process implemented by all sponsoring organizations (SO$_x$) 1116.

2259) The sponsoring organization's order management system (OMS) 503 SO routes the order to the compliance engine 506 SO for evaluating the order relative to regulatory and prospectus requirements and restrictions.

2260) If a violation occurs (Violation=Yes), the order is stopped from execution and routed for review by the sponsoring organization's compliance group (not shown) and the sub advisor's compliance group 2202.

2261) If a violation does not occur (Violation=No), the order is routed to the price-liquidity-cost-quality engine 1200, which examines the current market share prices, liquidity, execution cost, and quality factors such as expected price improvement (and execution speed) to determine the optimal combination of executing brokers providing the most cost effective execution options.

2262) The price-liquidity-cost-quality engine 1200 communicates the optimal cost effective order composition of executing brokers to the sponsoring organization's order management system (OMS) 503 SO.

2263) The sponsoring organization's order management system (OMS) 503 SO selects the executing brokers 202 and routes the orders for execution through the communications network 502.

2264) The communications network 502 directs the orders to the network of executing brokers 302 and to the designated executing brokers 202 for execution.

2265) The executing brokers 202 execute the trade and report the trade fills back to the communications network 502.

2266) The communications network 502 reports the trade fill reports back to the sub advisor's order management system (OMS) 503 SA.

2267) The sub advisor's order management system (OMS) 503 SA sends the trade fill reports back to the compliance engine 506 SA for post trade compliance review. If a violation occurs (Violation=Yes), the process as shown in steps 2230, 2231, 2232, and 2233 is implemented.

2268) If a violation does not occur (Violation=No), the compliance engine 506 SA routes the trade fill reports to the order entry system 700.

2269) The order entry system 700 provides the trade fill reports to the sub advisor's trade/operations group 2201, portfolio manager 1103, compliance group 2202, and the sub advisor's 301 business support systems.

2270) The communications network 502 reports the trade fill reports back to the sponsoring organization's order management system (OMS) 503 SO. The sponsoring organization also performs a post-execution compliance check through the compliance engine 506 SO. If a violation occurs (Violation=Yes), the process is implemented as shown in steps 2246, 2247, and 2248 and the sponsoring organization's compliance group (not shown) is notified.

2271) If a violation does not occur (Violation=No), the sponsoring organization's order management system (OMS) 503 SO routes the orders to the sponsoring organization's trade reconciliation system 1117. Steps 2250 through 2271 constitute the high touch order processing loop.

Overall, as shown by the various embodiments described above, the system and process of the present invention provide clear, substantial, quantifiable, recurring, and compounding cost savings and the resulting improved investment performance to fund shareholders and plan beneficiaries. The present invention provides a highly desirable social utility of considerable, recurring, and compounding shareholder and plan beneficiary savings. Indeed, a reasonably effective implementation of the embodiment of the present invention could easily benefit millions of Americans through substantially improved performance of their investment portfolios.

FIG. 23 shows exemplary projected annual savings, based on 2005 trade data, potentially generated by an embodiment of the present invention for a number of fund trusts in the variable insurance industry for average trade execution costs of 1.00 cent per share. Given that sponsoring organizations (as advisor for regulatory purposes) and the associated fund board of directors and plan investment consultants have a fiduciary responsibility to control (minimize) operating expenses, there exists a fiduciary obligation to evaluate and, if appropriate, implement any process (such as those provided by the system of the present invention) that provides substantial, recurring, and quantifiable cost savings and improved performance to fund shareholders and plan beneficiaries.

Furthermore, the savings to the fund shareholder and plan beneficiaries occur each year that the funds and accounts utilize the system and process of the present invention. Thus, these benefit of these savings compound and become increasingly more valuable over time. FIGS. 24A, 24B, 24C, and 24D represent a compilation of research for four popular fund trusts (groups of funds) with $38.7 BB, $12.7 BB, $6.7 BB, and $5.3 BB in assets, and shows exemplary total compounded shareholder savings and resulting improved investment performance, at an average execution cost of 1.00 cent per share, over a 1, 3, 5, and 10 year period. Such improved performance could, potentially, improve the decile (ranking by tenths) or quartile (ranking by quarter) performance ratings of these funds relative to their peers (who are not utilizing the embodiment of the present invention). Given that these investment portfolios are associated with personal goals for each fund shareholder and plan beneficiary such as a comfortable retirement, higher education, and improved health care, the social utility created by the embodiment of the present invention is potentially dramatic for millions of Americans.

For illustration purposes, portions of this specification describe the present invention in the context of variable insurance (including variable fund LLCs and registered investment companies (RICs), mutual fund, or pension plan market). However, as one of ordinary skill in the art would appreciate, the systems and methods described herein apply equally well to other similar markets, such as a sub advised mutual fund market, the defined contribution market, 529 plans, hedge funds, collective investments, deferred compensation plans, institutional accounts, separate accounts of insurance companies, defined benefit pension plans, endowments, and trusts. For that reason, and notwithstanding the particular benefits associated with using the present invention in connection with the variable insurance or pension plan markets, the system and method described herein should be considered broadly applicable to any market in need of centralized portfolio management, directed brokerage control, and/or direct and automated compliance monitoring by the sponsoring organization with primary regulatory responsibility for a given sub advised pool of assets.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A method for facilitating a sponsoring organization's money management process using at least one asset manager to manage the sponsoring organization's investment portfolios, the method comprising:

receiving, through a computer-based communications network, orders from an asset manager, each order comprising a number of shares to buy or sell for a security, wherein the orders are received through an order entry system comprising a computer-based graphical user interface and associated software program;

determining, for each order, whether the sponsoring organization or the asset manager is assigned discretion for facilitating execution of the each order, wherein the sponsoring organization is assigned discretion for low-touch orders expected to have low market impact and the asset manager is assigned discretion for high-touch orders expected to have high market impact;

facilitating, based on the assignment of discretion, execution of the high-touch orders by at least one trading organization; and facilitating, based on the assignment of discretion, execution of the low-touch orders by at least one trading organization.

2. The method of claim 1, wherein the at least one trading organization that executes the high-touch orders is authorized by the asset manager assigned discretion, and wherein the at least one trading organization that executes the low-touch orders is authorized by the sponsoring organization assigned discretion.

3. The method of claim 1, further comprising enabling the sponsoring organization to, using a compliance engine, review and either approve for execution or hold from execution the each order before order execution, wherein the compliance engine comprises a graphical user interface and associated software program linked to a computerized rules-based logic engine that enables each order to be analyzed in real time.

4. The method of claim 1, further comprising enabling the sponsoring organization to authorize, in exercise of discretion over routing of orders, at least one trading organization providing low cost execution.

5. The method of claim 1, further comprising:
if the expected market impact is low,
following, when applicable, a random trade order rotation according to a defined procedure, and
having the sponsoring organization authorize the at least one trading organization according to a determination of the most cost effective strategy for an order;
if the expected market impact is high,
formulating a trade strategy for the each order that may result in a modified order,
assigning discretion over the modified order to the sponsoring organization when the modified order results in a plurality of low impact orders, wherein the sponsoring organization authorizes the at least one trading organization for orders of the modified order expected to have low market impact, and
retaining the each order or the modified order expected to have high market impact by the asset manager assigned discretion, wherein the asset manager assigned discretion authorizes the at least one trading organization for the orders expected to have high market impact.

6. The method of claim 1, further comprising determining in real time for each order whether expected market impact is low or high using a set of customizable logical rules.

7. The method of claim 6, further comprising receiving changes to logical rules and adjusting the logical rules in real time.

8. The method of claim 6, wherein determining whether expected market impact is low or high comprises receiving a real time feed of market data and using the market data in determining expected market impact.

9. The method of claim 1, further comprising:
receiving orders from a plurality of asset managers; and
for each order of the plurality of asset managers, determining the assignment of discretion and facilitating execution of the high-touch and low-touch orders.

10. The method of claim 1, wherein facilitating execution of one of the low-touch and high-touch orders comprises effecting transmission of the one order to at least one trading organization over a computer network.

11. The method of claim 1, wherein facilitating the execution of the high-touch orders comprises directing the high-touch orders to the at least one trading organization executing the high-touch orders, and wherein facilitating the execution of the low-touch orders comprises directing the low-touch orders to the at least one trading organization executing the low-touch orders.

12. The method of claim 1, wherein facilitating the execution of the high-touch orders comprises routing the high-touch orders to the at least one trading organization executing the high-touch orders, and wherein facilitating the execution of the low-touch orders comprises routing the low-touch orders to the at least one trading organization executing the low-touch orders.

13. The method of claim 1, wherein the security comprises one of a stock and a bond.

14. A computer system for facilitating a sponsoring organization's money management process using at least one asset manager to manage the sponsoring organization's investment portfolios, the computer system comprising:
an order entry system comprising a computer-based graphical user interface and associated software program configured to receive, through a computer-based communications network, orders from an asset manager, each order comprising a number of shares to buy or sell for a security;
a high touch-low touch engine configured to determine, for each order, whether the sponsoring organization or the asset manager is assigned discretion for facilitating execution of the each order, wherein the sponsoring organization is assigned discretion for low-touch orders expected to have low market impact and the asset manager is assigned discretion for high-touch orders expected to have high market impact; and
one or more order management systems collectively configured to:
facilitate, based on the assignment of discretion, execution of the high-touch orders by at least one trading organization, and
facilitate, based on the assignment of discretion, execution of the low-touch orders by at least one trading organization.

15. The computer system of claim 14, wherein the at least one trading organization that executes the high-touch orders is authorized by the asset manager assigned discretion, and
wherein the at least one trading organization that executes the low-touch orders is authorized by the sponsoring organization assigned discretion.

16. The computer system of claim 14, further comprising a compliance engine configured to enable the sponsoring organization to review and either approve for execution or hold from execution the each order before order execution, wherein the compliance engine comprises a graphical user interface and associated software program linked to a computerized rules-based logic engine that enables each order to be analyzed in real time.

17. The computer system of claim 14, wherein the one or more order management systems are configured to enable the sponsoring organization to authorize, in exercise of discretion over facilitating execution of orders, at least one trading organization providing low cost execution.

18. The computer system of claim 14, wherein the high touch-low touch engine is further configured to:
if the expected market impact is low,
follow, when applicable, a random trade order rotation according to a defined procedure, and
have the sponsoring organization authorize the at least one trading organization according to a determination of the most cost effective strategy for an order; and
if the expected market impact is high,
formulate a trade strategy for the each order that may result in a modified order,
assign discretion over the modified order to the sponsoring organization when the modified order results in a plurality of low impact orders, wherein the sponsoring organization authorizes the at least one trading organization for orders of the modified order expected to have low market impact, and
retain the each order or the modified order expected to have high market impact by the asset manager assigned discretion, wherein the asset manager assigned discretion authorizes the at least one trading organization for the orders expected to have high market impact.

19. The computer system of claim 14, wherein the high touch-low touch engine is configured to determine whether the sponsoring organization or the asset manager is assigned discretion by using a set of customizable logical rules to determine in real time for each order whether expected market impact is low or high.

20. The computer system of claim 19, wherein the high touch-low touch engine is configured to receive changes to logical rules and adjust the logical rules in real time.

21. The computer system of claim 19, wherein the high touch-low touch engine is configured to determine whether expected market impact is low or high by receiving a real time feed of market data and using the market data in determining expected market impact.

22. The computer system of claim 14, wherein the high touch-low touch engine is configured to:
receive orders from a plurality of asset managers, and
for each order of the plurality of asset managers, determine the assignment of discretion.

23. The computer system of claim 14, wherein the one or more order management systems are configured to effect transmission of orders to at least one trading organization over a computer network.

24. The computer system of claim 14, wherein the one or more order management systems are configured to direct the high-touch orders to the at least one trading organization executing the high-touch orders, and to direct the low-touch orders to the at least one trading organization executing the low-touch orders.

25. The computer system of claim 14, wherein the one or more order management systems are configured to route the high-touch orders to the at least one trading organization executing the high-touch orders, and to route the low-touch orders to the at least one trading organization executing the low-touch orders.

26. The computer system of claim 14, wherein the one or more order management systems comprise one or more order management systems of the asset manager, wherein the one or more order management systems of the asset manager facilitate execution of the high-touch orders and the low-touch orders.

27. The computer system of claim 14, wherein the security comprises one of a stock and a bond.

28. A method for facilitating a sponsoring organization's money management process using at least one asset manager to manage the sponsoring organization's investment portfolios, the method comprising:
receiving, through a computer-based communications network, orders from an asset manager, each order comprising a number of shares to buy or sell for a security; and
for each order, using a computerized rules-based logic engine:
determining an expected market impact of the each order,
categorizing the each order as either high-touch or low-touch based on the expected market impact,
assigning to the sponsoring organization discretion for facilitating execution of the each order if the each order is categorized as a low-touch order, and
assigning to the asset manager discretion for facilitating execution of the each order if the each order is categorized as a high-touch order.

29. The method of claim 28, wherein the security comprises one of a stock and a bond.

30. A computer-readable medium storing instructions adapted to be executed by a processor to perform a method for facilitating a sponsoring organization's money management process using at least one asset manager to manage the sponsoring organization's investment portfolios, the method comprising:
receiving, through a computer-based communications network, orders from an asset manager, each order comprising a number of shares to buy or sell for a security, wherein the orders are received through an order entry system comprising a computer-based graphical user interface and associated software program; and
for each order:
determining an expected market impact of the each order,
categorizing the each order as either high-touch or low-touch based on the expected market impact,
assigning to the sponsoring organization discretion for facilitating execution of the each order if the each order is categorized as a low-touch order, and
assigning to the asset manager discretion for facilitating execution of the each order if the each order is categorized as a high-touch order.

31. The computer-readable medium of claim 30, wherein the security comprises one of a stock and a bond.

32. A method for facilitating a sponsoring organization's money management process using at least one asset manager to manage the sponsoring organization's investment portfolios, the method comprising:
inputting orders of an asset manager into an order entry system comprising a computer-based graphical user interface and associated software program, wherein the order entry system is in communication with a high touch-low touch engine, and wherein each order comprises a number of shares to buy or sell for a security;
sending the orders to the high touch-low touch engine, which determines, for each order, whether the sponsoring organization or the asset manager is assigned discretion for facilitating execution of the each order, wherein the sponsoring organization is assigned discretion for low-touch orders expected to have low market impact and the asset manager is assigned discretion for high-touch orders expected to have high market impact;
facilitating, based on the assignment of discretion, execution of the high-touch orders by at least one trading organization; and
facilitating, based on the assignment of discretion, execution of the low-touch orders by at least one trading organization.

33. The method of claim 32, wherein the asset manager inputs the orders and wherein the method further comprises displaying to the asset manager orders for which the sponsoring organization has been assigned discretion and orders for which the asset manager has been assigned discretion.

34. The method of claim 32, further comprising receiving from the high touch-low touch engine an indication of the assignment of discretion for each order.

35. The method of claim 32, further comprising inputting rules according to which the high touch-low touch engine categorizes orders as high-touch orders or low-touch orders.

36. The method of claim 35, further comprising adjusting the rules in real time.

37. The method of claim 32, further comprising sending the orders from the order entry system to the high touch-low touch engine over a computer-based communications network.

38. The method of claim 32, wherein the security comprises one of a stock and a bond.

* * * * *